(12) United States Patent
Kitani et al.

(10) Patent No.: US 7,492,894 B2
(45) Date of Patent: Feb. 17, 2009

(54) INFORMATION-PROCESSING APPARATUS, CONTROL METHOD, PROGRAM AND RECORDING MEDIUM

(75) Inventors: Satoshi Kitani, Tokyo (JP); Tomoyuki Asano, Kanagawa (JP)

(73) Assignee: Sony Corporation, Tokyo (JP)

(*) Notice: Subject to any disclaimer, the term of this patent is extended or adjusted under 35 U.S.C. 154(b) by 822 days.

(21) Appl. No.: 10/979,708

(22) Filed: Nov. 2, 2004

(65) Prior Publication Data

US 2005/0094805 A1   May 5, 2005

(30) Foreign Application Priority Data

Nov. 4, 2003   (JP)   ............................ P2003-374168

(51) Int. Cl.
*H04K 1/04* (2006.01)
*G06F 15/18* (2006.01)

(52) U.S. Cl. ........................................ 380/37; 709/224

(58) Field of Classification Search ................. 380/25, 380/28, 30, 59, 270, 285; 345/443; 711/207; 709/224; 715/209; 382/226
See application file for complete search history.

(56) References Cited

U.S. PATENT DOCUMENTS

| | | | | |
|---|---|---|---|---|
| 5,204,901 A | * | 4/1993 | Hershey et al. | 380/285 |
| 5,243,695 A | * | 9/1993 | Russell et al. | 345/443 |
| 5,255,384 A | * | 10/1993 | Sachs et al. | 711/207 |
| 5,375,070 A | * | 12/1994 | Hershey et al. | 709/224 |
| 5,604,805 A | * | 2/1997 | Brands | 380/30 |
| 5,619,709 A | * | 4/1997 | Caid et al. | 715/209 |
| 5,708,714 A | * | 1/1998 | Lopez et al. | 380/25 |
| 5,982,933 A | * | 11/1999 | Yoshii et al. | 382/226 |
| 6,320,966 B1 | * | 11/2001 | Brands | 380/59 |
| 6,779,095 B2 | * | 8/2004 | Selkirk et al. | 711/165 |
| 7,277,548 B2 | * | 10/2007 | Park et al. | 380/270 |

(Continued)

FOREIGN PATENT DOCUMENTS

JP   8-248879   9/1996

(Continued)

OTHER PUBLICATIONS

Nasrabadi, N.M., Image coding using vector quantization: a review, Aug. 1988, INSPEC, vol. 36, issue:8, pp. 1-15.*

*Primary Examiner*—Kambiz Zand
*Assistant Examiner*—Monjour Rahim
(74) *Attorney, Agent, or Firm*—Oblon, Spivak, McClelland, Maier & Neustadt, P.C.

(57) ABSTRACT

A 4-byte LBA (logical block address) specified in a read command is supplied to first and second IV (initialization vector) generation units. The initialization-vector generation units each extend the LBA to data with a size of 16 bytes by applying typically a hash function to the LBA. The first initialization-vector generation unit outputs the data with a size of 16 bytes to an encryption unit as an initialization vector IV. On the other hand, the second initialization-vector generation unit outputs the data with a size of 16 bytes to a decryption unit as an initialization vector IV. The encryption unit encrypts input data by using the initialization vector IV and a session key Ks received from a first authentication-processing unit. On the other hand, the decryption unit decrypts input data by using the initialization vector IV and the session key Ks received from a second authentication-processing unit.

6 Claims, 38 Drawing Sheets

U.S. PATENT DOCUMENTS

2004/0083362 A1* 4/2004 Park et al. .................. 713/162
2005/0094805 A1* 5/2005 Kitani et al. .................. 380/28

FOREIGN PATENT DOCUMENTS

| JP | 10-303884 | 11/1998 |
| JP | 2000-48483 | 2/2000 |
| JP | 2002-132141 | 5/2002 |
| JP | 2002-202719 | 7/2002 |
| JP | 2002-318719 | 10/2002 |
| JP | 2004-515001 | 5/2004 |
| JP | 2004-201038 | 7/2004 |
| JP | 2004-318154 | 11/2004 |
| JP | 2004/325677 | 11/2004 |
| JP | 2004-355615 | 12/2004 |
| JP | 2005-130059 | 5/2005 |
| WO | WO 02/44876 A2 | 6/2002 |

\* cited by examiner

| Bit / Byte | 7 | 6 | 5 | 4 | 3 | 2 | 1 | 0 |
|---|---|---|---|---|---|---|---|---|
| 0 | Operation Code ||||||||
| 1 | LUN (Obsolete) ||| DPO (0) | FUA | Reserved | Reserved | RelAdr |
| 2 | (MSB) |||||||  |
| 3 | Logical Block Address ||||||||
| 4 | ||||||||
| 5 | |||||||(LSB) |
| 6 | (MSB) |||||||  |
| 7 | Transfer Length ||||||||
| 8 | ||||||||
| 9 | |||||||(LSB) |
| 10 | Streaming | Reserved |||||||
| 11 | Vendor-Specific ||| Reserved | NACA | Flag | Link |

F I G. 1 2
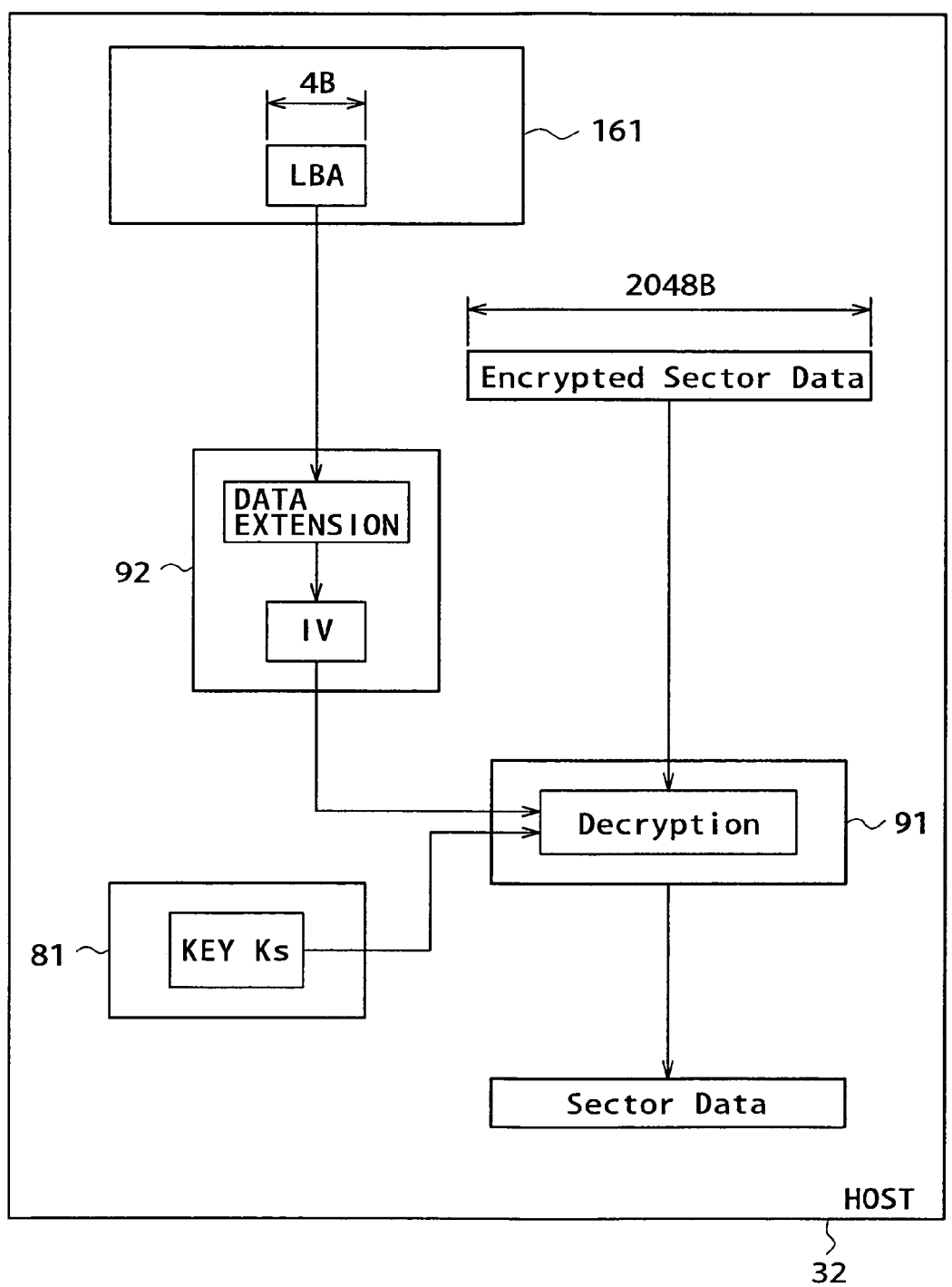

F I G. 2 9
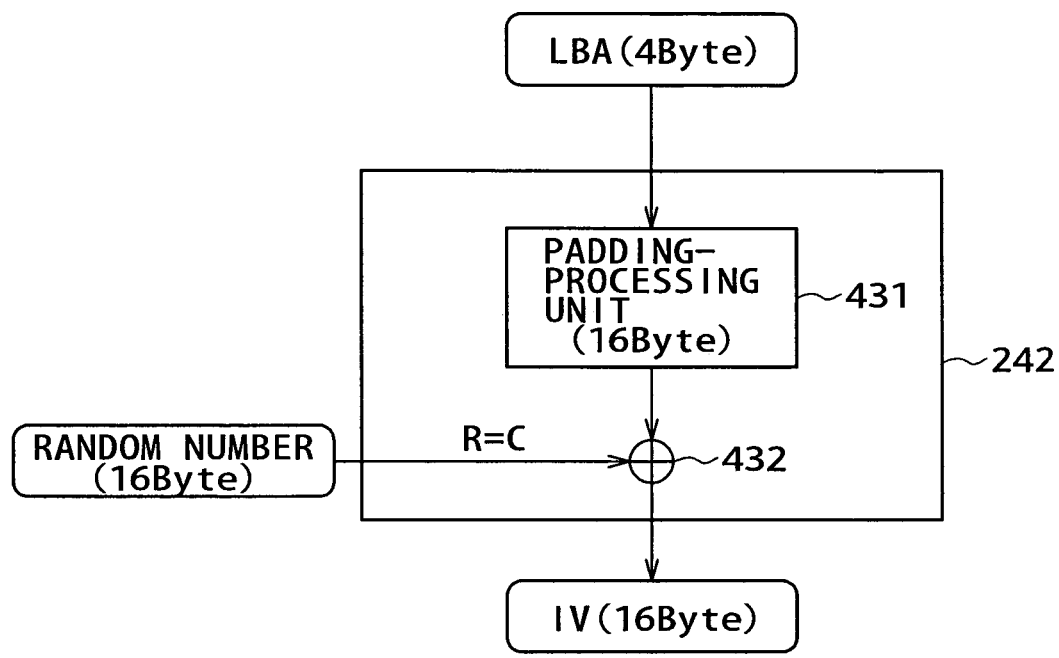
F I G. 3 0
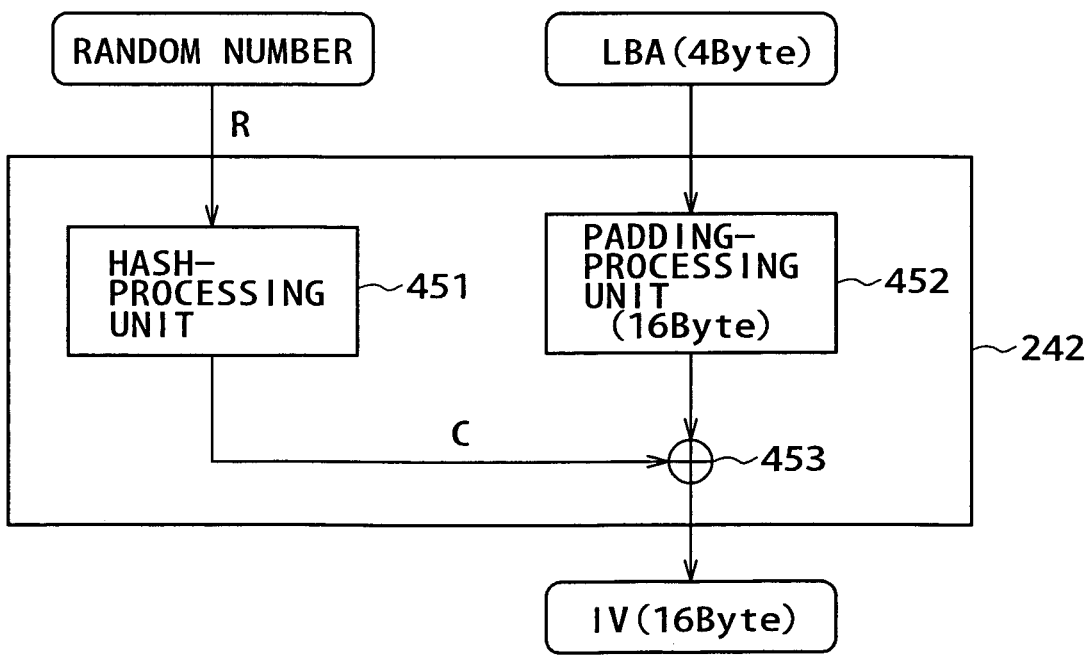

INFORMATION-PROCESSING APPARATUS, CONTROL METHOD, PROGRAM AND RECORDING MEDIUM

BACKGROUND OF THE INVENTION

The present invention relates to an information-processing apparatus, a control method, a program and a recording medium. More particularly, the present invention relates to an information-processing apparatus suitable for execution of processing related to encryption, a control method for the information-processing apparatus, a program describing the control method and a recording medium for storing the program.

Exchanges of digital data among a variety of apparatus have been becoming popular. Even if digital data is used illegally, the quality of the digital data does not deteriorate. The quality of digital data includes pictures and sounds. Thus, a countermeasure for preventing digital data from being abused is absolutely required. Such a countermeasure is disclosed in documents such as Patent Document 1.

In order to avoid misuse of digital data, the digital data is encrypted. A variety of encryption methods has been proposed. By taking a CBC (Cipher Block Chaining) method as an example, encryption and decryption techniques are explained as follows.

The CBC method, which is one of encryption techniques, is a technique for block chaining. To put it in detail, in accordance with the CBC method, a preceding block of an encrypted text is added to a current block of a clear text to be encrypted into a block of the encrypted text. FIG. 1 is a diagram showing a typical circuit for carrying an encryption process based on the CBC method.

Data to be encrypted is blocked into predetermined units each having a typical size of 16 bytes. The first block is supplied to a exclusive-or circuit 11-1, the second block following the first block is supplied to a exclusive-or circuit 11-2, the third block following the second block is supplied to a exclusive-or circuit 11-3 and so on. In this way, data blocks of the clear text are supplied sequentially to the exclusive-or circuits 11-1 to 11-N provided at N stages where N is a predetermined number.

The first block output by the exclusive-or circuit 11-1 is supplied to an encryption unit 12-1. The encryption unit 12-1 encrypts the first block supplied thereto by using a key Ek. In this way, the first block is encrypted.

The encrypted first block output by the encryption unit 12-1 is also supplied to the exclusive-or circuit 11-2 for carrying out an exclusive-or process on the first encrypted first block and the second clear block. The result of the exclusive-or process is supplied to the encryption unit 12-2 for encrypting the result by using the key Ek.

As described above, in an encryption process adopting the CBC method, an exclusive-or process is carried on an encrypted immediately-preceding block of a clear text and a current block following the immediately preceding block to give a result, which is then subjected to an encryption process using a predetermined key. The encrypted result is then subjected to an exclusive-or process in conjunction with a block following the current block. In this way, a block is chained to an immediately preceding block before being chained to an immediately succeeding block.

The second and subsequent blocks are each subjected to an exclusive-or process in conjunction with an encrypted immediately preceding block. Since no block precedes the first block, however, no block can be subjected to an exclusive-or process in conjunction with the first block. For this reason, in the configuration of the circuit for carrying the encryption process, the first block is subjected to an exclusive-or process in conjunction with an initialization vector IV.

Next, a circuit for carrying out a decryption process adopting the CBC method is explained by referring to FIG. 2.

Data encrypted as described above is blocked into predetermined units each having a typical size of 16 bytes. The first block is supplied to a decryption unit 22-1, the second block following the first block is supplied to a decryption unit 22-2, the third block following the second block is supplied to a decryption unit 22-3 and so on. In this way, data blocks of the encrypted text are supplied to the decryption units 22-1 to 22-N provided at N stages where N is a predetermined number.

The decryption units 22-1 to 22-N each decrypt a data block supplied thereto by using a key Dk. Pieces of data output by the decryption units 22-1 to 22-N are supplied to exclusive-or circuits 21-1 to 21-N associated with the decryption units 22-1 to 22-N respectively. Each of the exclusive-or circuits 21-2 to 21-N also receives a data block supplied to the one of the decryption units 22-1 to 22-N-1 at the stages preceding the exclusive-or circuits 21-2 to 21-N respectively.

As described above, in a decryption process adopting the CBC method, an exclusive-or process is carried on an encrypted immediately-preceding block of an encrypted text and a current block following the immediately preceding block but completing the decryption process to give the final decryption result of the current block.

The second and subsequent blocks output by the second and subsequent decryption units 22-2 to 22-N respectively are each subjected to an exclusive-or process in conjunction with an encrypted immediately-preceding block. Since no encrypted block precedes the first block output by the first decryption unit 22-1, however, no encrypted preceding block can be subjected to an exclusive-or process in conjunction with the first block output by the first decryption unit 22-1. For this reason, in the configuration of the circuit for carrying out the decryption process, the first block output by the first decryption unit 22-1 is subjected to an exclusive-or process in conjunction with an initialization vector IV.

For more information on the encryption and decryption processes described above, refer to Patent Document 1, i.e., Specifications of Patent No. 3252706.

As described above, in an encryption process adopting the CBC method, an initialization vector IV is added to the first block because no block preceding the first block. However, the first block can be encrypted at a stage following the exclusive-or process without adding anything to the first block, that is, without adding the initialization vector IV to the first block. In this case, however, the following problem is raised.

For example, consider a case in which an electronic mail is taken as an example. The format of an electronic mail is a pattern including a series of an addressee, a sender, a subject and a body text. When data of a clear text having such a pattern is encrypted, the data obtained as a result of encryption itself is also data of a pattern. By paying attention to such a pattern, a third party serving as an attacker is capable of decoding an encrypted text to result in parts of the clear text.

In order to solve the above problem, a clear text having a pattern needs to be encrypted into encrypted data of an encrypted text having no pattern. In order to result in an encrypted text having no pattern, an encryption process is carried out by adding an initialization vector IV. An encryption process carried out on blocks of even a clear text having a pattern by introducing an additional initialization vector IV results in an encrypted text without the same pattern. Thus, it is difficult to decode the encrypted text. In addition, by adding an initialization vector IV in an encryption process, the encryption process is capable of exhibiting an effect of avoiding a wrong doing. An example of the wrong doing is guessing an encryption key used as the only key in encryption of data having a large amount.

For the reason described above, in many cases, there is provided a configuration in which an initialization vector IV is added to the first block before carrying out an encryption process on the initialization vector IV and the first block.

By the way, in some cases, a drive for reading out data from a predetermined recording medium and a host for receiving the data from the drive authenticate each other prior to generation of a session key to be used in encryption of the data before transmission of the data. An example of the host is a personal computer. In such a situation, the CBC method described above can be adopted. In such a case, by properly updating the initialization vector IV, it will be difficult to identify that the clear data is data having a special pattern. In addition, it will also be possible to prevent the data from being replaced or interpolated.

For a case in which the drive and the host authenticate each other, for example, data is generated in the form of an initialization vector IV plus content data. Then, an encryption key is derived from a content key and the initialization vector IV. Finally, the encryption key is used as a key for encrypting the content data.

By adding an initialization vector IV with a typical size of 16 bytes to the content data read out from the recording medium as described above, however, a special sector size of typically 2,064 bytes must be brought about to a PC drive interface of 2,048 bytes, resulting in a format different from the standard one. In consequence, the addition of the initialization vector IV raises a problem of poor compatibility with the environment of the PC due to, among others, the fact that a common ATAPI device driver cannot be used. In order to solve the problem of poor compatibility with the environment of the PC, software and hardware configurations need to be changed to special ones, which raise other problems such as an increase in cost, difficulties in maintaining compatibility and more time required for carrying out processing.

SUMMARY OF THE INVENTION

It is thus an object of the present invention addressing the problems described above to enhance security even by using as many existing components as possible.

According to one aspect of the present invention, there is provided an information-processing apparatus, including:

an information acquisition unit for acquiring predetermined information from a command making a request for an operation to write data onto a predetermined recording medium or a command making a request for an operation to read out data from the predetermined recording medium;

an initialization-vector generation unit for generating an initialization vector from the information acquired by the information acquisition unit; and an encryption/decryption execution unit for encrypting or decrypting data by using the initialization-vector generated by the initialization-vector generation unit and a predetermined key.

It is possible to implement the information-processing apparatus with a configuration in which the predetermined information acquired by the information acquisition unit is an LBA (Logical Block Address).

It is also possible to implement the information-processing apparatus with a configuration further having a random-number generation unit for generating a random number wherein the initialization-vector generation unit generates an initialization vector from the information acquired by the information acquisition unit and the random number generated by the random-number generation unit.

The initialization-vector generation unit can generate an initialization vector IV typically by adoption of a method for taking an exclusive-or logical sum of a random number generated by the random-number generation unit and a value, which includes an LBA and a pad used for compensating the LBA for a word-length shortage in comparison with the initialization vector IV being generated by the initialization-vector generation unit. As a method for filling up a word-length shortage with the pad, it is possible to adopt a method based on LBA concatenation or a method of applying a hash function. As a method of generating a random number, it is possible to adopt a method of generating a random number having the same word length as the initialization vector IV and using the random number as it is or a method of generating a random number by passing the number through a hash function.

According to another aspect of the invention, there is provided a control method for controlling at least a medium-mounting apparatus on which a predetermined recording medium is mounted or an apparatus connected to the medium-mounting apparatus as a control apparatus for controlling exchanges of data with the medium-mounting apparatus. The control method provided by the present invention includes:

an information acquisition step of acquiring predetermined information from a command making a request for an operation to write data onto a predetermined recording medium or a command making a request for an operation to read out data from the predetermined recording medium;

an initialization-vector generation step of generating an initialization vector from the information acquired in processing carried out at the information acquisition step; and an encryption/decryption execution step of encrypting or decrypting data by using the initialization-vector generated in processing carried out at the initialization-vector generation step and a predetermined key.

According to further aspect of the present invention, there is provided a program of a control apparatus for controlling at least a medium-mounting apparatus on which a predetermined recording medium is mounted or an apparatus connected to the medium-mounting apparatus as an apparatus for controlling exchanges of data with the medium-mounting apparatus. The program provided by the present invention includes:

an information acquisition step of acquiring predetermined information from a command making a request for an operation to write data onto a predetermined recording medium or a command making a request for an operation to read out data from the predetermined recording medium;

an initialization-vector generation step of generating an initialization vector from the information acquired in processing carried out at the information acquisition step; and an encryption/decryption execution step of encrypting or decrypting data by using the initialization-vector generated in processing carried out at the initialization-vector generation step and a predetermined key.

A recording medium provided by the present invention can be used for storing the above-described program.

In the information-processing apparatus provided by the present invention, the control method adopted by the information-processing apparatus and the program prescribing the control method, information included in a command issued in execution of an operation carried out on a predetermined recording medium is used to generate an initialization vector to be used in an encryption or decryption process of data.

In accordance with the present invention, security can be improved.

In particular, in accordance with the present invention, security along a transmission line between a host and a drive can be improved.

In addition, it is not necessary to relay on an OS (operating system) in the host in order to improve security. It is thus possible to avoid problems such as a resulting increase in cost or resulting cumbersome processing as a consequence of improved security.

BRIEF DESCRIPTION OF THE DRAWINGS

FIG. 7 is an explanatory diagram showing the data structure of a command;

FIG. 12 is an explanatory diagram showing data flows in decryption processing carried out by a host;

FIG. 29 is a diagram showing a detailed configuration of the initialization-vector generation unit;

FIG. 30 is a diagram showing another detailed configuration of the initialization-vector generation unit;

PREFERRED EMBODIMENTS OF THE INVENTION

Before explaining embodiments of the present invention, relations between inventions described in the specification and the embodiments are exemplified as follows. The following description merely confirms the fact that the embodiments supporting the inventions explained in the specification are described in the specification. Thus, even though an embodiment that would correspond to an invention is not described in this specification, the fact that the embodiment is not described in this specification does not imply that this embodiment does not correspond to the invention. Conversely speaking, the fact that an embodiment described in this specification as an embodiment corresponding to a specific invention described in this specification does not mean that this embodiment does not correspond to an invention other than the specific invention.

In addition, the following description is not intended to cover all inventions explained in this specification. In other words, even though the following description covers inventions explained in this specification, the following description does not deny existence of inventions not claimed in this present application. That is to say, the following description does not deny existence of inventions that may be claimed in a separate application, described as amendments or added in the future.

Figure 3:
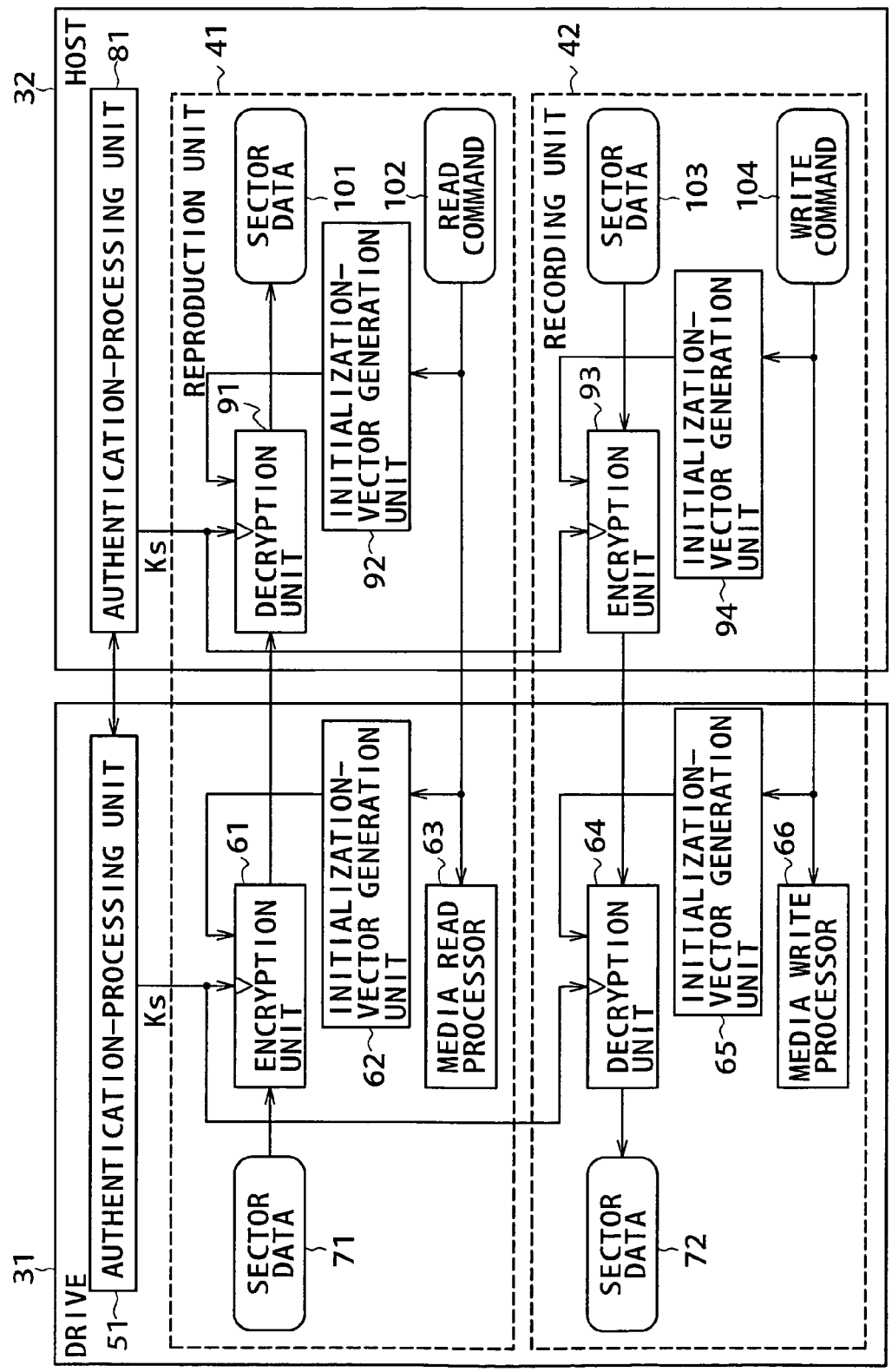
FIG. 3 is a diagram showing the configuration of an embodiment implementing a recording/reproduction apparatus provided by the present invention.
Figure 4:
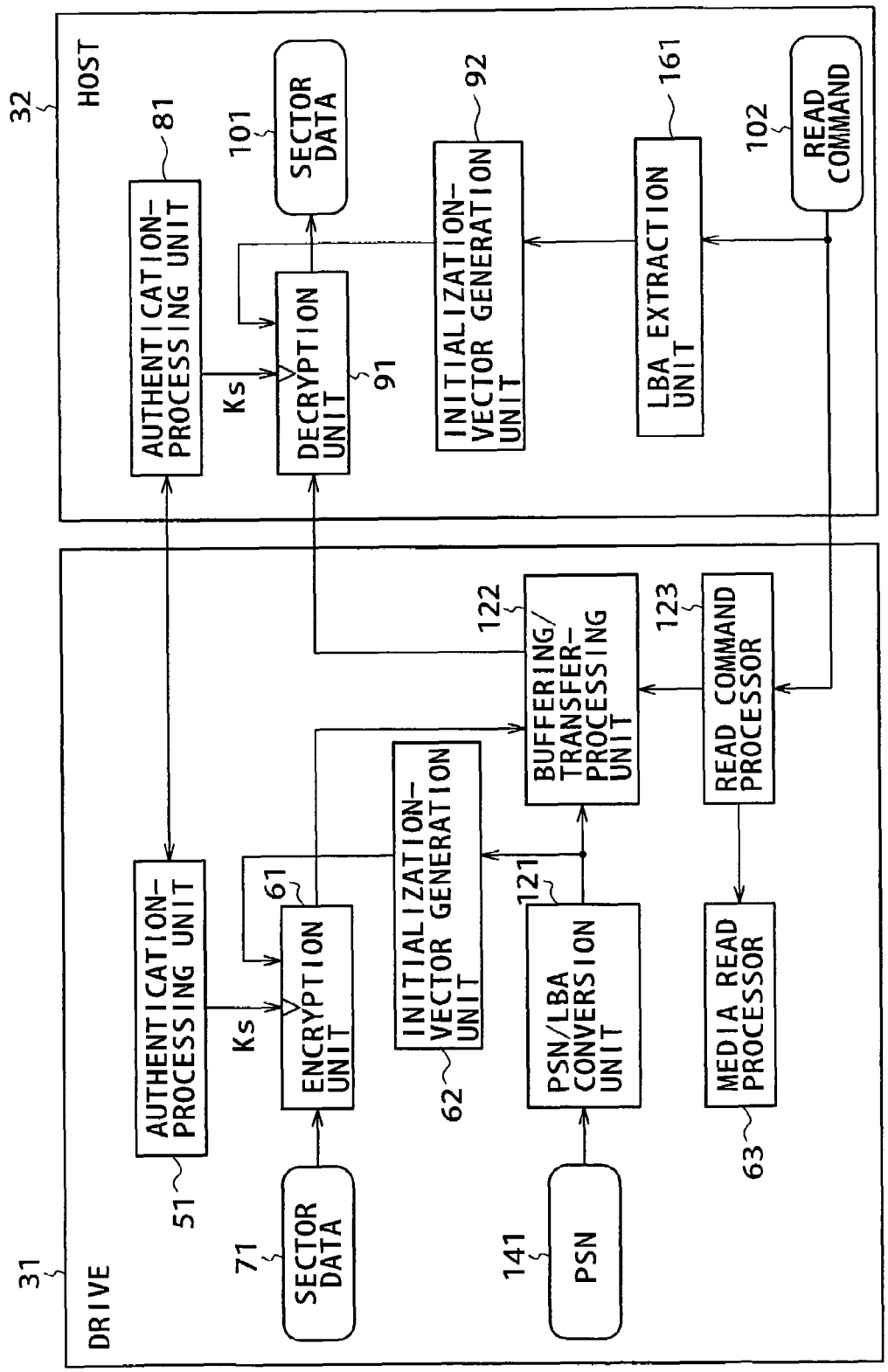
FIG. 4 is a diagram showing the configuration of a reproduction unit.

An information-processing apparatus (such as a drive 31 or a host 32, either of which is shown in FIG. 3) provided by the present invention includes:

an information acquisition unit (such as an LBA extraction unit 161 shown in FIG. 4) for acquiring predetermined information from a command (such as a write command 104) making a request for an operation to write data onto a predetermined recording medium or a command (such as a read command 102) making a request for an operation to read out data from the predetermined recording medium;

an initialization-vector generation unit (such as an initialization-vector generation unit 92 shown in FIG. 4) for generating an initialization vector from the information acquired by the information acquisition unit; and an encryption/decryption execution unit (such as a decryption unit 91 shown in FIG. 4) for encrypting or decrypting data by using the initialization-vector generated by the initialization-vector generation unit and a predetermined key.

It is possible to implement the information-processing apparatus with a configuration in which the predetermined information acquired by the information acquisition unit is an LBA (Logical Block Address).

It is possible to implement the information-processing apparatus with a configuration further having a random-number generation unit (such as a random-number generation unit 24 shown in FIG. 18) for generating a random number wherein the initialization-vector generation unit generates an initialization vector from the information acquired by the information acquisition unit and the random number generated by the random-number generation unit.

It is possible to implement the information-processing apparatus with a configuration in which the initialization-vector generation unit uses a random number passing through a hash function in processing carried out by a hash-processing unit 451 shown in FIG. 30.

A control method provided by the present invention is a control method for controlling at least a medium-mounting apparatus (such as the drive 31 shown in FIG. 3) on which a predetermined recording medium is mounted or an apparatus (such as the host 32 shown in FIG. 3) connected to the medium-mounting apparatus as an apparatus for controlling exchanges of data with the medium-mounting apparatus. The control method provided by the present invention includes:

an information acquisition step (such as a step S42 of timing charts shown in FIG. 9) of acquiring predetermined information from a command making a request for an operation to write data onto a predetermined recording medium or a command making a request for an operation to read out data from the predetermined recording medium;

an initialization-vector generation step (such as the step S42 of the timing charts shown in FIG. 9) of generating an initialization vector from the information acquired in processing carried out at the information acquisition step; and an encryption/decryption execution step (such as a step S45 of the timing charts shown in FIG. 9) of encrypting or decrypting data by using the initialization-vector generated in processing carried out at the initialization-vector generation step and a predetermined key.

A program provided by the present invention is a program of a control apparatus for controlling at least a medium-mounting apparatus on which a predetermined recording medium is mounted or an apparatus connected to the medium-mounting apparatus as a control apparatus for controlling exchanges of data with the medium-mounting apparatus. The program provided by the present invention includes:

an information acquisition step (such as the step S42 of the timing charts shown in FIG. 9) of acquiring predetermined information from a command making a request for an operation to write data onto a predetermined recording medium or a command making a request for an operation to read out data from the predetermined recording medium;

an initialization-vector generation step (such as the step S42 of the timing charts shown in FIG. 9) of generating an initialization vector from the information acquired in processing carried out at the information acquisition step; and an encryption/decryption execution step (such as the step S45 of the timing charts shown in FIG. 9) of encrypting or decrypting data by using the initialization-vector generated in processing carried out at the initialization-vector generation step and a predetermined key.

The program can be recorded onto a recording medium.

Embodiments of the present invention are described by referring to diagrams as follows.

FIG. 3 is a diagram showing the configuration of an embodiment implementing a system provided by the present invention. The system shown in FIG. 3 is a recording/reproduction apparatus capable of carrying out recording and reproduction processes. Recording media not shown in FIG. 3 is mounted on the system shown in the same figure. The recording/reproduction apparatus has a configuration including a drive 31 for reading out and writing predetermined data from and onto the mounted recording media as well as a host 32 for processing (controlling) data read out from the media and data to be written onto the media.

The recording media can be conceivably one of disc-shaped recording mediums including a CD-ROM (Compact Disc-ROM), a CD-R (Compact Disc-Recordable), a CD-RW (Compact Disc-ReWritable), a DVD-R (Digital Versatile Disc-Recordable), a DVD-RW (Digital Versatile Disc-ReRecordable), a DVD+R (Digital Versatile Disc 30 Recordable), a DVD+RW (Digital Versatile Disc+ReWritable), a DVD-RAM (Digital Versatile Disc-Random Access Memory) and a Blu-Ray Disc. In addition, these disc-shaped recording mediums do not necessarily limit the application domain of the present invention. That is to say, the application domain of the present invention includes recording mediums each having other configurations such as another recording method and another shape.

The drive 31 and the host 32 are connected to each other in such a way that data can be exchanged through a predetermined interface. As the predetermined interface, for example, an ATAPI (AT Attachment with Package Interface) can be adopted. The ATAPI is an interface conforming to a data transfer method for connecting peripheral equipment other than a hard disk to an IDE (Integrated Drive Electronics) or ATA (AT Attachment) interface. For example, by packetizing a command received from an SCSI and passing on the packetized command to the IDE interface, the ATAPI allows control of the peripheral equipment to be executed. The same command packet can also be applied to a physical interface such as a USB (Universal Serial Bus) or an IEEE1394 interface. An example of the peripheral equipment other than a hard disk is a CD-ROM drive.

To begin with, the drive 31 has an authentication-processing unit 51 whereas the host 32 includes an authentication-processing unit 81. The authentication-processing unit 51 and the authentication-processing unit 81 carry out mutual-authentication processing.

A reproduction unit 41 shown in FIG. 3 as a unit for reading out data from a predetermined recording medium includes an encryption unit 61, an initialization-vector generation unit 62, a media read processor 63, a decryption unit 91 and an initialization-vector generation unit 92. The encryption unit 61, the initialization-vector generation unit 62 and the media read processor 63 are included in the drive 31 whereas the decryption unit 91 and the initialization-vector generation unit 92 are included in the host 32.

The drive-side configuration of the reproduction unit 41 is explained as follows. As described above, the drive-side configuration includes the encryption unit 61, the initialization-vector generation unit 62 and the media read processor 63, which are included in the drive 31. The encryption unit 61 receives sector data 71 read out from the recording medium and a key Ks from the authentication-processing unit 51. The key Ks is a key to be used in an encryption process. In addition, the encryption unit 61 also receives an initialization vector IV (Initialization vector) from the initialization-vector generation unit 62. The IV is referred to hereafter as the initialization vector IV.

The encryption unit 61 encrypts the sector data 71 by using the key Ks and the initialization vector IV, supplying the result of the encryption to the decryption unit 91 employed in the host 32. Thus, data supplied by the drive 31 to the host 32 is encrypted data.

The initialization-vector generation unit 62 generates an initialization vector IV to be supplied to the encryption unit 61 by using predetermined data included in a read command 102 received from the host 32. Details of a process to generate an initialization vector IV will be described later.

Figure 1:
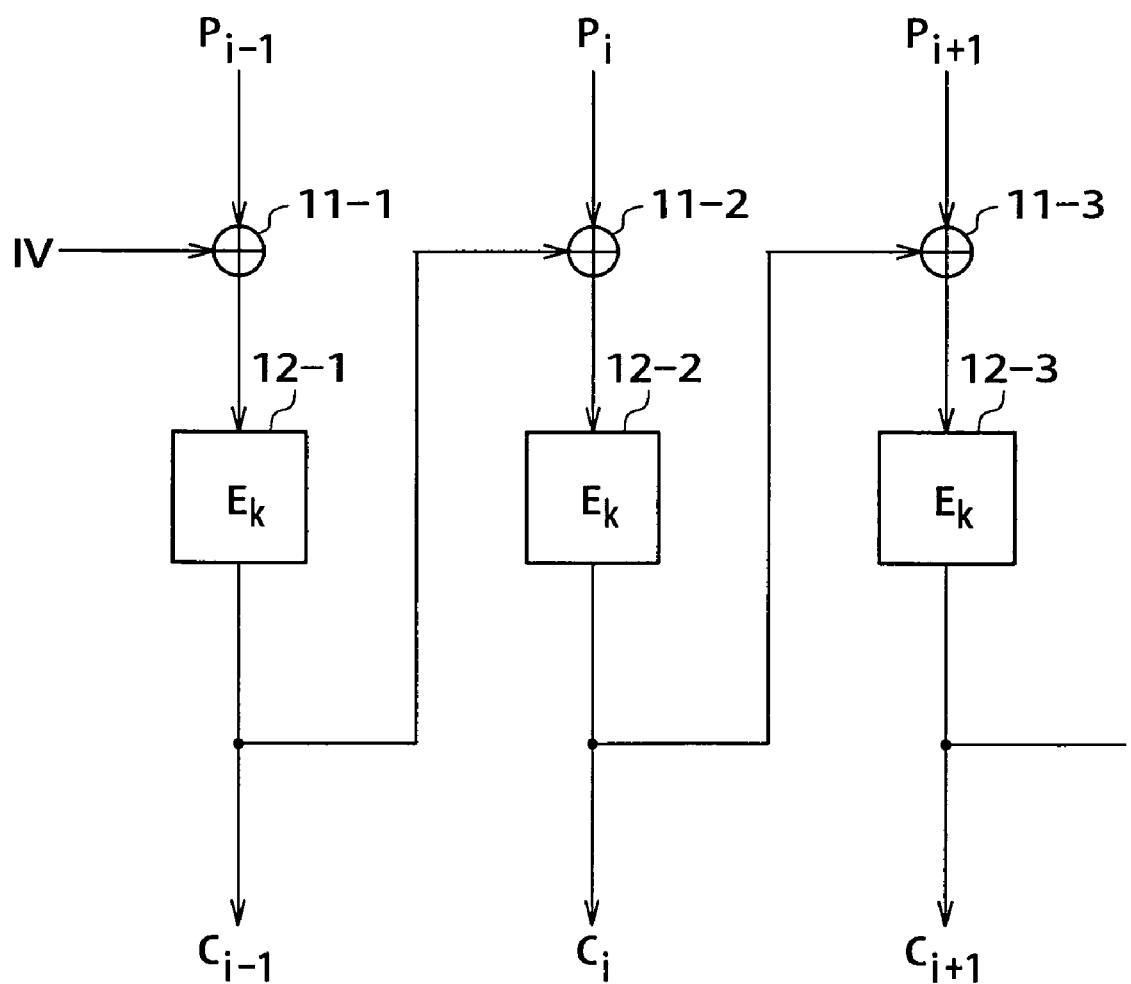
FIG. 1 is a diagram showing the configuration of a circuit for carrying an encryption process adopting a CBC (cipher block chaining) method.

It is to be noted that the encryption unit 61 has a configuration including a combination of the exclusive-or circuit 11 and the encryption unit 12 as shown in FIG. 1. Since the combination has already been explained, the explanation is not repeated in the following description in order to avoid duplications. Thus, the initialization-vector generation unit 62 generates an initialization vector IV to be supplied to the exclusive-or circuit 11-1 shown in FIG. 1. On the other hand, the key Ks received from the authentication-processing unit 51 is supplied to the encryption units 12-1 to 12-N.

By the same token, an encryption unit 93 employed in the host 32 also has the configuration shown in FIG. 1.

On the other hand, the decryption unit 91 employed in the host 32 receives the encrypted sector data 71 supplied by the drive 31 by way of an interface. The decryption unit 91 decrypts the encrypted sector data 71 by using the key Ks received from the authentication-processing unit 81 and an initialization vector IV received from the initialization-vector generation unit 92 to generate sector data 101, which is the same as the sector data 71 read out from the recording medium. The initialization-vector generation unit 92 generates an initialization vector IV basically by carrying out the same processing as the initialization-vector generation unit 62. That is to say, the initialization-vector generation unit 92 generates an initialization vector IV basically by using predetermined data included in the read command 102.

Figure 2:
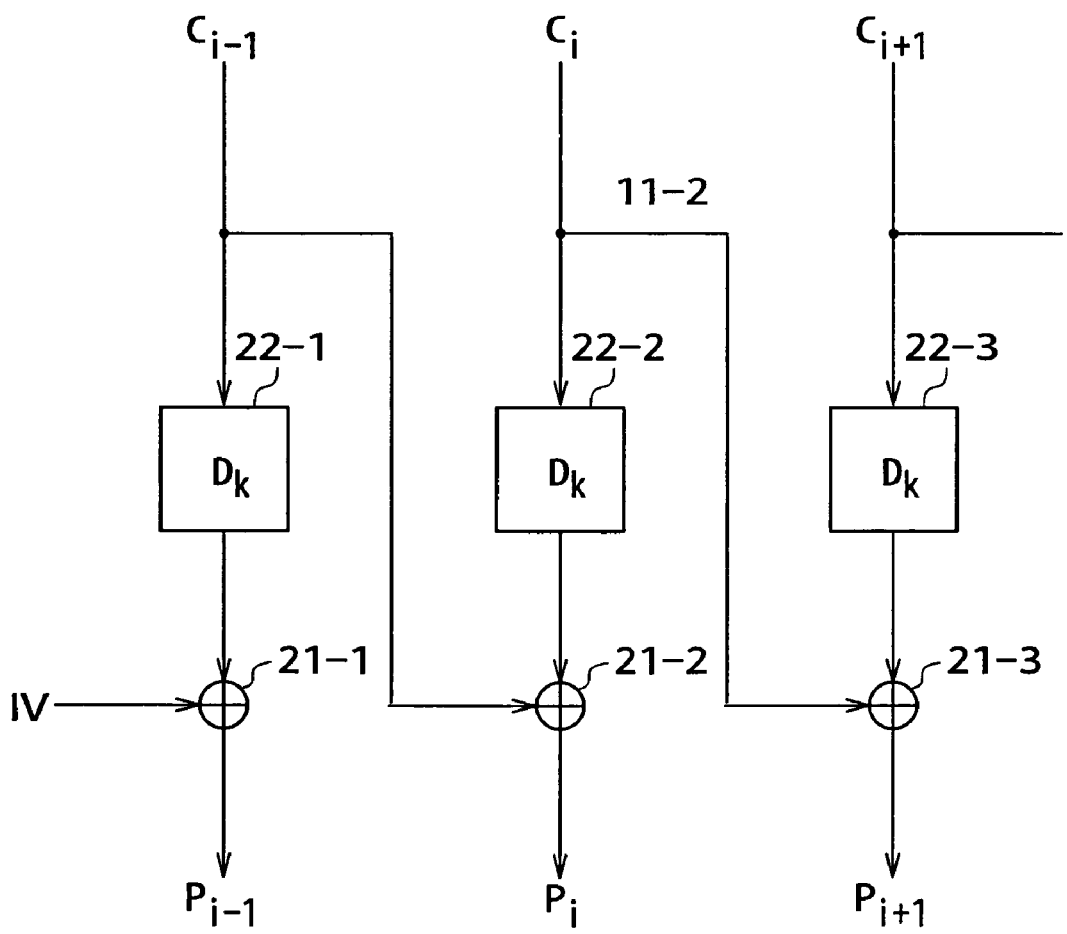
FIG. 2 is a diagram showing the configuration of a circuit for carrying a decryption process adopting the CBC method.

It is to be noted that the decryption unit 91 has a configuration including a combination of the exclusive-or circuit 21 and the decryption unit 22 as shown in FIG. 2. Since the combination has already been explained, the explanation is not repeated in the following description in order to avoid duplications. Thus, the initialization-vector generation unit 92 generates an initialization vector IV to be supplied to the exclusive-or circuit 21-1 shown in FIG. 2. On the other hand, the key Ks received from the authentication-processing unit 81 is supplied to the decryption units 22-1 to 22-N.

By the same token, a decryption unit 64 employed in the drive 31 also has the configuration shown in FIG. 2.

Next, the configuration of a recording unit 42 shown in FIG. 3 is explained. The recording unit 42 for recording data onto a predetermined recording medium includes the decryption unit 64, an initialization-vector generation unit 65, a media write processor 66, the encryption unit 93 and an initialization-vector generation unit 94. The decryption unit 64, the initialization-vector generation unit 65 and the media write processor 66 are included in the drive 31 whereas the encryption unit 93 and the initialization-vector generation unit 94 are included in the host 32.

Sector data 103 to be recorded onto a recording medium mounted on the drive 31 is supplied to the encryption unit 93 employed in the recording unit 42. In addition, the encryption unit 93 also receives the key Ks from the authentication-processing unit 81 and an initialization vector IV from the initialization-vector generation unit 94. The encryption unit 93 encrypts the sector data 103 by using the key Ks and the initialization vector IV, supplying the result of the encryption to the decryption unit 64 employed in the drive 31.

In the host 32, the initialization-vector generation unit 94 generates the initialization vector IV supplied to the encryption unit 93. To put it in detail, the initialization-vector generation unit 94 generates the initialization vector IV by using data included in a write command 104.

The write command 104 is also supplied to the media write processor 66 employed in the drive 31. When receiving the write command 104, the media write processor 66 controls an operation to write the sector data 103 onto the recording medium mounted on the drive 31. It is needless to say that the write command 104 is also supplied to the initialization-vector generation unit 65 employed in the drive 31.

Much like the initialization-vector generation unit 94, the initialization-vector generation unit 65 generates an initialization vector IV by using predetermined data included in the write command 104 and supplies the initialization vector IV to the decryption unit 64. The decryption unit 64 receives not only the initialization vector IV from the initialization-vector generation unit 65, but also the sector data 103 from the host 32 and the key Ks from the authentication-processing unit 51.

The decryption unit 64 decrypts the encrypted sector data 103 by using the key Ks received from the authentication-processing unit 51 and the initialization vector IV received from the initialization-vector generation unit 65 to generate sector data 72, which is the same as the sector data 103, to be written onto the recording medium not shown in the figure under control executed by the media write processor 66.

By the way, each of the elements shown in FIG. 3 can be implemented by either hardware or software.

The following description explains a plurality of embodiments each implementing the initialization-vector generation unit and a technique adopted by the initialization-vector generation unit to generate an initialization vector IV. First of all, a first embodiment is explained. FIG. 4 is a diagram showing a detailed configuration of the reproduction unit 41. In FIG. 4, elements identical with those shown in FIG. 3 are each denoted by the same reference numeral used in FIG. 3 and their explanations are properly omitted in order to avoid duplications. Also for other figures, elements identical with those shown in FIG. 3 are each denoted by the same reference numeral used in FIG. 3 and their explanations are properly omitted in order to avoid duplications.

The drive 31 shown in FIG. 4 has a configuration in which a PSN (Physical Sector Number) read out from the recording medium is supplied to a PSN/LBA conversion unit 121 for converting the PNA into an LBA, which is an abbreviation of a logical block address. Typically, a logical block address is included in a read command 102 to serve as an address common to the drive 31 and the host 32. Thus, the host 32 is allowed to specify a logical block address of data stored in the recording medium without being aware of the physical address of the data on the recording medium. A read command 102 includes an LBA, which is a logical address of a location on the recording medium. An LBA of data is not the actual physical address of a location at which the data is stored on the recording medium. The PSN/LBA conversion unit 121 carries out processing to convert a PSN read out from the recording medium as a PSN showing a physical address into a logical address known by both the drive 31 and the host 32.

The configuration of the drive 31 also includes a buffering/transfer-processing unit 122 for carrying out processing to temporarily store sector data 71 encrypted by the encryption unit 61 in a buffer and transferring the sector data 71 from the buffer to the host 32. By including the buffering/transfer-processing unit 122 in the configuration, it is generally possible to carry out a read-ahead operation to read data from the recording medium before a read command 102 is actually received.

In the configuration allowing a read-ahead operation to be carried out, a read command 102 issued by the host 32 as a request for an operation to read out data from the recording medium can be executed by incurring practically negligible time to make an access to the recording medium in the drive 31 since the data has been buffered in the buffering/transfer-processing unit 122. That is to say, the continuous read speed can be increased.

The drive 31 also employs a read-command processor 123 for processing a read command 102 received from the host 32. In this configuration, the read-command processor 123 supplies a result of the processing to the buffering/transfer-processing unit 122 and the media read processor 63.

The host 32 has a configuration including a LBA extraction unit 161 for extracting an LBA from a read command 102 and supplying the LBA to the initialization-vector generation unit 92. The reproduction unit 41 shown FIG. 4 has a configuration in which an initialization vector IV is generated from the LBA included in the read command 102.

Figure 5:
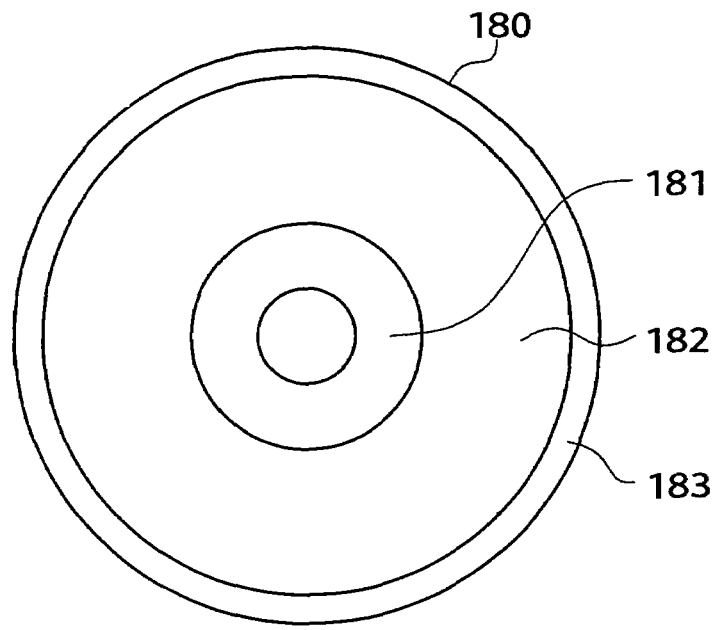
FIG. 5 is an explanatory diagram showing the structure of data recorded on a disc-shaped recording medium.

The following description explains a recording medium from which sector data 71 and a PSN 141 of the sector data 71 are read out. FIG. 5 is an explanatory diagram showing the structure of data recorded on a disc-shaped recording medium. As shown in FIG. 5, the recording area of the disc 180 includes a lead-in area 181 on an innermost circumference, a user-data area 182 enclosing the lead-in area 181 and a lead-out area 183 enclosing the user-data area 182.

Physical specifications of a DVD-ROM disc representing read-only recording mediums are defined in "ECMA-267: 120 mm DVD-Read Only Disk". In accordance with these specifications, a PSN is recorded in the header of each sector data having a length of 2 KB.

Physical specifications of a DVD+RW disc representing rewritable recording mediums are defined in "ECMA-337: Data Interchange on 120 mm and 80 mm Optical Disk Using 30 RW Format Capacity 4,7 and 1,6 GB per Side". In accordance with these specifications, there is provided a mechanism in which a PSN on an unrecorded disk is recorded in an ADIP (Address in Pre-groove) and, in an operation to write sector data having a size of 2 KB onto a disc, the same PSN as the one recorded in the ADIP is also recorded in the header of the sector data so as to establish compatibility with the DVD-ROM.

In accordance with DVD specifications, the lead-in area 181 ends at a PSN of 02FFFFh and the user-data area 182 starts at a PSN of 030000h. The PSN of 03000h is defined as an LBA of 000000h. As the address conversion method adopted by the PSN/LBA conversion unit 121, a method for a variety of optical disk mediums is described in an INCITS T10 WORKING DRAFT with a title of "MultiMedia Command Set-4 (MMC-4)."

The user-data area 182 is used as an area for recording contents themselves. The contents include audio data, still-picture data, video data tracks and game data. The sector data 71 that the user can write and read out with a high degree of freedom is sector data in the user-data area 182. The lead-out area 183 serves as an area at the outer end of the user-data area 182.

Figure 6:
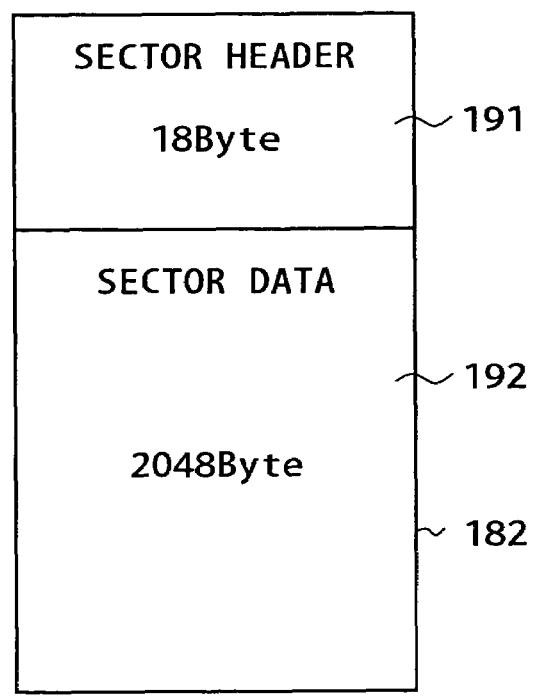
FIG. 6 is an explanatory diagram showing the configuration of a user-data area on the disc-shaped recording medium.

The lead-in area 181, the user-data area 182 and the lead-out area 183, which form the recording area of the disc 180, each include units each including a sector header 191 and sector data 192 as shown in FIG. 6. The sector header 191 is information with a size of 18 bytes whereas the sector data 192 is data with a size of 2,048 bytes. A plurality of combinations each including a sector header 191 and a sector data 192 is recorded in each of the lead-in area 181, the user-data area 182 and the lead-out area 183.

Data read out from such a disc 180 is supplied to the drive 31. The host 32 transfers a command like one shown in FIG. 7 to the drive 31 in order to control the drive 31. Details of the command are described in the INCITS T10 WORKING DRAFT with a title of "MultiMedia Command Set-4 (MMC-4)." The command shown in FIG. 7 has the same format as the read command 102 and the write command 104. Some fields included in the command shown in FIG. 7 as information referred to in the following descriptions are described as follows.

An operation code is a code indicating whether the command is a read command 102 or a write command 104. Thus, by referring to the operation code, the drive 31 receiving the command from the host 32 is capable of determining whether the command is a read command 102 or a write command 104. The operation code is a field having a length of 1 byte.

A logical block address specified in a read command 102 is the start logical address of an area from which data is to be read out. On the other hand, a logical block address specified in the write command 104 is the start logical address of an area into which data is to be written. The logical block address is a field having a length of 4 bytes.

In the case of a read command 102, a transfer length is the number of sectors from which data is to be read out. In the case of a write command 104, on the other hand, the transfer length is the number of sectors into which data is to be written. The transfer length is a field having a length of 4 bytes.

In this embodiment, an initialization vector IV is generated from one of the read command 102 and the write command 104, which each have fields described above.

Figure 8:
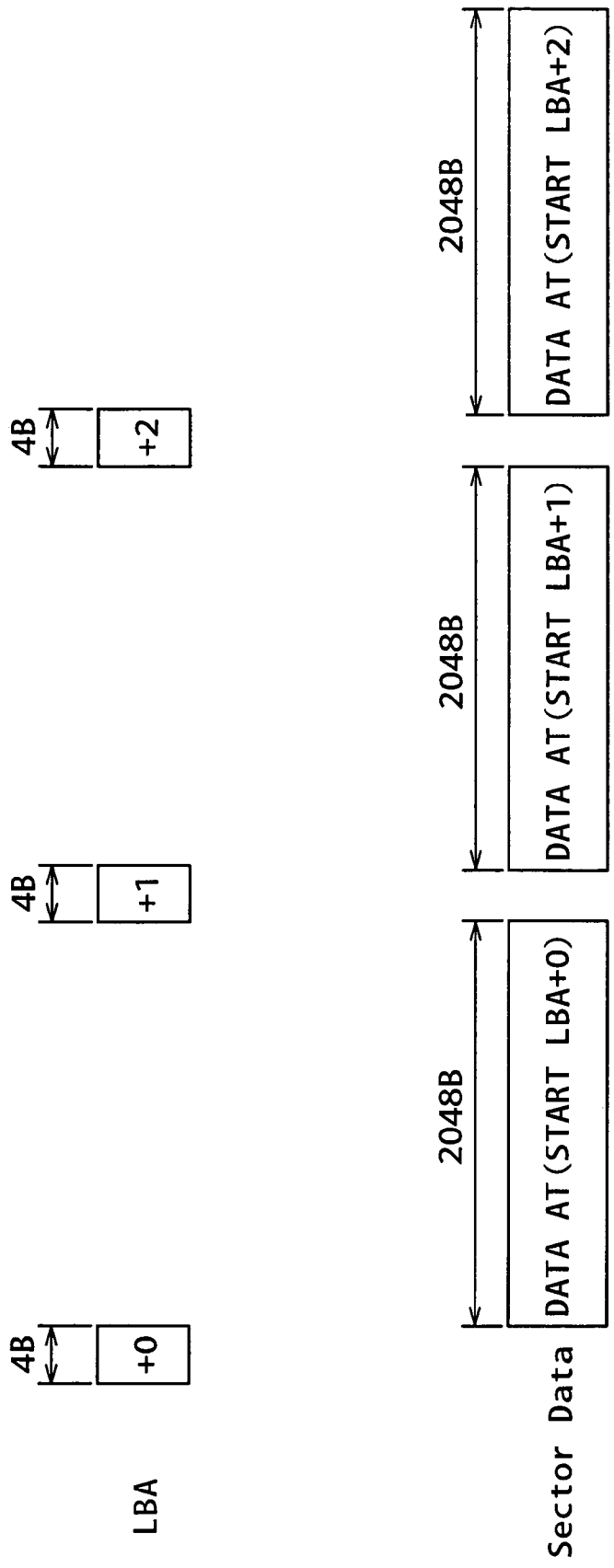
FIG. 8 is an explanatory diagram showing a relation between an LBA (logical block address) and sector data.

A relation between the LBA and the sector data is explained by referring to FIG. 8. As described above, the LBA is included in a read command 102 and a write command 104. In the case of a read command 102, a logical block address is the start logical address of an area from which data is to be read out. The drive 31 reads out data at (the start LBA+0) as the first sector data and transfers the data to the host 32. Assume that the transfer length included in the read command 102 is 3. In this case, the drive 31 continuous the read operation by reading out data at (the start LBA+1) as the second sector data and transfers the data to the host 32. Finally, the drive 31 reads out data at (the start LBA+2) as the third sector data and transfers the data to the host 32, ending the execution of the read command 102.

Since data read out from the disc 180 is sector data 192 shown in FIG. 6, the number of bytes is 2,048. As described above, in this configuration, an LBA specifies a first piece of sector data having a size of 2,048 bytes and the transfer length specifies the number of pieces of such sector data.

Figure 9:
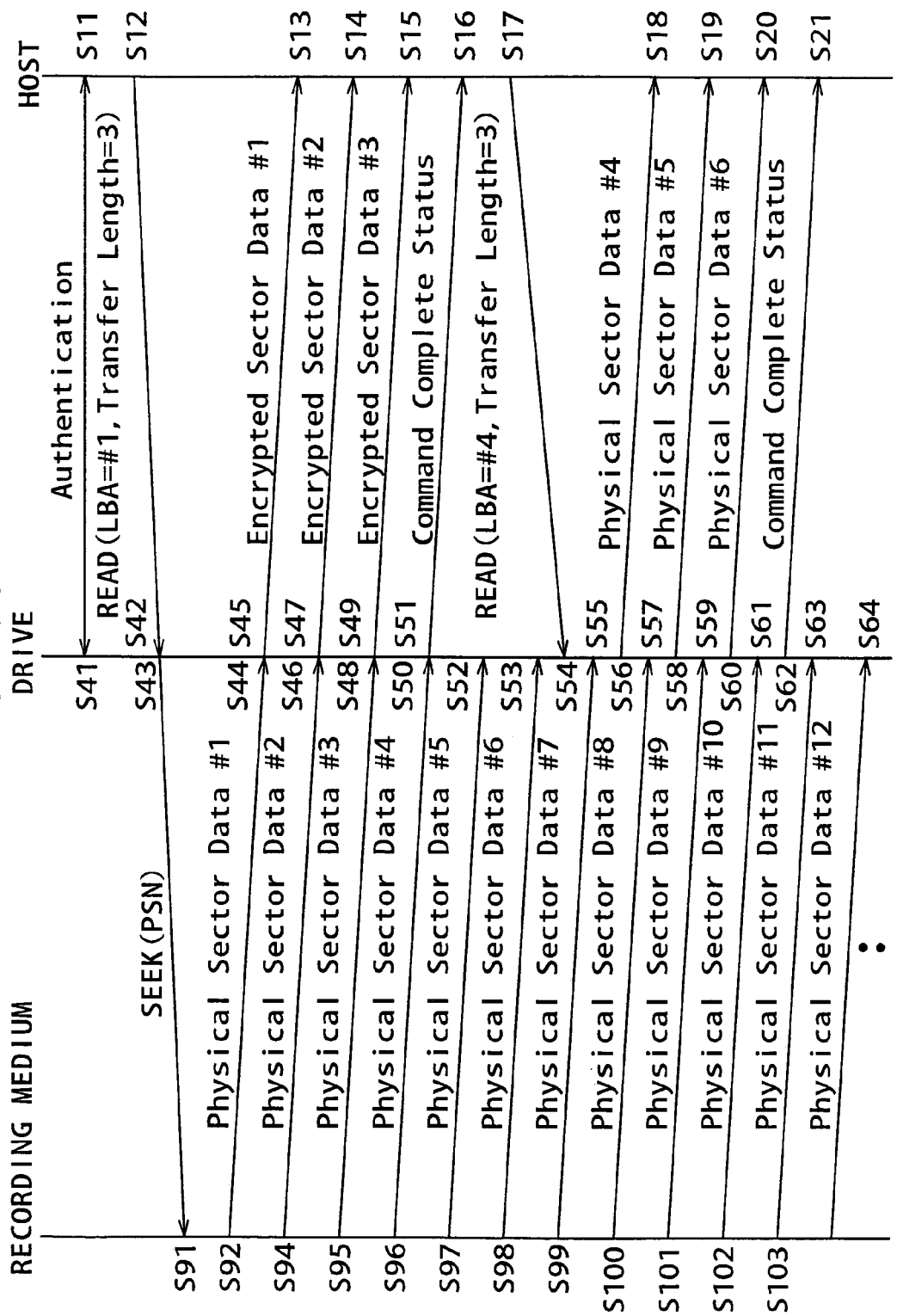
FIG. 9 shows timing charts referred to in explanation of operations carried out by the reproduction unit.

First of all, by referring to timing charts shown in FIG. 9, the following description explains an outline of processing carried out by the reproduction unit 41 shown in FIG. 4. At steps S1 and S41, the host 32 and the drive 31 respectively authenticate each other. If the mutual authentication process is completed normally, pieces of processing are carried out at next steps. As a result of the mutual authentication process, the authentication-processing unit 51 employed in the drive 31 and the authentication-processing unit 81 employed in the host 32 generate a shared key Ks.

At a step S12, the host 32 issues a read command 102 having the format shown in FIG. 7. In this command, the LBA is set at #1 and the transfer length is set at 3. Of course, the operation code is set at a value indicating that this command is a read command 102.

The read command 102 with its fields set at the values described above is supplied to the LBA extraction unit 161. In this case, the LBA extraction unit 161 extracts an LBA of #1 and supplies the LBA to the initialization-vector generation unit 92. The initialization-vector generation unit 92 generates an initialization vector IV by using the LBA of #1 or data of #1. Here, the description does not go beyond a statement merely saying that the initialization-vector generation unit 92 generates an initialization vector IV by using the LBA of #1 or data of #1 since details of the generation of an initialization vector IV will be described later.

At a step S42, the read command 102 issued in processing carried out at the step S12 is also supplied to the read-command processor 123 employed in the drive 31. The read-command processor 123 refers to the operation code of the command supplied thereto and recognizes the command as a read command 102. Then, the read-command processor 123 refers to the logical block address of the read command 102 to recognize #1 as the LBA. Finally, the read-command processor 123 refers to the transfer length of the read command 102 to find out that the transfer length is 3.

Subsequently, the read-command processor 123 supplies the transfer-start LBA of #1 and the transfer length of 3 to the buffering/transfer-processing unit 122. On the basis of the transfer-start LBA of #1 and the transfer length of 3, the buffering/transfer-processing unit 122 sets the number of sectors to be transferred at 3 and sets the start of the transfer at the LBA of #1.

In addition, the read-command processor 123 also supplies the transfer-start LBA of #1 to the media read processor 63. The media read processor 63 controls processing to read out data from the recording medium. In the execution of this control, the media read processor 63 acquires a PSN corresponding to the LBA specified in the read command 102 by carrying out an LBA/PSN process not shown in the figure.

That is to say, a read LBA specified in the read command 102 is converted into a PSN. The read LBA is an LBA of a logical sector or a group of logical sectors for recording data to be read out from the recording medium such as the disc 180 shown in FIG. 5.

The read LBA specified in the read command 102 is converted into a PSN in the drive 31 because of the following reasons. In the first place, the recording area of the recording medium such as an optical disk is divided into predetermined-size physical sectors, which are each allocated to a logical sector. In the second place, an external apparatus such as the host 32 specifies a logical sector (or an LBA), which data is to be read out from or written into, and the drive 31 reads out data or writes data from or into a physical sector (or a PSN) allocated to the logical sector.

It is to be noted that physical sectors of the user-data area 182 of the disc 180 are sequentially allocated to logical sectors having sequential logical-sector numbers by taking a physical sector having a certain physical-sector number as a reference. The user-data area 182 of the disc 180 is an area available to the user. A typical method for address conversion is described in an INCITS T10 WORKING DRAFT with a title of "MultiMedia Command Set-4 (MMC-4)."

After the LBA is converted into a PSN, in processing carried out at a step S43, the recording medium is searched for a location pointed to by the PSN obtained as a result of the address conversion. Then, processing is carried out to move a pickup to the location resulting from the search of the recording medium. The location on the recording medium is a location from which data is to be read out.

At a step S92, the data recorded at the LBA of #1 is read out from the recording medium. In this case, physical sector data #1 is read out from the LBA of #1 as sector data 71. Then, at a step S44, the sector data 71 read out from the recording medium is supplied to the encryption unit 61 and, at the same time, a PSN 141 for the sector data 71 is supplied to the PSN/LBA conversion unit 121.

An LBA output by the PSN/LBA conversion unit 121 is supplied to the initialization-vector generation unit 62, which generates an initialization vector IV by using the LBA. At the same time, the LBA is also supplied to the buffering/transfer-processing unit 122, which then prepares to receive sector data 71 for the LBA from the encryption unit 61.

The encryption unit 61 also receives a key from the authentication-processing unit 51 and the initialization vector IV from the initialization-vector generation unit 62. By using the key and the initialization vector IV, the encryption unit 61 encrypts the sector data 71. In processing carried out at the step S45, the encrypted sector data 71 is supplied to the decryption unit 91 employed in the host 32 by way of buffering/transfer-processing unit 122. In the timing charts shown in FIG. 9, the encrypted sector data 71 referred to as encrypted sector data #1.

The decryption unit 91 decrypts the encrypted sector data 71 by using the key Ks received from the authentication-processing unit 81 and an initialization vector IV received from the initialization-vector generation unit 92 to generate sector data 101, supplying the sector data 101 generated in this way to any ones of application software, a display unit and a speaker, which are not shown in the figure.

Thereafter, the processing described above is carried out repeatedly to transfer data from the recording medium to the host 32 by way of the drive 31. To be more specific, pieces of physical sector data #2 to #12 are read out from the recording medium in processing carried out at steps S93 to S103 respectively. To put it in detail, the pieces of physical sector data #2 to #12 are read out sequentially and consecutively from the recording medium in accordance with search control executed by the drive 31 and supplied to the drive 31. The drive 31 sequentially receives the pieces of physical sector data #2 to #4 in processing carried out at steps S46, S48 and S50 respectively to encrypt and supply these data to the host 32 in accordance with a request of the host 32.

At a step S15, the drive 31 supplies the last sector data requested by the host 32 at the step S12 to the host 32. The last sector data is physical sector data #3 shown in the figure. As the host 32 receives the last sector data at a step S15, at a step S51, the drive 31 transmits command complete status to the host 32. This is because, in this case, the transfer length is set at 3 and, at the point of time the processing of the step S15 is carried out, three pieces of sector data, i.e., physical sector data #1, physical sector data #2 and physical sector data #3, have been transmitted from the drive 31 to the host 32. Thus, the command complete status transmitted by the drive 31 to the host 32 informs the host 32 that the requested data has been transmitted or transferred.

It is to be noted that, in spite of the fact that the drive 31 transmits the command complete status to the host 32, the drive 31 continues the operation to read out pieces of sector data from the recording medium. The pieces of data read out from the recording medium are sequentially encrypted by the encryption unit 61 and buffered in the buffering/transfer-processing unit 122.

In processing carried out at a step S16, the host 32 receives the command complete status. Then, at the next step S17, the host 32 issues a new read command 102. The read command 102 issued at the step S17 specifies an LBA of #4 and a transfer length of 3. In response to such a read command 102, physical sector data #4 buffered in the buffering/transfer-processing unit 122 at the step S50 is supplied to the host 32 at a step S55.

As described above, processing is repeated to sequentially supply data read out by the drive 31 from the recording medium to the host 32 when the host 32 issues a read command 102. Pieces of processing carried out at the step S50 and subsequent steps in the drive 31 as well as a step S18 and subsequent steps in the host 32 are basically the same as the pieces of processing carried out at the steps S44 to S49 and the step S51 in the drive 31 as well as the steps S13 to S16 in the host 32 respectively. Since the pieces of processing carried out at the steps S44 to S49 and the step S51 as well as the steps S13 to S16 have been described earlier, the descriptions are properly omitted in order to avoid duplications.

Figure 10:
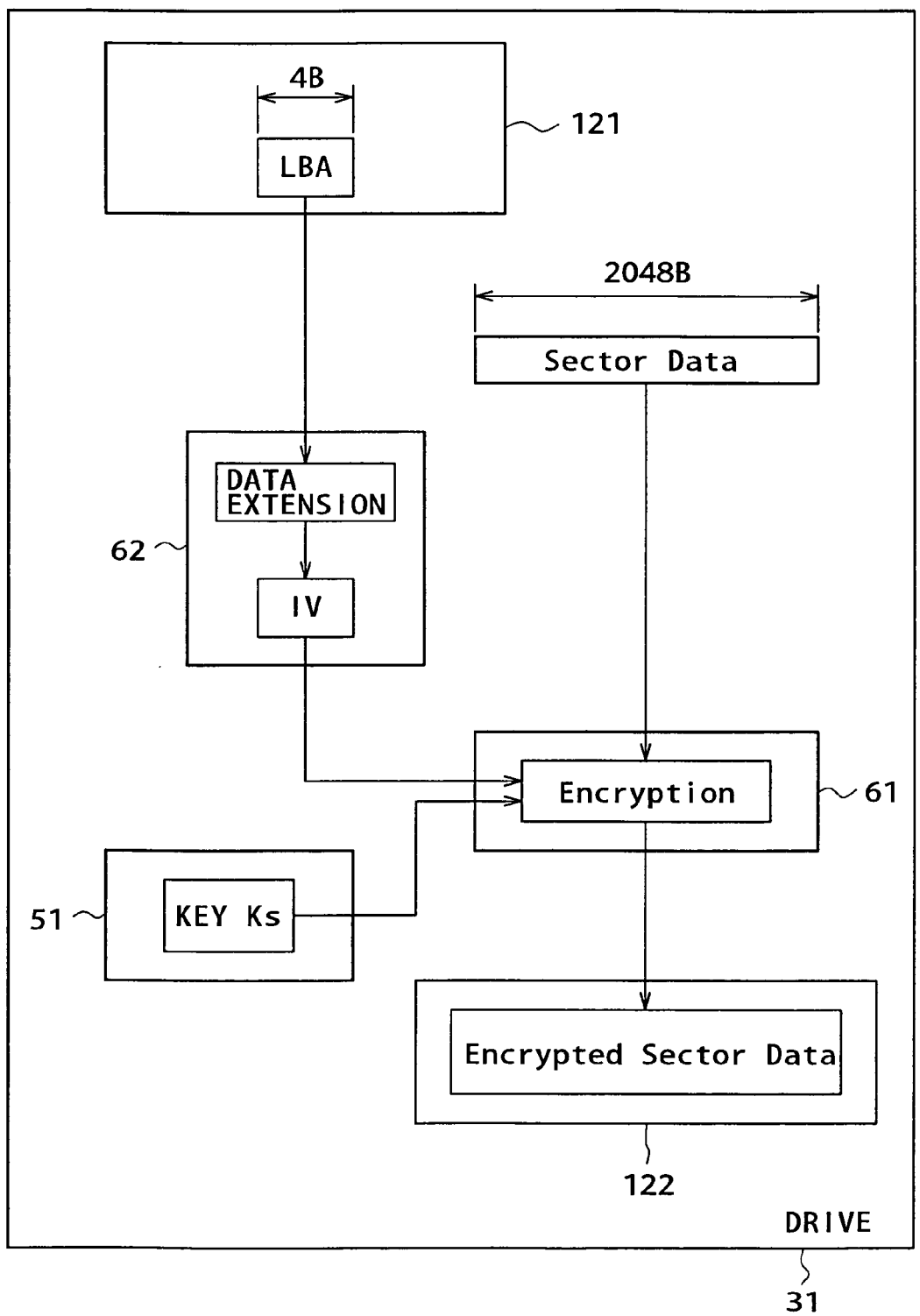
FIG. 10 is an explanatory diagram showing data flows in encryption processing carried out by a drive.

Processing carried out by the drive 31 and flows of data in the processing are explained again by referring to FIG. 10. First of all, the PSN/LBA conversion unit 121 supplies an LBA having a length of 4 bytes to the initialization-vector generation unit 62. The initialization-vector generation unit 62 extends the LBA to data with a size of 16 bytes typically by using a hash function and outputs the data as an initialization vector IV. The initialization vector IV is then supplied to the encryption unit 61.

The encryption unit 61 also receives a key Ks from the authentication-processing unit 51. Thus, the encryption unit 61 receives the initialization vector IV and the key Ks. In addition, the encryption unit 61 also receives sector data having a size of 2,048 bytes as data to be encrypted. The encryption unit 61 encrypts the sector data having a size of 2,048 bytes to result in encrypted sector data, which is buffered in the buffering/transfer-processing unit 122.

As described above, the encryption unit 61 receives sector data having a size of 2,048 bytes and encrypts the sector data to result in encrypted sector data. If the encryption unit 61 encrypts the sector data by adoption of a CBC (Cipher Block Chaining) method, for example, the sector data is actually divided into block units each having a length of 16 bytes, being encrypted and output in block units.

Figure 11:
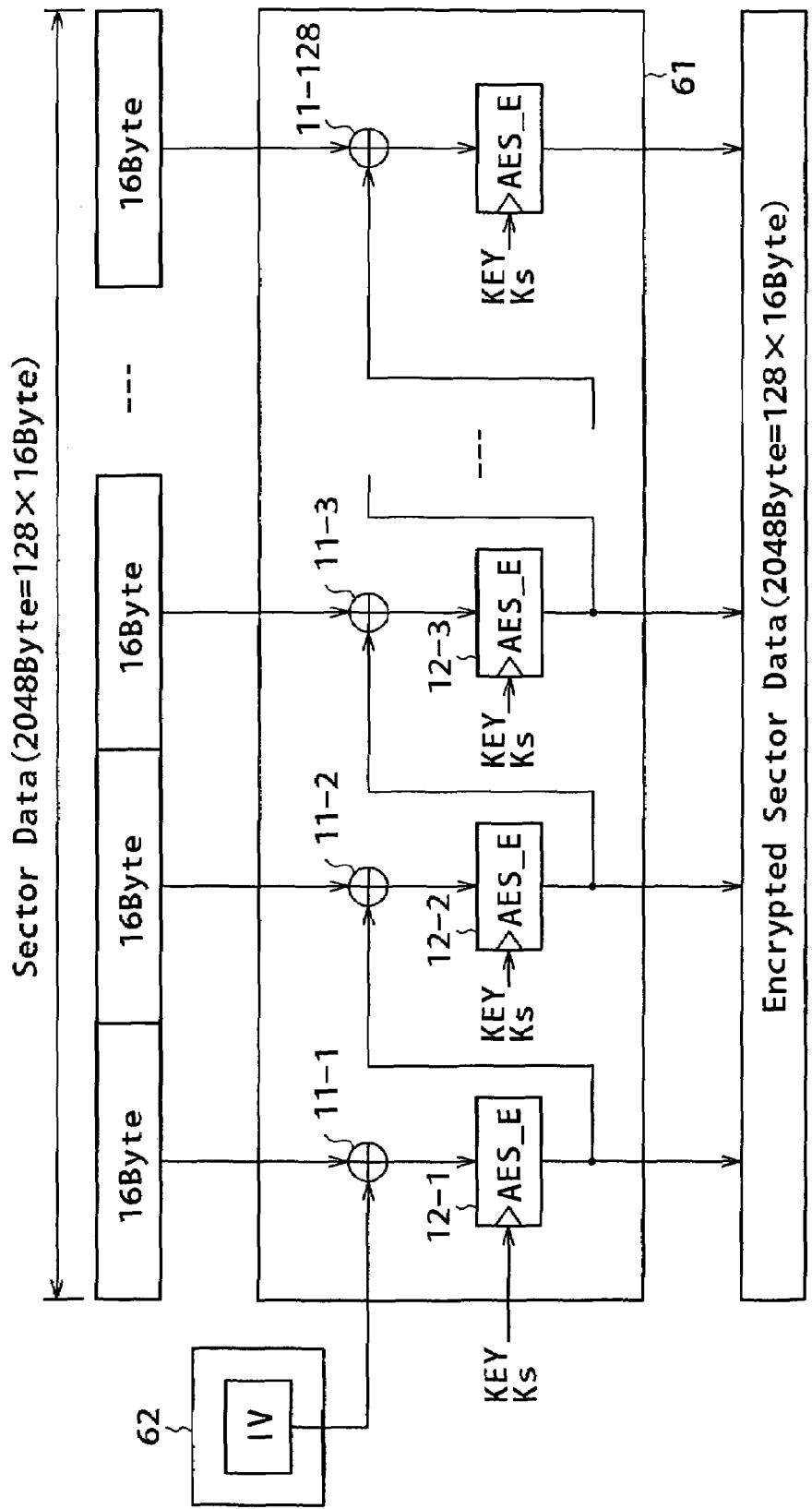
FIG. 11 is a diagram showing a detailed configuration of an encryption unit.

FIG. 11 is a diagram showing a typical internal configuration of the encryption unit 61 and flows of data in the configuration for a case in which the encryption unit 61 encrypts data on the basis of the CBC method. Much like the encryption circuit described earlier by referring to FIG. 1, the internal configuration is a plurality of combinations each including an exclusive-or circuit and an encryption unit. Thus, in FIG. 11, components identical with their counterparts employed in the encryption circuit shown in FIG. 1 are denoted by the same reference numerals as the counterparts in the following description.

As shown in FIG. 11, sector data having a length of 2,048 bytes is divided into data blocks each having a size of 16 bytes. As a result, the sector data is divided into 128 data blocks each having a size of 16 bytes. As already explained earlier by referring to FIG. 1, the data blocks are supplied to their respective exclusive-or circuits 11-1 to 11-128 and pieces of data output by the exclusive-or circuits 11-1 to 11-128 are supplied to their respective encryption units 12-1 to 12-128.

As a result of encryption, the encryption units 12-1 to 12-128 output pieces of encrypted sector data to the buffering/transfer-processing unit 122. Pieces of data output by the encryption units 12-1 to 12-127 are supplied to the exclusive-or circuits 11-2 to 11-128 respectively at the stages following the encryption units 12-1 to 12-127 respectively. Since there is no encryption unit at a stage preceding the exclusive-or circuit 11-1, however, no data is supplied to the exclusive-or circuit 11-1 from the preceding stage. Thus, in this internal configuration, an initialization vector IV generated by the initialization-vector generation unit 62 is supplied to the exclusive-or circuit 11-1.

Since the supplied initialization vector IV includes an LBA specified in the read command 102 as the LBA of a sector, every time a read command 102 is issued, an initialization vector IV is generated for a sector pointed to by an LBA specified in the read command 102. As an example, refer again to the timing charts shown in FIG. 9. The LBA of a read command 102 issued by the host 32 at the step S12 is #1 but the LBA of a read command 102 issued by the host 32 at the step S17 is #4. Thus an initialization vector IV generated by using the value #1 is naturally different from an initialization vector IV generated by using the value #4.

In addition, an initialization vector IV is generated not by using an LBA as it is. Instead, an initialization vector IV is generated by using a value obtained as a result of applying a hash function or the like to an LBA. To put it in detail, an initialization vector IV is generated through vector generation using an exclusive-or logical sum containing a data-extension random number. In this way, the probability that the same initialization vector IV as a previous initialization vector IV is generated can be reduced as will be explained later in detail. Even if the same sector data is encrypted at two different times, results of encryption will be different from each other since an initialization vector IV used at one of the times is different from an initialization vector IV used at the other time. This is because the probability that the same initialization vector IV as a previous initialization vector IV is generated can be reduced. In addition, it is possible to prevent sector data prior to encryption from being inferred from encrypted data by typically decoding the encrypted data.

On the top of that, by generating an initialization vector IV from a parameter included in a read command 102, it is also possible to avoid a problem that an existing interface can no longer be utilized. Examples of the existing interface are an ATAPI device driver and a PC driver interface for carrying out processing typically in 2,048-byte units. That is to say, by applying the present invention in generation of an initialization vector IV, an initialization vector IV having the characteristics described above can be generated without modifying specifications of the existing interface such as the ATAPI.

Next, processing carried out by the host 32 and flows of data in the processing are explained again by referring to FIG. 12. First of all, the LBA extraction unit 161 extracts an LBA having a length of 4 bytes from a read command 102 and supplies the LBA to the initialization-vector generation unit 92. The initialization-vector generation unit 92 generates an initialization vector IV by extending the LBA to data with a size of 16 bytes by adoption of typically a hash function.

A technique adopted by the initialization-vector generation unit 92 to generate an initialization vector IV is basically the same as the technique adopted by the initialization-vector generation unit 62 employed in the drive 31. That is to say, if the initialization-vector generation unit 62 generates an initialization vector IV by using a hash function, for example, the initialization-vector generation unit 92 also generates an initialization vector IV by using the hash function. The initialization vector IV generated by the initialization-vector generation unit 92 is supplied to the decryption unit 91.

The decryption unit 91 also receives a key Ks from the authentication-processing unit 81. This key Ks is the same as the key Ks supplied by the authentication-processing unit 51 employed in the drive 31 to the encryption unit 61. A key generated in an authentication process can be used as the key Ks.

As described above, the initialization vector IV and the key Ks are supplied to the decryption unit 91. In addition, the decryption unit 91 also receives encrypted sector data with a size of 2,048 bytes as sector data to be decrypted. Sector data with a size of 2,048 bytes is output by the decryption unit 91 as a result of decryption and supplied to typically application software and/or a display unit, which are not shown in the figure.

As described above, the decryption unit 91 receives data having a size of 2,048 bytes, decrypts the data and outputs a result of the decryption. Much like the encryption unit 61, typically, the decryption unit 91 adopts the CBC (Cipher Block Chaining) method in the decryption process. In this case, the data is actually divided into block units each having a length of 16 bytes, being encrypted and output in block units.

Figure 13:
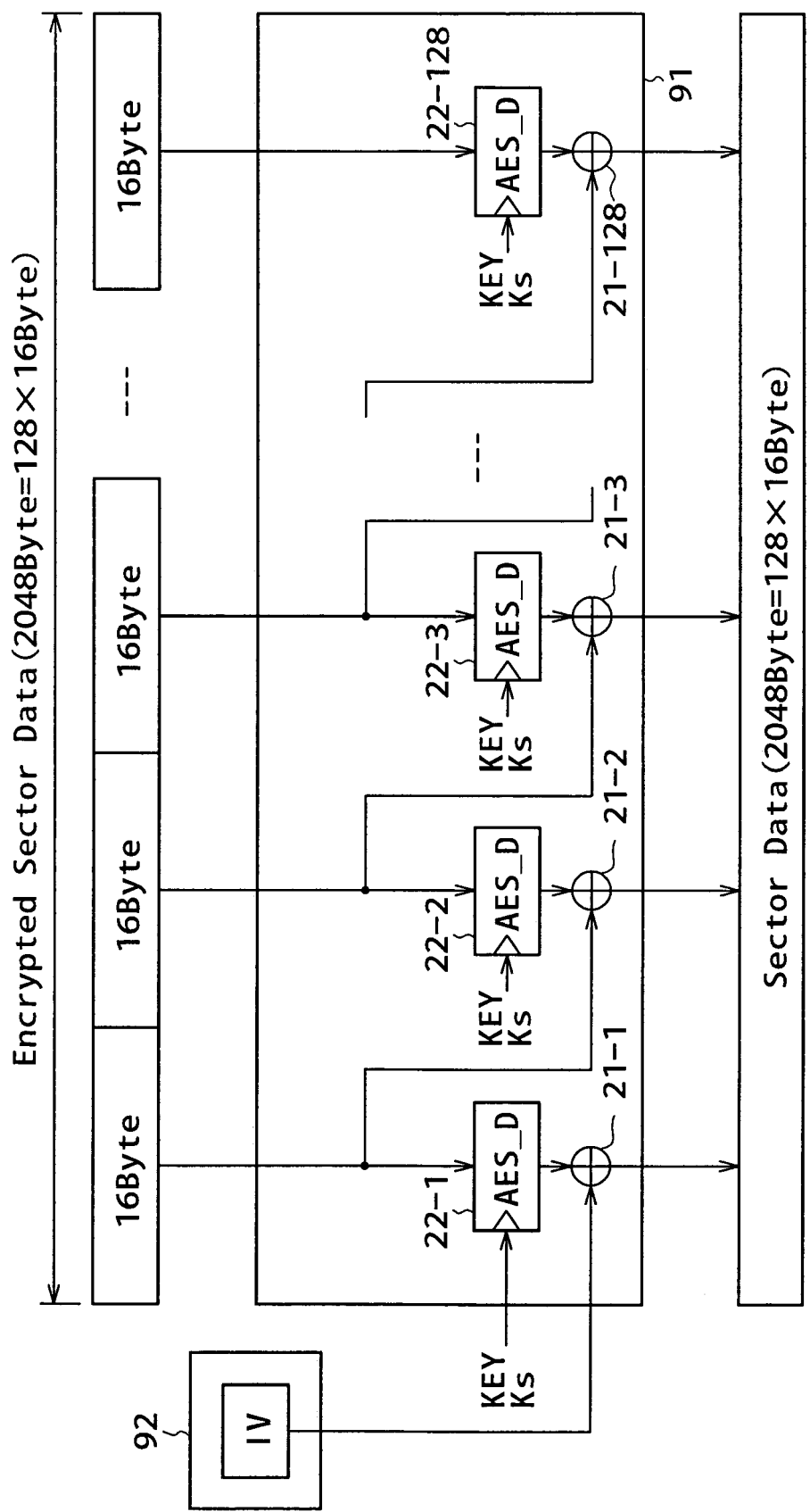
FIG. 13 is a diagram showing a detailed configuration of a decryption unit.

FIG. 13 is a diagram showing a typical internal configuration of the decryption unit 91 and flows of data in the configuration for a case in which the decryption unit 91 decrypts data on the basis of the CBC method. Much like the decryption circuit described earlier by referring to FIG. 2, the internal configuration is a plurality of combinations each including an exclusive-or circuit and a decryption unit. Thus, in FIG. 13, components identical with their counterparts employed in the decryption circuit shown in FIG. 2 are denoted by the same reference numerals as the counterparts in the following description.

As shown in FIG. 13, encrypted sector data having a length of 2,048 bytes is divided into data blocks each having a size of 16 bytes. As a result, the encrypted sector data is divided into 128 data blocks each having a size of 16 bytes. As already explained earlier by referring to FIG. 2, the data blocks are supplied to their respective decryption units 22-1 to 22-128 and pieces of data output by the decryption units 22-1 to 22-128 are supplied to their respective exclusive-or circuits 21-1 to 21-128.

The exclusive-or circuits 21-1 to 21-128 output results of exclusive-or processes as sector data to be output to typically a display unit and/or another data recipient, which are not shown in the figure. The data blocks supplied to the decryption units 22-1 to 22-127 are also supplied to respectively the exclusive-or circuits 21-2 to 21-128 at the stage following the decryption units 22-1 to 22-127 respectively. Since there is no decryption unit at a stage preceding the exclusive-or circuit 21-1, however, no data is supplied to the exclusive-or circuit 21-1 from the preceding stage. Thus, in this internal configuration, an initialization vector IV generated by the initialization-vector generation unit 92 is supplied to the exclusive-or circuit 21-1.

The initialization vector IV supplied to the exclusive-or circuit 21-1 is the same as the initialization vector IV used in the encryption process carried out by the encryption unit 61 employed in the drive 31. This is because the initialization-vector generation unit 62 and the initialization-vector generation unit 92 generate initialization vectors IV by adoption of the same method from an LBA extracted from the same read command 102. Thus, the same initialization vector IV is supplied to the encryption unit 61 and the decryption unit 91.

Figure 14:
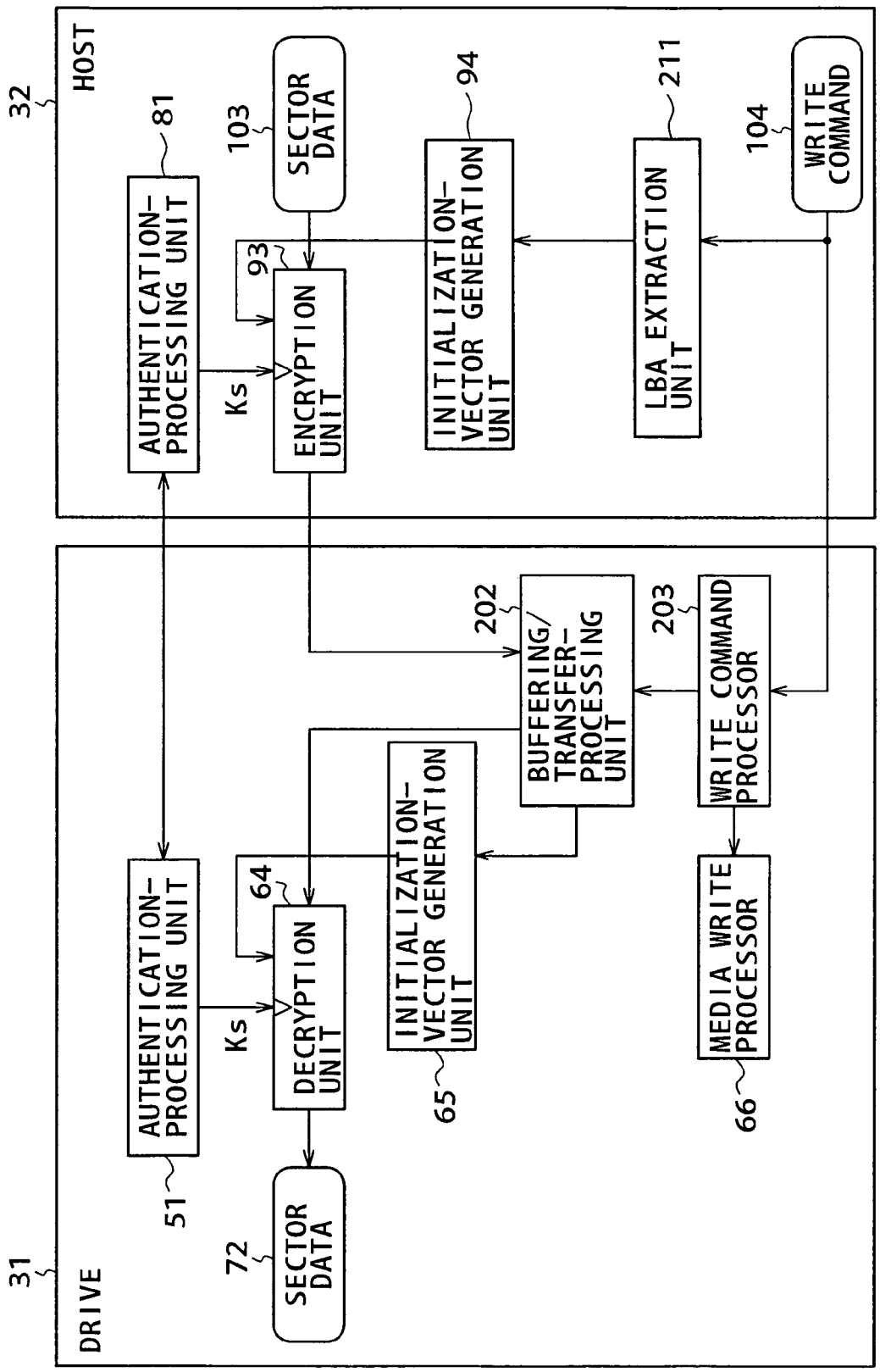
FIG. 14 is a diagram showing the configuration of a recording unit.

Next, operations to write data onto the recording medium are explained by referring to FIG. 14, which shows a detailed configuration of the recording unit 42. In this figure, components identical with their counterparts shown in FIG. 3 are denoted by the same reference numerals as the counterparts and their explanation are properly omitted in order to avoid duplications.

The host 32 has a configuration including an additional LBA extraction unit 211. The LBA extraction unit 211 extracts an LBA from a write command 104 and supplies the LBA to the initialization-vector generation unit 94. The recording unit 42 shown in FIG. 14 has a configuration in which an initialization vector IV is generated from an LBA included in a write command 104.

The LBA is a logical address representing an address at which data is to be written on the recording medium. Since the LBA specified in a write command 104 is a logical address on the recording medium and, thus, not the actual physical address, the drive 31 must carry out processing to convert the LBA into a PSN representing the physical address. Even though the processing to convert the LBA into a PSN is not shown explicitly in the figure, the drive 31 has a configuration including the media write processor 66 for carrying out the processing.

The configuration of the drive 31 also includes an additional buffering/transfer-processing unit 202. The buffering/transfer-processing unit 202 temporarily buffers pieces of data received from the host 32 till an LBA pointing to a sector in which the data is to be written is recognized. In the mean time, the media write processor 66 carries out processing to search the recording area of the recording medium for a location pointed to by the LBA. Then, the pieces of data are sequentially transferred from the buffering/transfer-processing unit 202 to the decryption unit 64 with timings of processes carried out by the decryption unit 64. The drive 31 also has a write command processor 203. The write command processor 203 is provided as a unit for processing the write command 104 received from the host 32. As results of the processing, the write command processor 203 supplies the LBA pointing to the first one of sectors into which the data is to be written and a transfer length representing the number of such sectors to the buffering/transfer-processing unit 202 and the media write processor 66.

Figure 15:
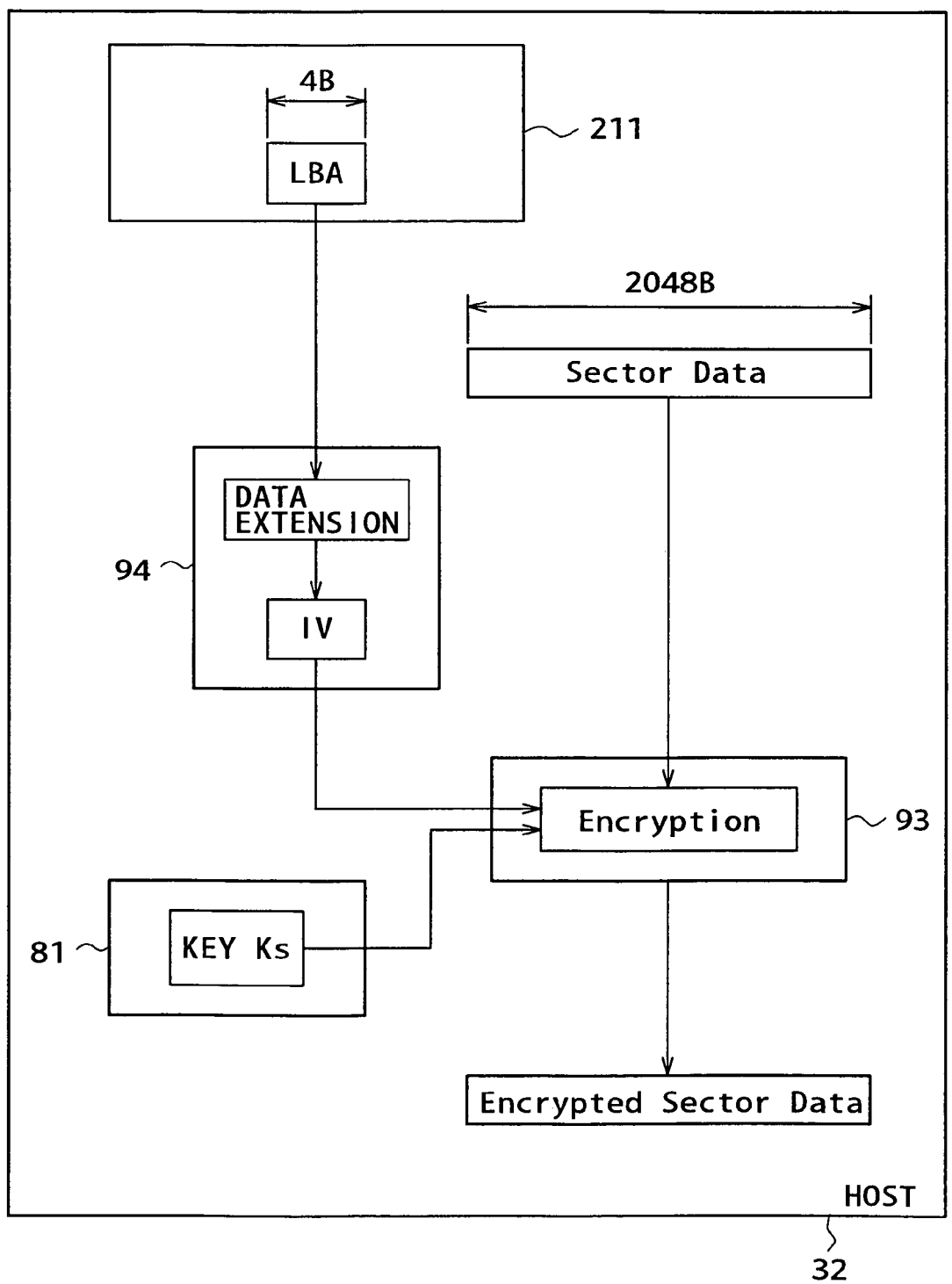
FIG. 15 is an explanatory diagram showing data flows in encryption processing carried out by a host.

First of all, by referring to FIG. 15, the following description explains processing carried out by components employed in the host 32 as components included in the configuration of the recording unit 42 shown in FIG. 14. To begin with, the LBA extraction unit 211 extracts an LBA having a length of 4 bytes from a write command 104 and supplies the LBA to the initialization-vector generation unit 94. The initialization-vector generation unit 94 extends the LBA to data with a size of 16 bytes typically by using a hash function and outputs the data as an initialization vector IV. The initialization vector IV is then supplied to the encryption unit 93.

The encryption unit 93 also receives a key Ks from the authentication-processing unit 81. Thus, the encryption unit 93 receives the initialization vector IV and the key Ks. In addition, the encryption unit 93 also receives sector data having a size of 2,048 bytes as data to be encrypted. The sector data to be supplied has been read from a recording apparatus provided in the host 32, for example. The encryption unit 93 encrypts the sector data having a size of 2,048 bytes to result in encrypted sector data, which is supplied to the drive 31.

The encryption unit 93 for carrying out such an encryption process can have the same configuration as the encryption unit 61 explained earlier. That is to say, the encryption unit 93 can have the configuration shown in FIG. 11.

Figure 16:
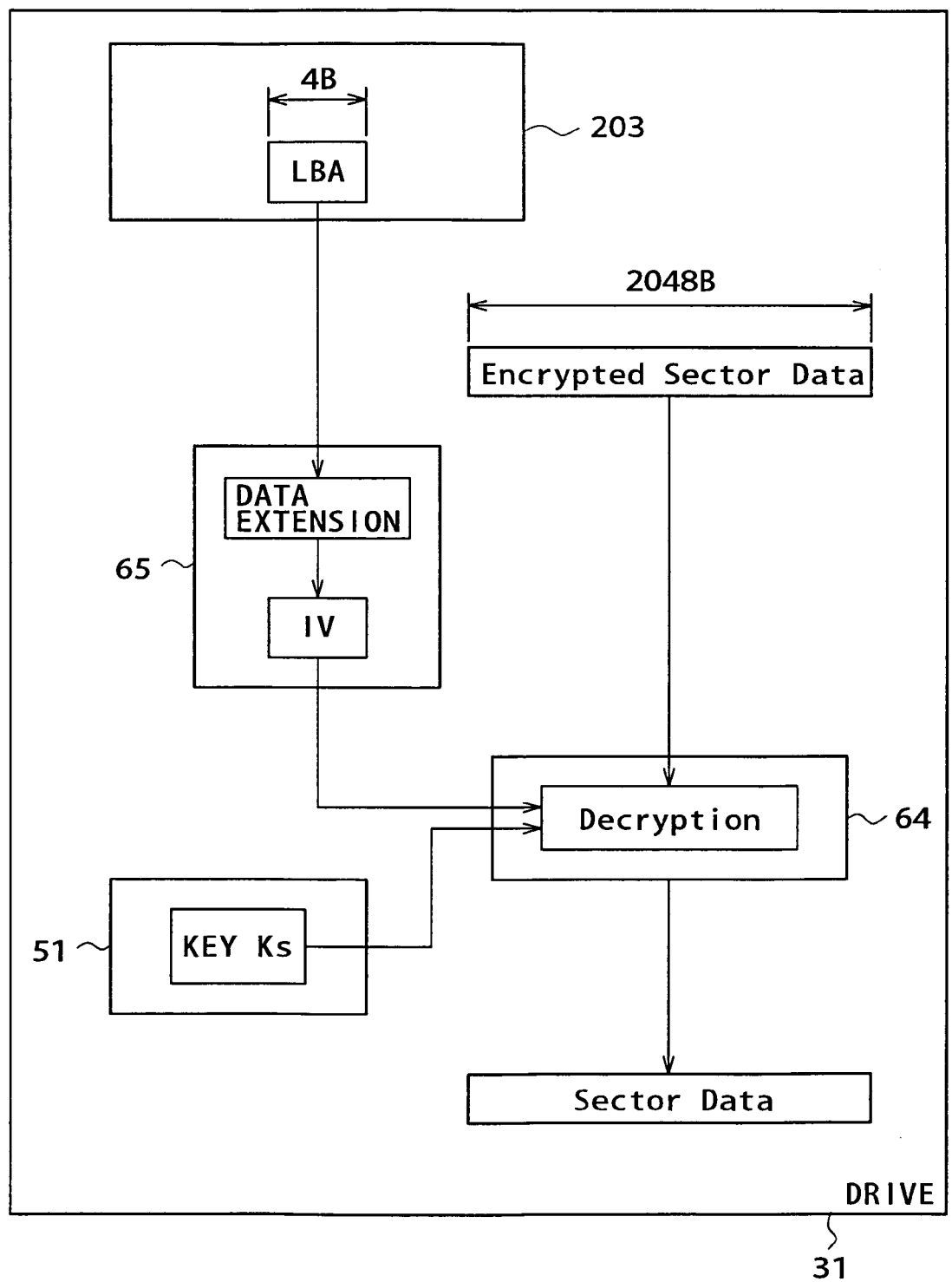
FIG. 16 is an explanatory diagram showing data flows in decryption processing carried out by a drive.

Next, processing carried out by the drive 31 on the encrypted data is explained by referring to FIG. 16. First of all, the write command processor 203 extracts an LBA having a length of 4 bytes from a write command 104 and supplies the LBA to the initialization-vector generation unit 65. The initialization-vector generation unit 65 generates an initialization vector IV by extension of the LBA to data with a size of 16 bytes by using typically a hash function.

A technique adopted by the initialization-vector generation unit 65 to generate an initialization vector IV is basically the same as the technique adopted by the initialization-vector generation unit 94 employed in the host 32. That is to say, if the initialization-vector generation unit 94 generates an initialization vector IV by using a hash function, for example, the initialization-vector generation unit 65 also generates an initialization vector IV by using the hash function. The initialization vector IV generated by the initialization-vector generation unit 65 is supplied to the decryption unit 64.

The decryption unit 64 also receives a key Ks from the authentication-processing unit 51. This key Ks is the same as the key Ks supplied by the authentication-processing unit 81 employed in the host 32 to the encryption unit 93. A key generated in an authentication process can be used as the key Ks.

As described above, the initialization vector IV and the key Ks are supplied to the decryption unit 64. In addition, the decryption unit 64 also receives encrypted sector data with a size of 2,048 bytes as sector data to be decrypted. Encrypted sector data with a size of 2,048 bytes is output by the decryption unit 64 as a result of decryption and supplied to the recording medium not shown in the figure.

The decryption unit 64 for carrying out such a decryption process can have the same configuration as the decryption unit 91 explained earlier. That is to say, the decryption unit 64 can have the configuration shown in FIG. 13.

Next, a process to generate an initialization vector IV is explained. In the embodiment described above, the data of an LBA specified in a read command 102 or a write command 104 is used to generate an initialization vector IV by applying typically a hush function. In the following description, the process to generate an initialization vector IV is explained more concretely. By again referring to FIG. 3, it is obvious that an initialization vector IV is generated in 4 components, i.e., the initialization-vector generation unit 62, the initialization-vector generation unit 65, the initialization-vector generation unit 92 and the initialization-vector generation unit 94.

The four initialization-vector generation components generate an initialization vector IV by adoption of the same technique. The technique is explained by taking the initialization-vector generation unit 62 as a representative example.

Figure 17:
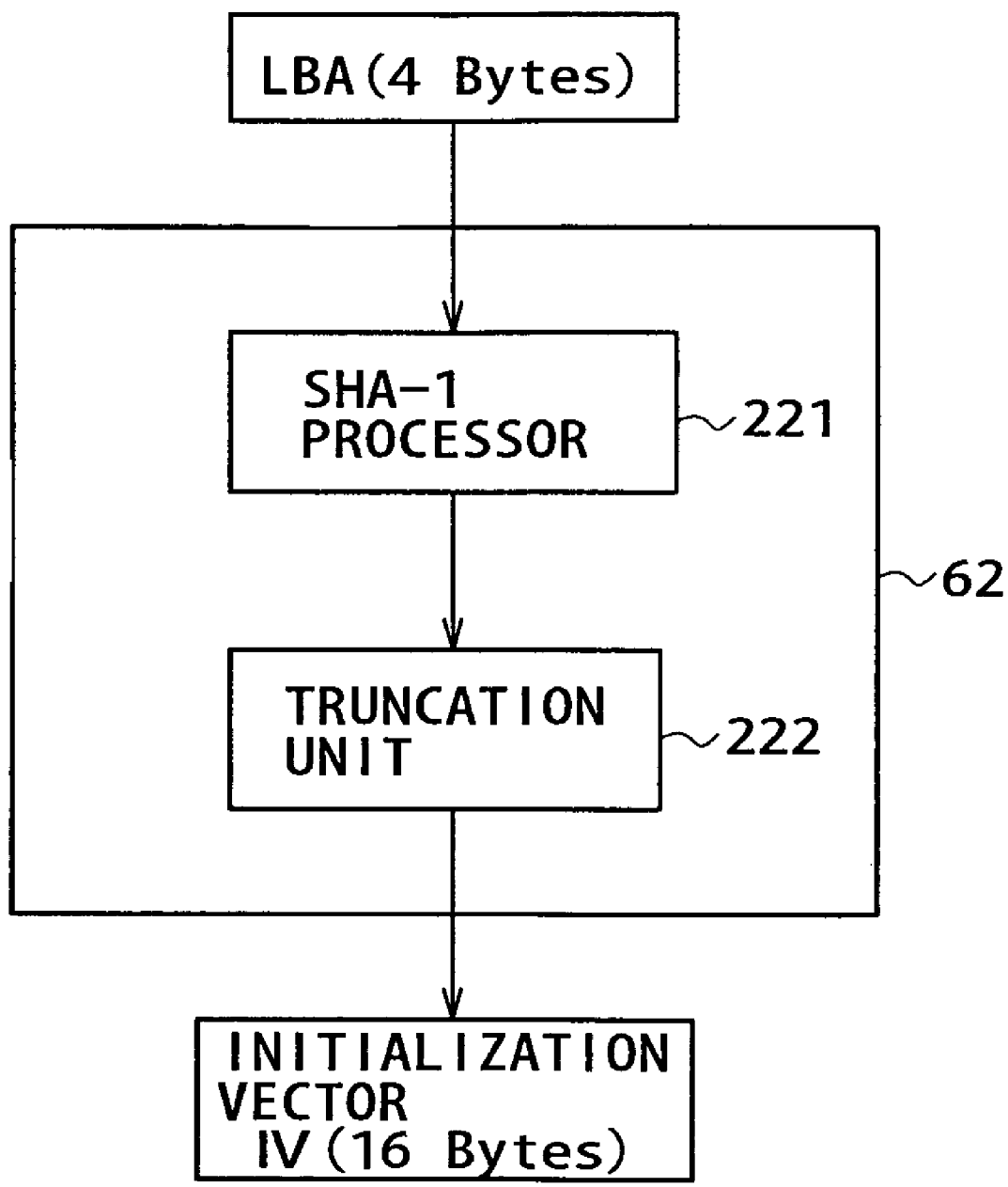
FIG. 17 is a diagram showing a typical configuration of an initialization-vector generation unit.

FIG. 17 is a diagram showing a typical internal configuration of the initialization-vector generation unit 62. The initialization-vector generation unit 62 shown in FIG. 17 has a configuration including a SHA-1 processor 221 and a truncation unit 222. First of all, the SHA-1 processor 221 is explained. The SHA is the abbreviation of a Secure Hash Algorithm.

The SHA has been developed by the NIST (National Institute of Standard and Technology) of the USA. The SHA has also been revised several times. Then, in the year of 1995, FIPS180-1 was issued as a revised version of the SHA. SHA-1 is a popular name of this revised version. Details of the SHA are described in references such a publication authored by William Staring with a title of "Encryption and Network Security".

As the name indicates, SHA-1 is the name of an algorithm for carrying out a process by using a hash function. The process inputs a message with a length of any bytes and outputs a message digest having a size of 160 bits. However, there is a condition of limiting the length of the input message to a maximum of N bits where N is the $64^{th}$ power of 2.

As described above, since SHA-1 is capable of using a message of any number of bytes as an input, for example, any numerical value included in an ATAPI command packet or any logical format information can be used as an input. Here, as shown in FIG. 17, as an input to the SHA-1 processor 221 for carrying out processing based on SHA-1, an LBA having a length of 4 bytes is used.

As described above, the process of SHA-1 outputs a message digest having a size of 160 bits or 20 bytes. That is to say, in this case, the SHA-1 processor 221 outputs data having a size of 160 bits. However, data required as an initialization vector IV is data having a size of 16 bytes. Thus, the truncation unit 222 is provided at a stage following the SHA-1 processor 221 as a unit for extracting data of 128 bits (or 16 bytes) from the 160-bit data output by the SHA-1 processor 221.

Data output by the truncation unit 222 is an initialization vector IV. In this way, the initialization-vector generation unit 62 including the SHA-1 processor 221 and the truncation unit 222 generates an initialization vector IV.

The process to generate an initialization vector IV as described above is no more than a typical embodiment, which does not limit the technique of generating an initialization vector IV. Thus, embodiments other than this typical one are explained by referring to FIG. 18 and subsequent figures as follows.

Figure 18:
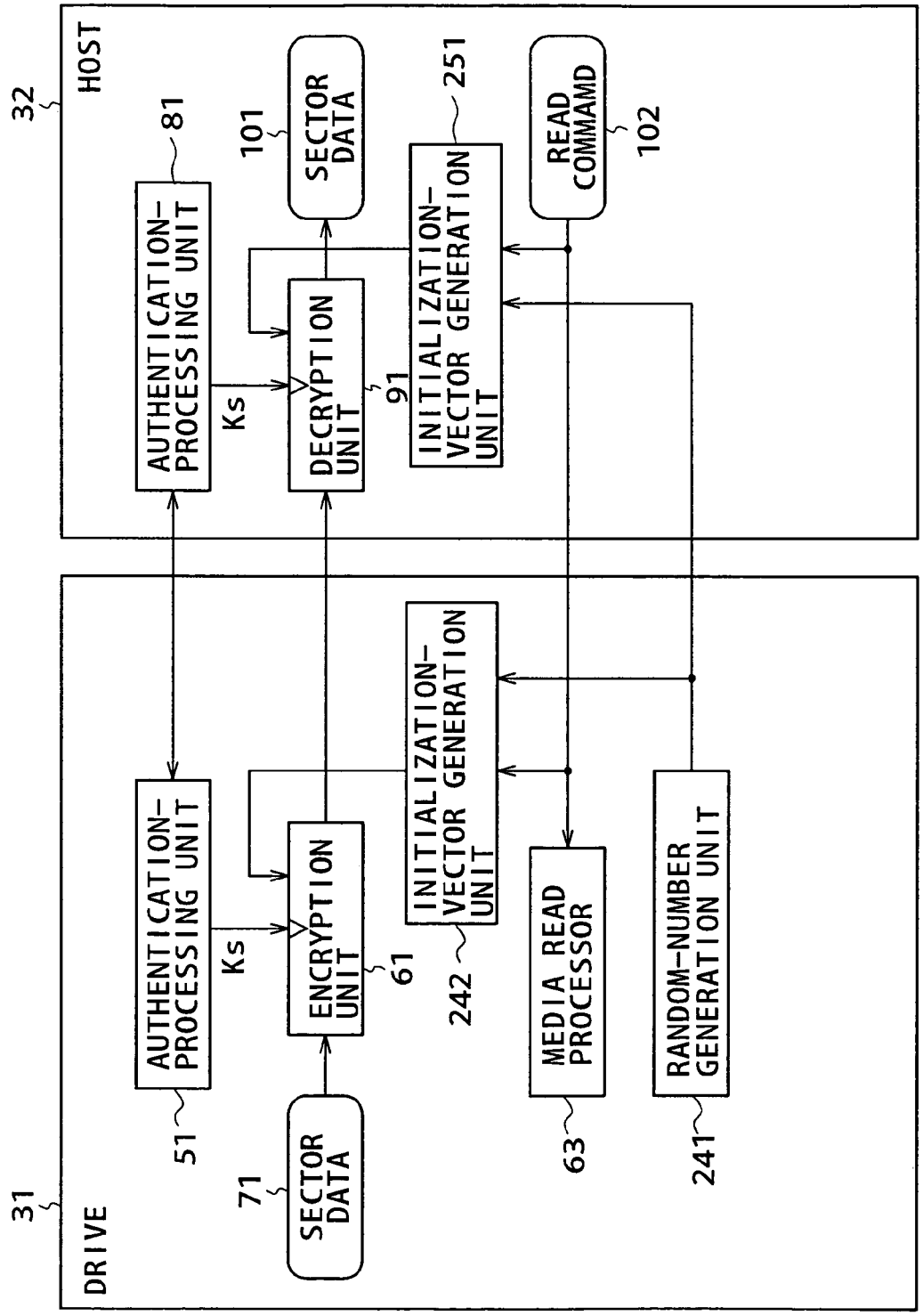
FIG. 18 is a diagram showing another typical configuration of the reproduction unit.

In the embodiments explained by referring to FIG. 18 and subsequent figures, in addition to an LBA, a random number is used in a process of generating an initialization vector IV. First of all, characteristics of a process for generating an initialization vector IV by using a random number are explained.

In an embodiment explained earlier, an initialization vector IV is generated by using a 4-byte LBA specified in a read command 102 or a write command 104. Since the initialization vector IV has a length of 16 bytes, however, the initialization vector IV is generated by adoption of a method whereby a hash function is applied to the LBA with a length of 4 bytes to extend the LBA to data with a size of 16 bytes.

By the way, an LBA is assigned to each sector. Thus, the initialization-vector generation unit may have to carry out initialization-vector generation processing based on a hash function for each sector, which data is to be read out from or written into. Relatively frequent executions of initialization-vector generation processing based on a hash function increase loads borne by the drive 31 and the host 32, presumably raising a problem in a way or another. For example, the length of the time it takes to write data onto a recording medium or read out data from the recording medium conceivably increases due to the processing carried out by the initialization-vector generation unit to generate an initialization vector IV. Taking advantage of an LBA characteristic of the 4-byte length, it is possible to adopt a method whereby the LBA is extended to data with a length of 16 bytes by repeating the LBA four times. However, an initialization vector IV generated by adoption of this method is easier to infer so that this method cannot be said to be desirable for maintaining security.

In a process described below to generate an initialization vector IV by using a random number, exclusive-or logical addition is carried out on a quantity, which requires time-consuming processing for each sector as is the case with an LBA. Thus, the process is no more than processing consuming relatively little time. As a result, it is possible to achieve objectives to prevent the processing speed of the whole system from decreasing and raise the degree of security.

Figure 19:
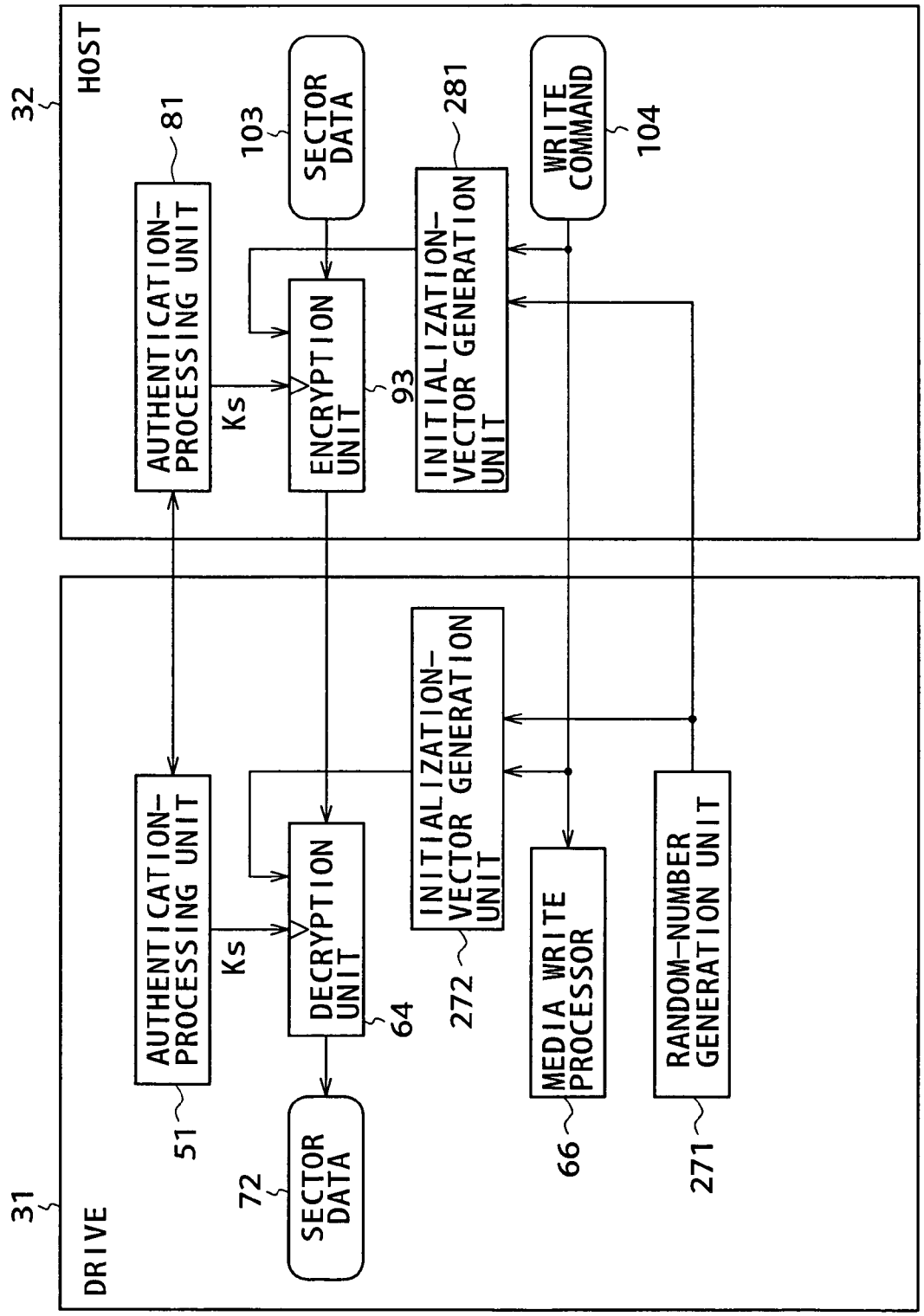
FIG. 19 is a diagram showing another typical configuration of the recording unit.

FIG. 18 is a diagram showing a typical configuration of the reproduction unit 41 for a case in which an initialization vector IV is generated from not only an LBA, but also a random number. On the other hand, FIG. 19 is a diagram showing a typical configuration of the recording unit 42 for a case in which an initialization vector IV is generated by using not only an LBA, but also a random number. Among components employed in the reproduction unit 41 shown in FIG. 18, those identical with their counterparts employed in the reproduction unit 41 shown in FIG. 4 are denoted by the same reference numerals as the counterparts, and their explanations are properly omitted in order to avoid duplications. By the same token, among components employed in the recording unit 42 shown in FIG. 19, those identical with their counterparts employed in the recording unit 42 shown in FIG. 14 are denoted by the same reference numerals as the counterparts, and their explanations are properly omitted in order to avoid duplications. The following description refers to other figures showing typical configurations of the reproduction unit 41 and the recording unit 42. Components shown in the other figures as components identical with their counterparts explained earlier are denoted by the same reference numerals as the counterparts in the same way. In addition, explanations of the identical components are also omitted properly as well in order to avoid duplications.

In the configurations of the reproduction unit 41 and the recording unit 42 shown in FIGS. 18 and 19 respectively, a random number is generated by a component employed in the drive 31.

To be more specific, the reproduction unit 41 shown in FIG. 18 includes a random-number generation unit 241 for generating a random number to be used in a process to generate an initialization vector IV in the drive 31. A random number generated by the random-number generation unit 241 is supplied to an initialization-vector generation unit 242 employed in the drive 31 and an initialization-vector generation unit 251 employed in the host 32. The initialization-vector generation unit 242 and the initialization-vector generation unit 251 both generate an initialization vector IV by using an LBA fetched from a read command 102 and the random number received from the random-number generation unit 241.

By the same token, the recording unit 42 shown in FIG. 19 includes a random-number generation unit 271 for generating a random number to be used in a process to generate an initialization vector IV in the drive 31. A random number generated by the random-number generation unit 271 is supplied to an initialization-vector generation unit 272 employed in the drive 31 and an initialization-vector generation unit 281 employed in the host 32. The initialization-vector generation unit 272 and the initialization-vector generation unit 281 both generate an initialization vector IV by using an LBA fetched from a write command 104 and the random number received from the random-number generation unit 271.

Figure 20:
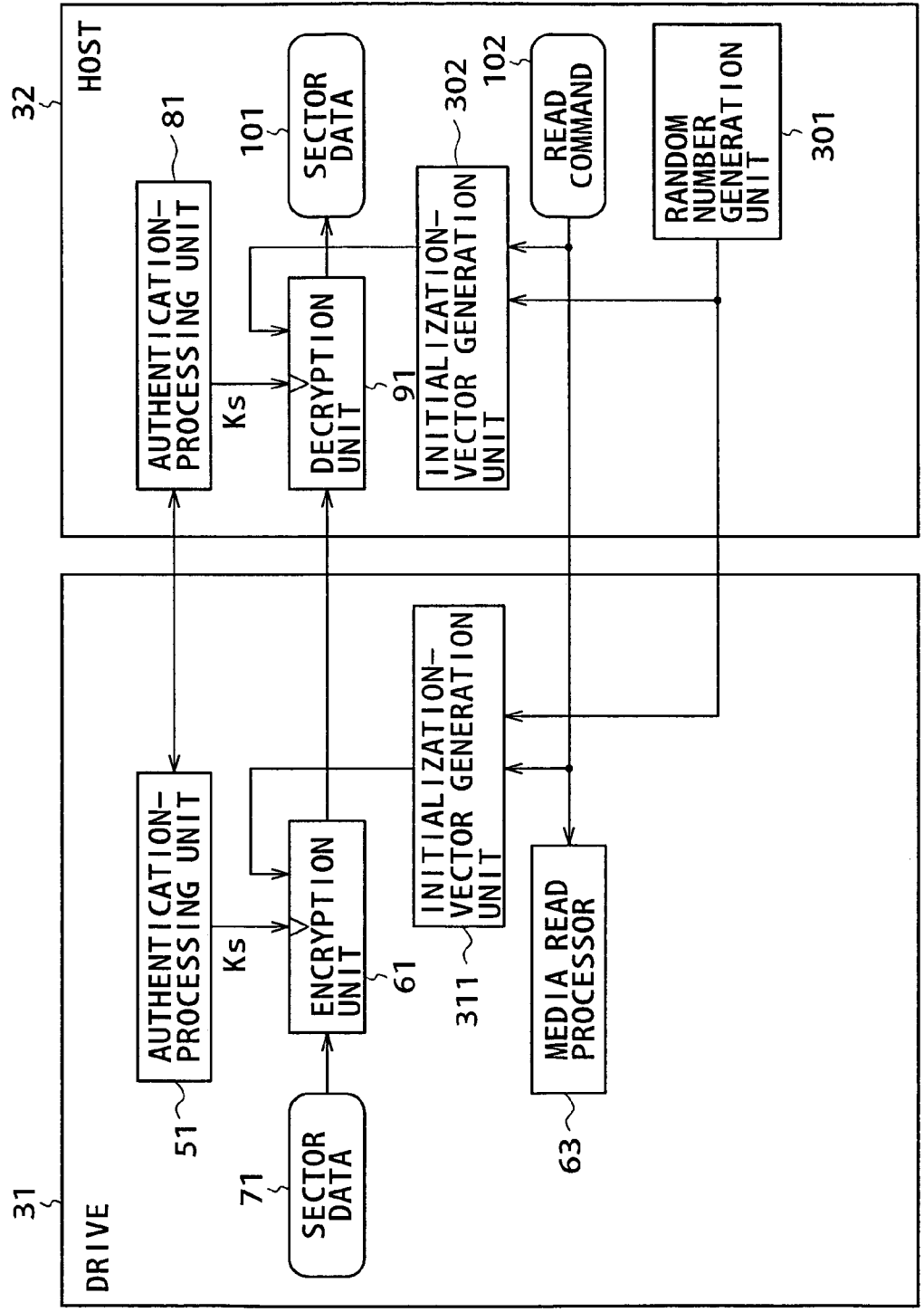
FIG. 20 is a diagram showing a further typical configuration of the reproduction unit.
Figure 21:
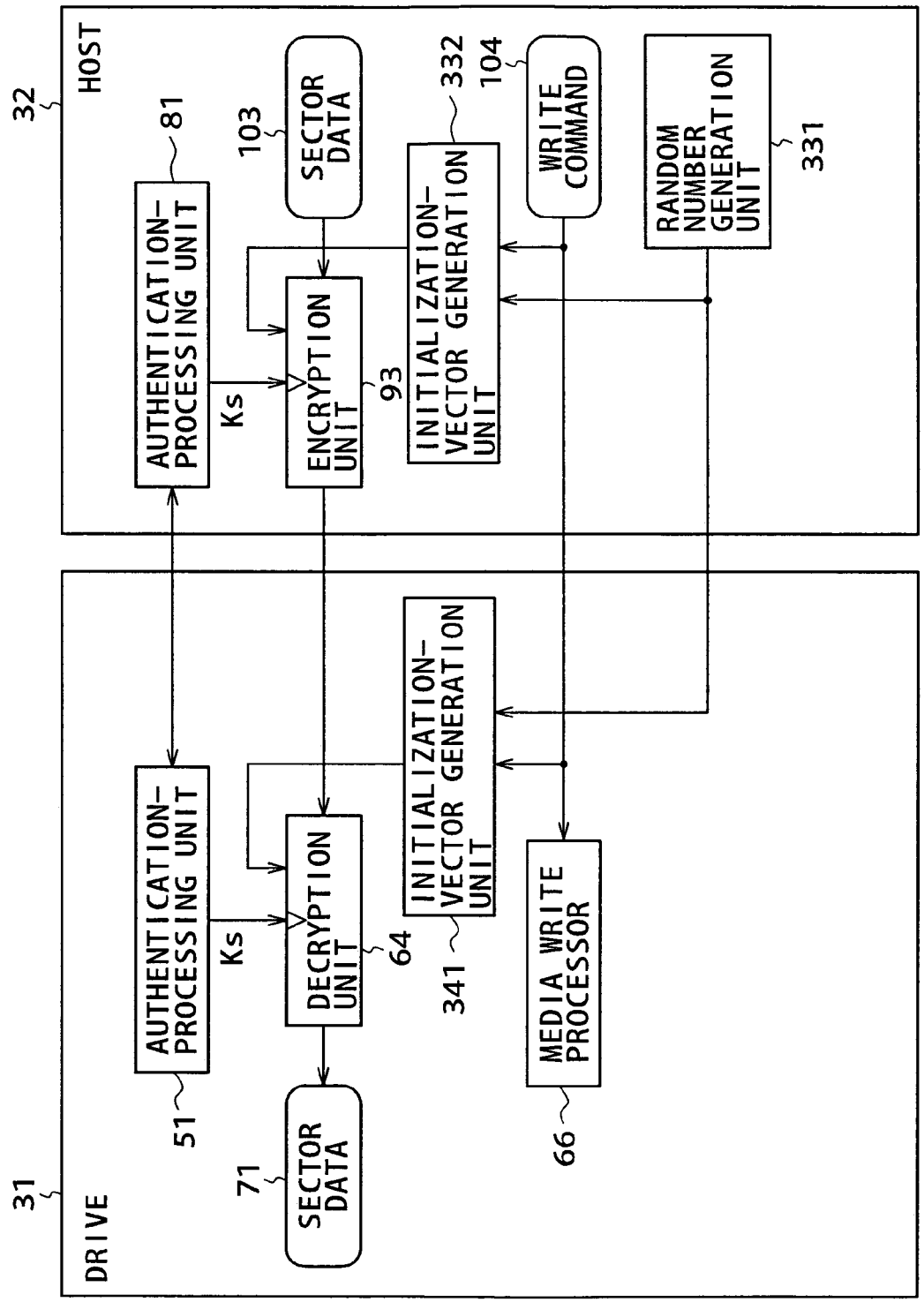
FIG. 21 is a diagram showing a further typical configuration of the recording unit.

The random-number generation unit 241 and the random-number generation unit 271 each used for generating a random number are provided in the drive 31 as shown in FIGS. 18 and 19 respectively. However, they can also be employed in the host 32. FIGS. 20 and 21 are diagrams showing typical configurations of respectively the reproduction unit 41 and the recording unit 42 for a case in which the random-number generation units are employed in the host 32.

To be more specific, the reproduction unit 41 shown in FIG. 20 includes a random-number generation unit 301 for generating a random number to be used in a process to generate an initialization vector IV in the host 32. A random number generated by the random-number generation unit 301 is supplied to an initialization-vector generation unit 302 employed in the host 32 and an initialization-vector generation unit 311 employed in the drive 31. The initialization-vector generation unit 302 and the initialization-vector generation unit 311 both generate an initialization vector IV by using an LBA fetched from a read command 102 and the random number received from the random-number generation unit 301.

By the same token, the recording unit 42 shown in FIG. 21 includes a random-number generation unit 331 for generating a random number to be used in a process to generate an initialization vector IV in the host 32. A random number generated by the random-number generation unit 331 is supplied to an initialization-vector generation unit 332 employed in the host 32 and an initialization-vector generation unit 341 employed in the drive 31. The initialization-vector generation unit 332 and the initialization-vector generation unit 341 both generate an initialization vector IV by using an LBA fetched from a write command 104 and the random number received from the random-number generation unit 331.

Figure 22:
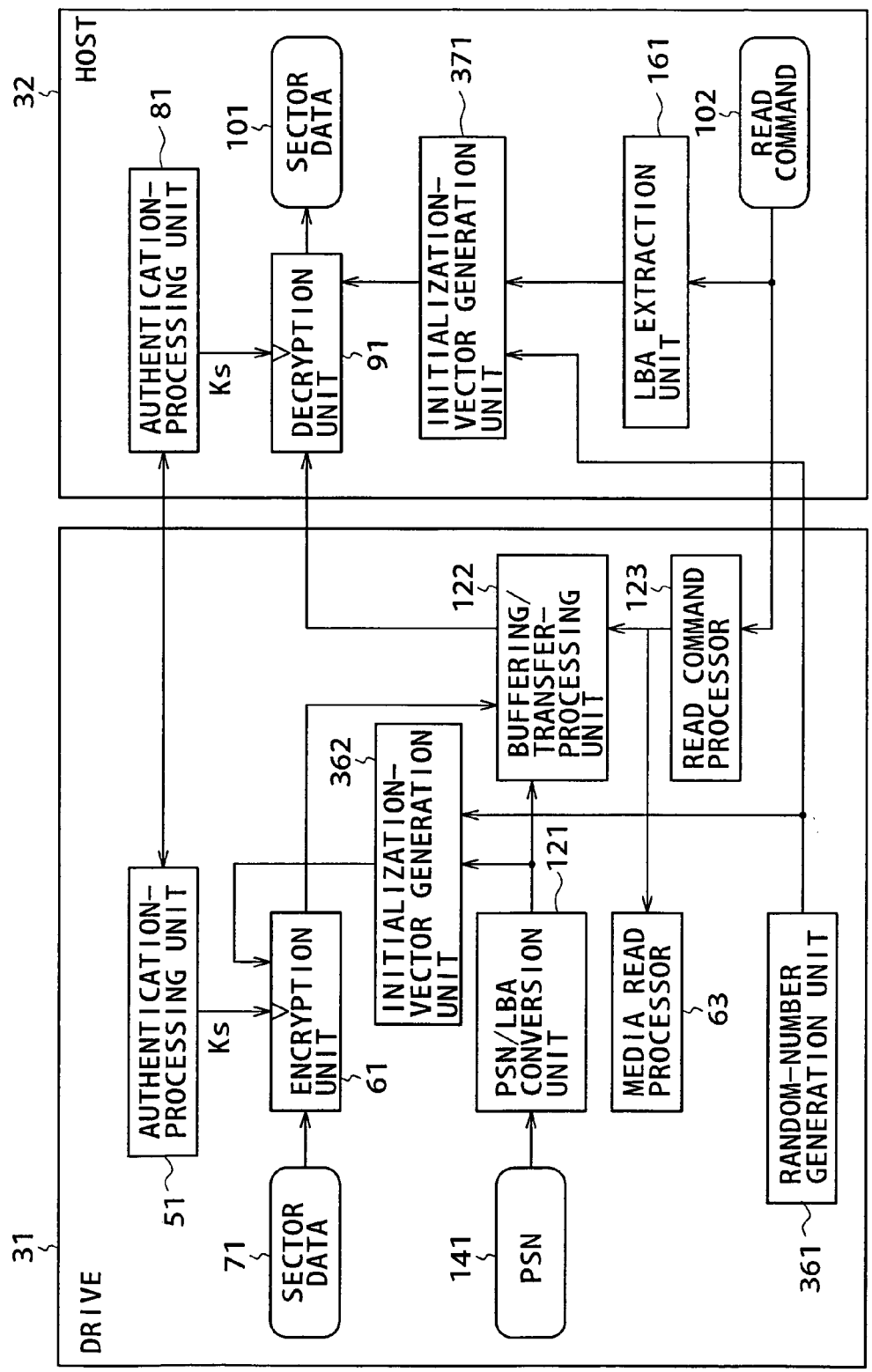
FIG. 22 is a diagram showing a still further configuration of the reproduction unit.

The typical configurations of the reproduction unit 41 and the recording unit 42 shown in FIGS. 18 to 21 do not consider a buffering operation to temporarily store data into a buffer in read-ahead, read and write processes. FIG. 22 is a diagram showing a configuration of the reproduction unit 41 in which a read-ahead operation is taken into consideration. Much like a case already explained earlier by referring to the reproduction unit 41 shown in FIG. 4, the configuration of the reproduction unit 41 shown in FIG. 22 includes the buffering/transfer-processing unit 122 in the drive 31 as a unit for carrying out a read-ahead operation.

In addition, the configuration of the reproduction unit 41 shown in FIG. 22 includes the random-number generation unit 361 in the drive 31 as a unit for generating a random number. A random number generated by the random-number generation unit 361 is supplied to an initialization-vector generation unit 362 employed in the drive 31 and an initialization-vector generation unit 371 employed in the host 32. The initialization-vector generation unit 362 and the initialization-vector generation unit 371 both generate an initialization vector IV by using an LBA fetched from a read command 102 and the random number received from the random-number generation unit 361.

Figure 23:
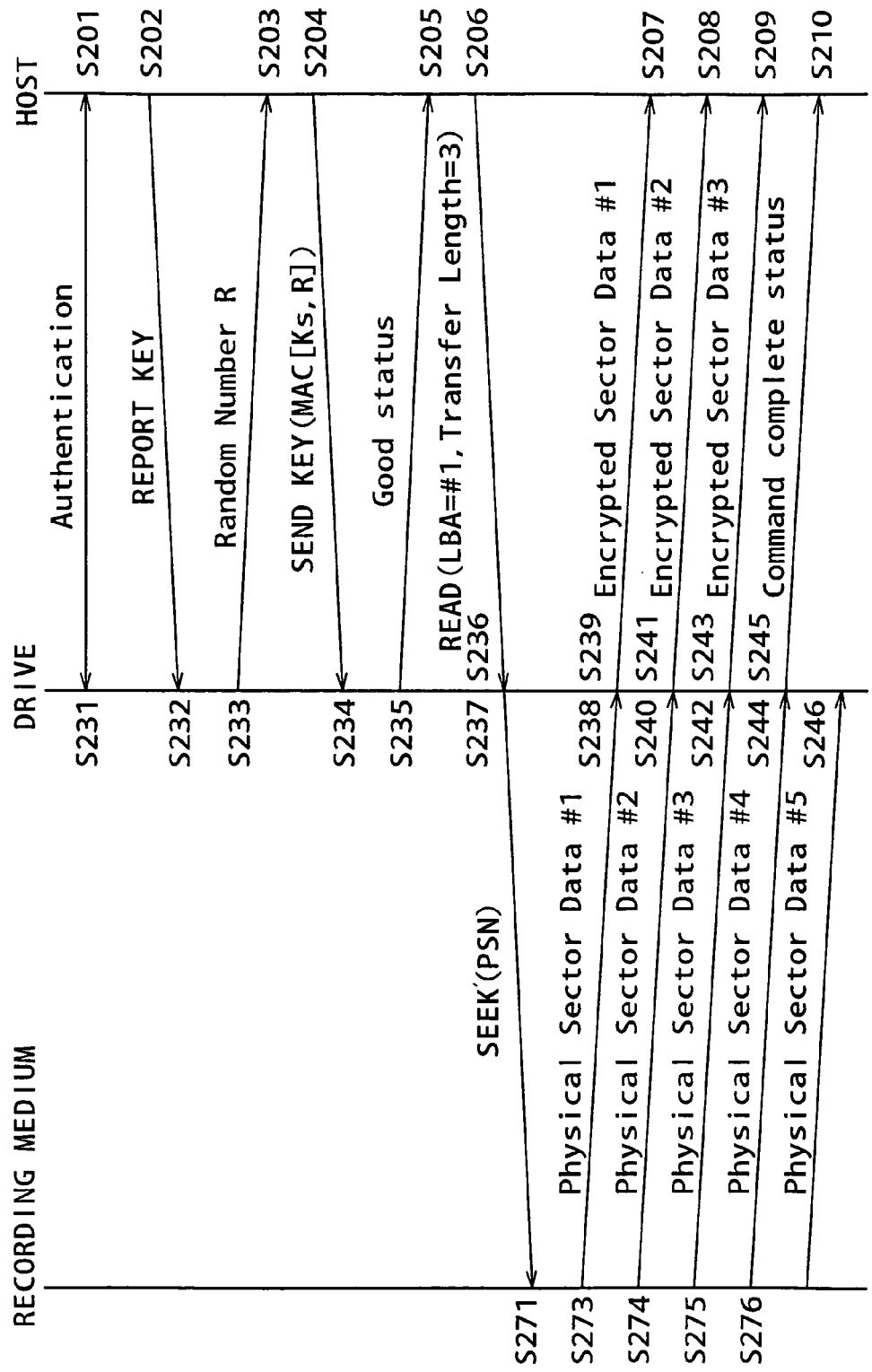
FIG. 23 shows timing charts referred to in explanation of other operations carried out by the reproduction unit.

Operations carried out by the reproduction unit 41 shown in FIG. 22 are explained by referring to timing charts shown in FIG. 23. In pieces of processing carried out at steps S201 and S231, the host 32 and the drive 31 respectively authenticate each other. If the mutual authentication process is completed normally, a session key is generated. At a step S202, the host 32 transmits a "REPORT KEY" command to the drive 31.

The "REPORT KEY" command is a command issued typically as a request for a key and a random number in the mutual-authentication process. As described above, the configuration of the reproduction unit 41 shown in FIG. 22 includes the random-number generation unit 361 in the drive 31 as a unit for generating a random number. Thus, the host 32 must acquire a random number necessary for generation of an initialization vector IV from the drive 31. For this reason, at the step S202, the host 32 transmits a "REPORT KEY" command to the drive 31.

The drive 31 receives the "REPORT KEY" command in processing carried out at a step S232. Then, in processing carried out at the next step S233, the drive 31 generates a random number R and transmits the random number R to the host 32. In the drive 31, the random number R is generated actually by the random-number generation unit 361.

The initialization-vector generation unit 362 and the initialization-vector generation unit 371 may immediately start a process to generate an initialization vector IV by using this random number R. However, the random number R may be interpolated in the course of transmission from the drive 31 to the host 32. As a result, the interpolation of the random number may obstruct a normal operation to read out or write data from or onto the recording medium. In order to avoid such an obstruction, the process to generate an initialization vector IV is started after confirming that the random number R has been normally transmitted from the drive 31 to the host 32, that is, after confirming that no illegal process such as interpolation of the random number R has been carried out.

As the host 32 receives the random number R at a step S203, a MAC (Message Authentication Code) value of the received random number R is computed by using the session key Ks. A MAC value is like a compressed message and generated by using a hash function to be attached to a message. A receiver computes a MAC value by carrying out the same processing as the sender to be compared with a MAC value computed by the sender. In this way, the MAC provides a mechanism in which interpolation carried out in the course of communication or another illegal operation can be checked. For example, if the MAC value computed by the sender does not match the MAC value computed by the receiver sharing the common key with the sender at the time the transmitted MAC value is transmitted, it is feared that the message has experienced a tapping or interpolation process. If they match each other, on the other hand, the message can almost be determined to be a message received without interpolation.

As described above, the random number R is verified by using a MAC value. However, the random number R can also be checked to verify that the random number R is a message received without interpolation by adoption of another method.

In processing carried out at a step S204, the host 32 transmits the computed MAC value (MAC [Ks, R]) to the drive 31 as a "SEND KEY" command. As the drive 31 receives the MAC value (MAC [Ks, R]) in processing carried out at a step S234, a value is computed from the received MAC value by using the session key Ks in order to verify that the computed value matches the random number R transmitted by itself earlier.

If they are determined to be values not matching each other in this verification, the sharing of the random number R by the drive 31 and the host 32 is determined to have ended in a failure. In this case no further processing is carried out. That is to say, the drive 31 will not respond to a read command 102 and a write command 104 even if these commands are received from the host 32.

If the drive 31 determines that the computed value matches the random number R transmitted by itself earlier, on the other hand, the sharing of the random number R by the drive 31 and the host 32 is determined to be successful. In this case, further processing is carried out. First of all, the drive 31 transmits "good status" to the host 32 at a step S235 to indicate that further processing will be carried out, that is, the request made by the host 32 is accepted.

The host 32 receives this "good status" at a step S205. Then, at the next step S206, the host 32 issues a read command 102. Since processing of the step S206 and subsequent steps is the same as the processing carried out at the step S12 and subsequent steps in the timing charts shown in FIG. 9, the description is properly omitted in order to avoid duplications. However, an initialization vector IV generated used in the processes to encrypt and decrypt sector data exchanged between the drive 31 and the host 32 is generated by the initialization-vector generation unit 362 and the initialization-vector generation unit 371 by using an LBA and the random number R.

The process carried out by the initialization-vector generation unit 362 and the initialization-vector generation unit 371 to generate an initialization vector IV will be explained later by referring to FIG. 29 and subsequent figures.

In the description with reference to the timing charts shown FIG. 23, the validity of a MAC value is verified in the drive 31. A case in which a MAC value is verified in the host 32 is explained by referring to timing charts shown FIG. 24 as follows. Only differences from the processing represented by the timing charts shown in FIG. 23 are explained by referring to the timing charts shown in FIG. 24. As the drive 31 receives a "REPORT KEY" command at a step S332 from the host 32, the drive 31 generates a random number R. Then, a MAC value MAC [Ks, R] of the random number R is computed by using a session key Ks. Furthermore, the drive 31 generates junction data (R||MAC[Ks, R]) of the computed MAC value MAC [Ks, R] and the random number R. Then, in processing carried out at a step S333, the drive 31 transmits the junction data (R||MAC[KS, R]) to the host 32.

When the host 32 receives the junction data (R||MAC[Ks, R]) from the drive 31 at a step S303, the host 32 extracts the random number R and the MAC value MAC[KS, R] from the received junction data (R||MAC[KS, R]). Then, the host 32 computes a MAC value from the extracted random number R and a session key managed by the host 32 itself. The host 32 verifies the validity of the MAC value by comparison of the MAC value extracted from the received junction data (R||MAC[Ks, R]) with the computed MAC value.

If a result of the process to verify the validity of the MAC value leads to determination that no illegal processing such as interpolation has been carried out in the course of communication, a process to generate an initialization vector IV by using the extracted random number R is started. Then, processing of a step S304 and subsequent steps is carried out. This processing is processing related to operations to read out data from a predetermined recording medium.

It is to be noted that, in place of the junction data (R||MAC [Ks, R]), a method can be adopted to transmit other data from the drive 31 at the step S333 to the host 32. The other data is encrypted data E[Ks, R], which is the random number R encrypted by using the session key Ks. In this case, the host 32 decrypts the encrypted data E[Ks, R] received at the step S303 by using a session key Ks owned by itself to produce the random number R. In this way, the host 32 is capable of sharing the random number R with the drive 31. This method allows the value of the random number R to be kept confidential, making it more difficult to infer the initialization vector IV.

Figure 24:
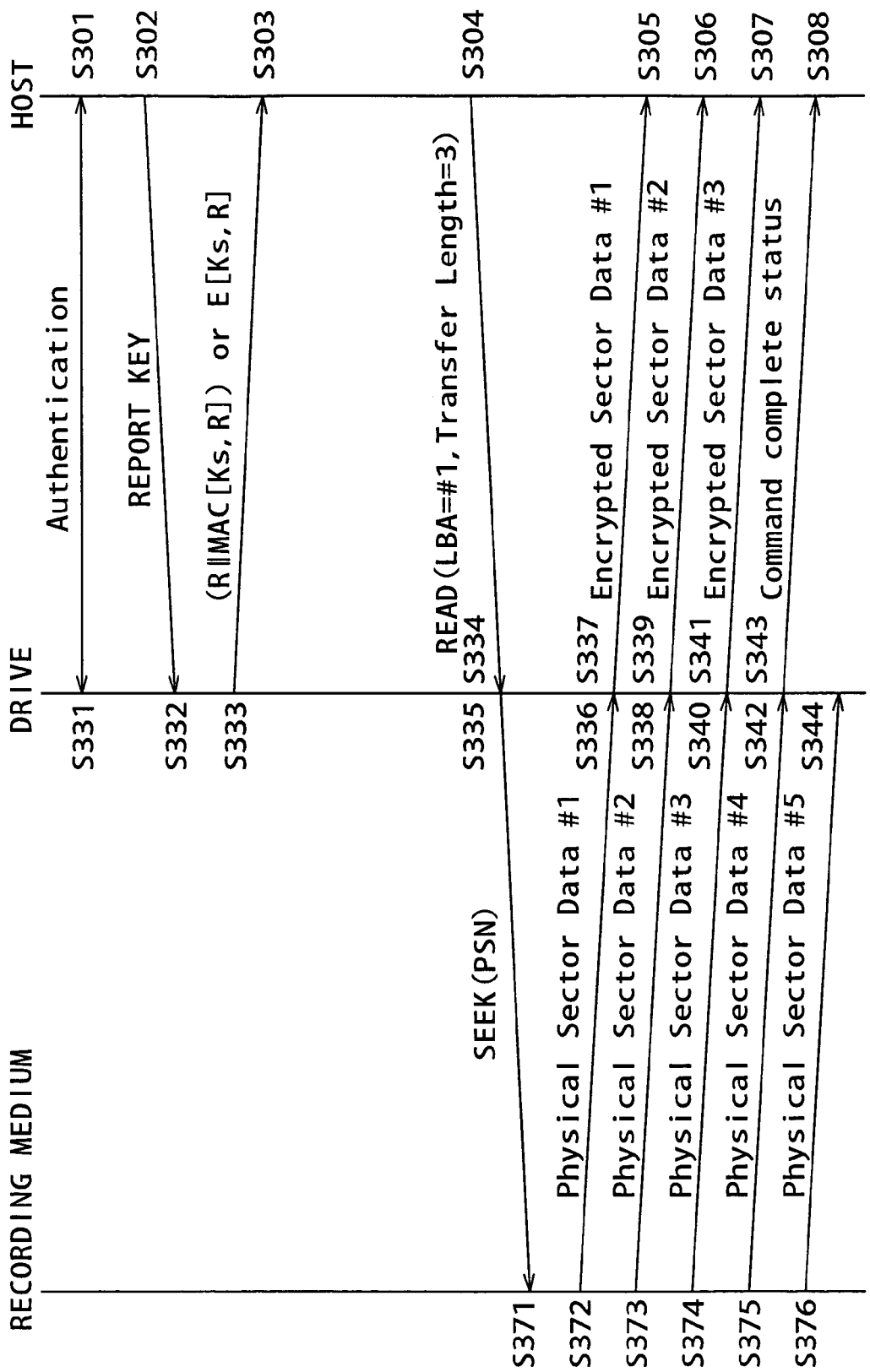
FIG. 24 shows timing charts referred to in explanation of further operations carried out by the reproduction unit.

By referring to FIGS. 22 to 24, the above description explains a configuration in which read-ahead operations are taken into consideration and the reproduction unit 41 employs the random-number generation unit 361 for generating a random number in the drive 31. The above description also explains processing carried out by the reproduction unit 41. By referring to FIGS. 25 to 27, the following description explains a configuration in which read-ahead operations are taken into consideration and the reproduction unit 41 employs the random-number generation unit 401 for generating a random number in the host 32. The following description also explains processing carried out by the reproduction unit 41.

Figure 25:
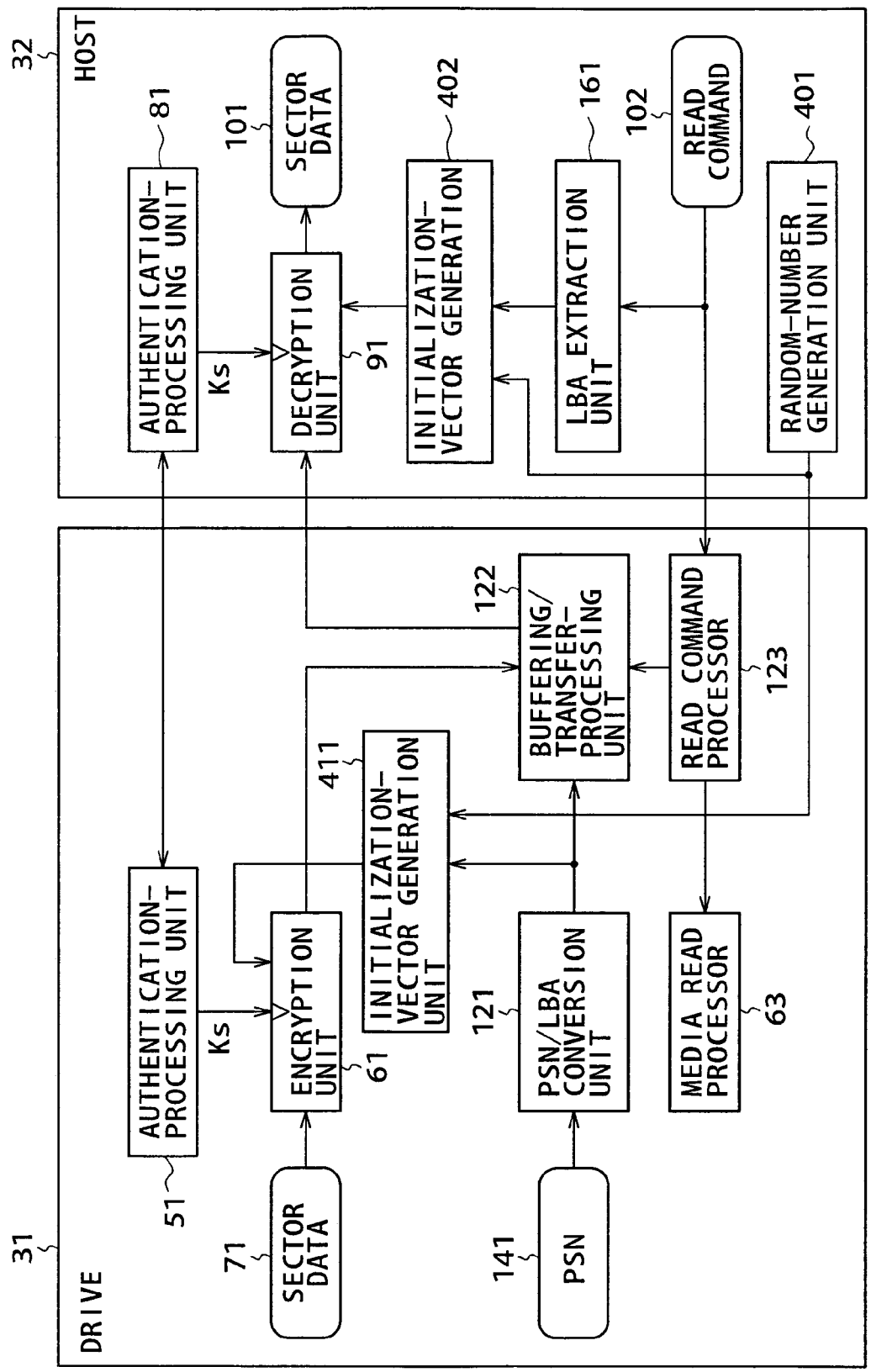
FIG. 25 is a diagram showing a still further configuration of the reproduction unit.

Much like the reproduction unit 41 already explained earlier by referring to FIG. 4, the reproduction unit 41 shown in FIG. 25 has a configuration including the buffering/transfer-processing unit 122 for implementing read-ahead operations in the drive 31.

In addition, the reproduction unit 41 shown in FIG. 25 employs a random-number generation unit 401 for generating a random number in the host 32. A random number generated by the random-number generation unit 401 is supplied to the initialization-vector generation unit 411 employed in the drive 31 and an initialization-vector generation unit 402 employed in the host 32. The initialization-vector generation unit 411 and the initialization-vector generation unit 402 both generate an initialization vector IV by using an LBA fetched from a read command 102 and the random number received from the random-number generation unit 361.

Figure 26:
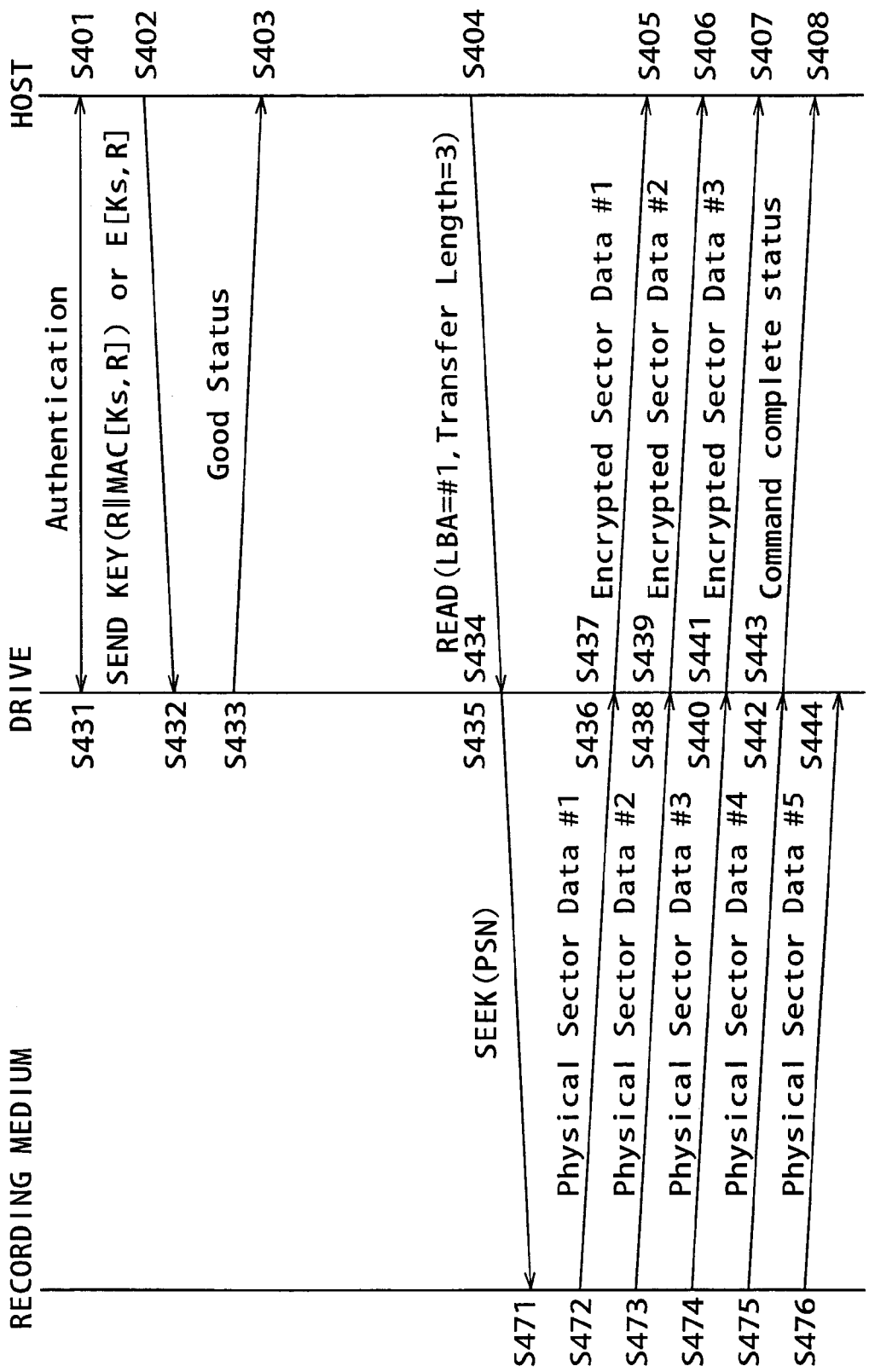
FIG. 26 shows timing charts referred to in explanation of still further operations carried out by the reproduction unit.

Operations carried out by the reproduction unit 41 shown in FIG. 25 are explained by referring to timing charts shown in FIG. 26. In pieces of processing carried out at steps S401 and S431, the host 32 and the drive 31 respectively authenticate each other. If the mutual authentication process is completed normally, a session key is generated. Then, in processing carried out at a step S402, the host 32 transmits junction data (R||MAC[KS, R]) to the drive 31.

When the drive 31 receives the junction data (R||MAC[KS, R]) from the host 32 at a step S432, the drive 31 extracts the random number R and the MAC value MAC[KS, R] from the received junction data (R||MAC[Ks, R]). Then, the drive 31 computes a MAC value from the extracted random number R and a session key Ks managed by the drive 31 itself. The drive 31 verifies the validity of the MAC value by comparison of the MAC value extracted from the received junction data (R||MAC[KS, R]) with the computed MAC value.

If a result of the process to verify the validity of the MAC value leads to determination that no illegal processing such as interpolation has been carried out in the course of communication, a process to generate an initialization vector IV by using the extracted random number R is started. Subsequently, at a step S433, "good status" is transmitted to the host 32. As the "good status" is received, processing of a step S404 and subsequent steps is carried out. This processing is processing related to operations to read out data from a predetermined recording medium.

It is to be noted that, in place of the junction data (R||MAC[Ks, R]), a method can be adopted to transmit other data from the host 32 at the step S402 to the drive 31. The other data is encrypted data E[Ks, R], which is the random number R encrypted by using the session key Ks. In this case, the drive 31 decrypts the encrypted data E[Ks, R] received at the step S432 by using a session key Ks owned by itself to produce the random number R. In this way, the drive 31 is capable of sharing the random number R with the host 32. This method allows the value of the random number R to be kept confidential, making it more difficult to infer the initialization vector IV. In addition, if the encrypted data E[Ks, R] is interpolated in the course of communication, it is impossible to produce a random number R common to both the drive 31 and the host 32, hence, generate an initialization vector IV common to both the drive 31 and the host 32 and, as a result, correctly encrypt and decrypt transferred data. Thus, while the interpolation obstructs operations, it does not result in any advantages.

The description with reference to the timing charts shown in FIG. 26 explains a method of transferring a random number encrypted in the host 32 by using a session key Ks from the host 32 to the drive 31 for a case in which the validity of a MAC value is verified in the drive 31. By referring to timing charts shown in FIG. 27, the following description explains a method of transferring a random number encrypted in the drive 31 by using a session key Ks from the drive 31 to the host 32 for a case in which the validity of a MAC value is verified in the host 32. Only differences from the processing already explained earlier by referring to the timing charts shown in FIG. 26 are explained by referring to the timing charts shown in FIG. 27. At a step S502, in the host 32, the random-number generation unit 401 generates a random number R and transmits the random number R along with a "SEND KEY" command to the drive 31.

Then, at the next step S503, the host 32 also transmits a "REPORT KEY" command to the drive 31. The "REPORT KEY" command is transmitted at the step S503 to request the drive 31 that a MAC value for the random number R be computed and be transmitted to the host 32 in response to the command.

The drive 31 receives the random number R at a step S532 and the "REPORT KEY" command at a step S533. Then, the drive 31 computes a MAC value MAC [Ks, R] of the received random number R by using a session key Ks. Subsequently, in processing carried out at the next step S534, the drive 31 transmits the MAC value MAC [Ks, R] to the host 32.

As the host 32 receives the MAC value MAC [Ks, R] from the drive 31 at a step S504, the host 32 verifies the validity of the MAC value MAC [Ks, R]. If the result of the verification leads to determination that no illegal processing such as interpolation has been carried out on the random number R and other data in the course of communication, a process to generate an initialization vector IV by using the extracted random number R is started. Then, processing of a step S505 and subsequent steps is carried out. This processing is processing related to operations to read out data from a predetermined recording medium.

Figure 27:
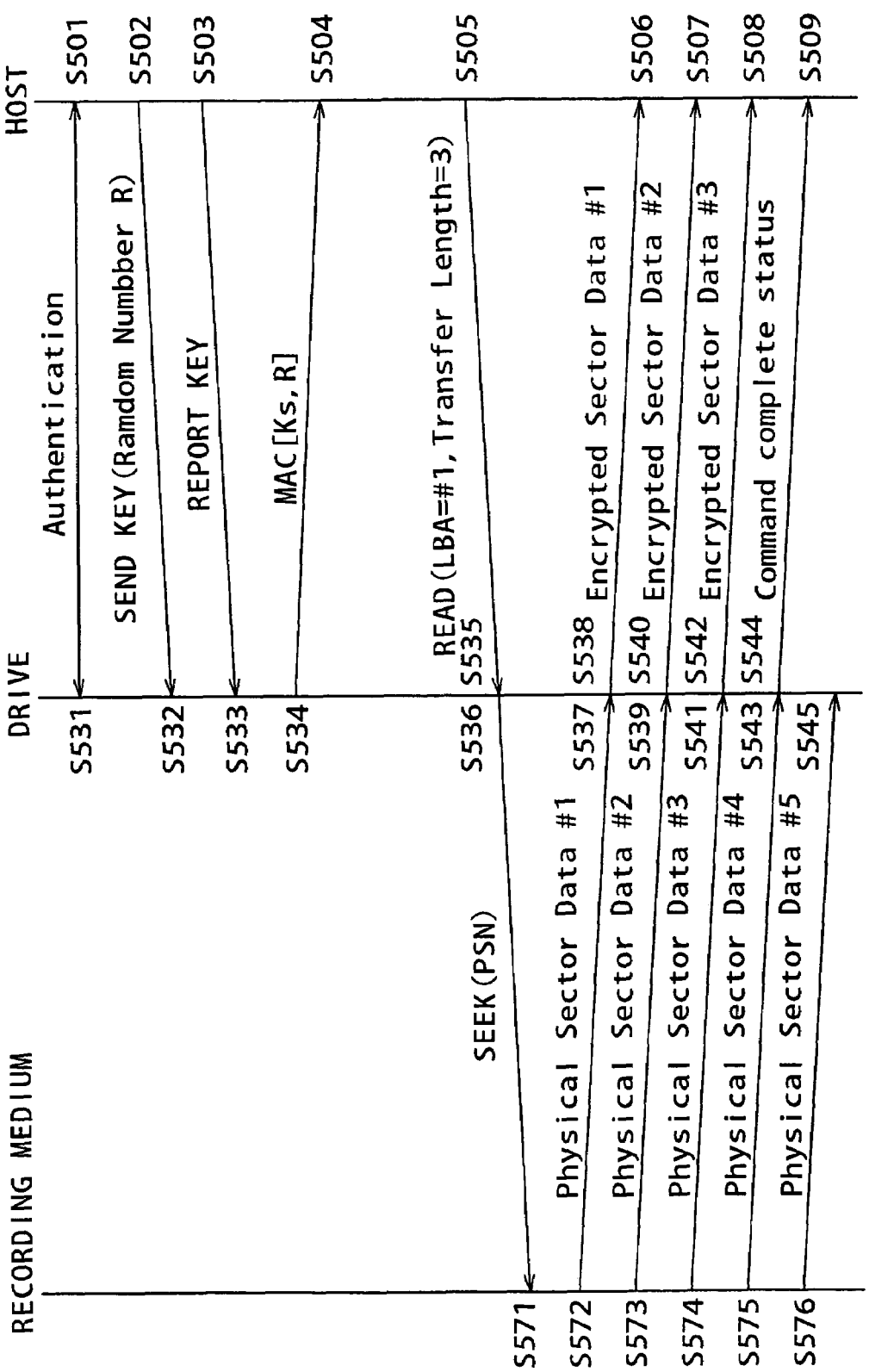
FIG. 27 shows timing charts referred to in explanation of still further operations carried out by the reproduction unit.
Figure 28:
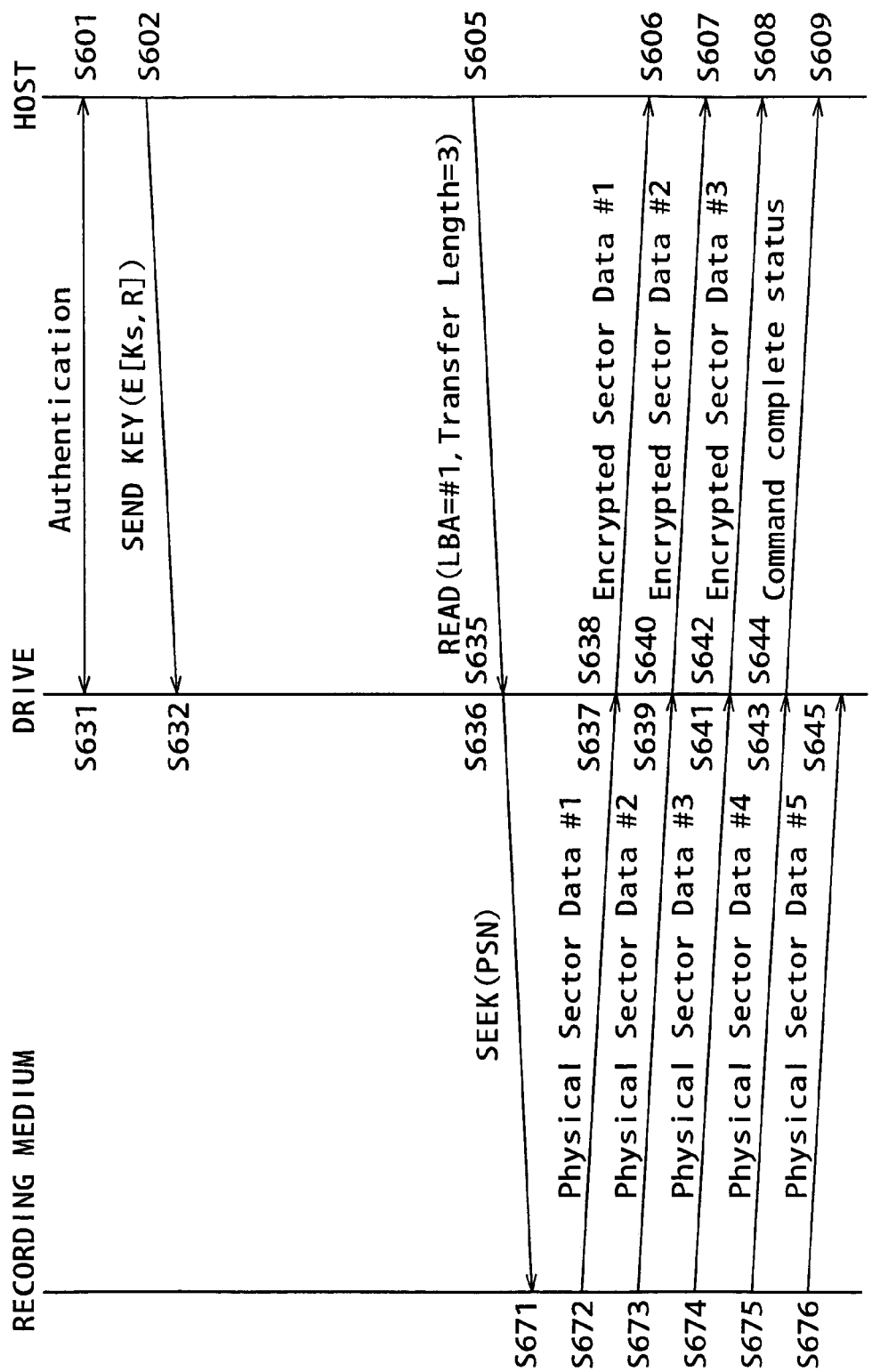
FIG. 28 shows timing charts referred to in explanation of still further operations carried out by the reproduction unit.

The following description explains a method to transfer a random number encrypted in the drive 31 by using a session key Ks from the drive 31 to the host 32. Only differences from the processing already explained earlier by referring to the timing charts shown in FIG. 27 are described by referring to timing charts shown in FIG. 28. At a step S602, the random-number generation unit 401 employed in the host 32 generates a random number R and transmits an encrypted random key E[Ks, R] to the drive 31 along with a "SEND KEY" command.

At a step S632, the drive 31 receives the encrypted random key E[Ks, R] and decrypts it by using the session key Ks to obtain the random number R. If the encrypted data E[Ks, R] is interpolated in the course of communication, it is impossible to produce a random number R common to both the drive 31 and the host 32, hence, generate an initialization vector IV common to both the drive 31 and the host 32 and, as a result, correctly encrypt and decrypt transferred data. Thus, while the interpolation obstructs operations, it does not result in any advantages.

As described above, processing is carried out to determine whether or not a random number R has been transmitted correctly for a case in which an initialization vector IV is generated by using the random number R. In this way, safety of a transmission line and the like can be verified at a stage preceding actual exchanges of data between the drive 31 and the host 32. In addition, it is not until the verification of the safety of the transmission line that data read out from the recording medium is transferred from the drive 31 to the host 32 and data to be written into the recording medium is transferred from the host 32 to the drive 31. Thus, the data can be prevented from being exploited.

The above description explains only an outline of generation of an initialization vector IV by using an LBA and a random number R. The following description explains details of the generation of an initialization vector IV. It is to be noted that the initialization-vector generation units 242 and 251 shown in FIG. 18, the initialization-vector generation units 272 and 281 shown in FIG. 19, the initialization-vector generation units 302 and 311 shown in FIG. 20, the initialization-vector generation units 332 and 341 shown in FIG. 21, the initialization-vector generation units 362 and 371 shown in FIG. 22 as well as the initialization-vector generation units 402 and 411 shown in FIG. 25 are each a component for generating an initialization vector IV from an LBA and a random number R by using basically the same method. In the following description, the initialization-vector generation unit 242 shown in FIG. 18 is taken as a representative example.

FIG. 29 is a diagram showing a typical configuration of the initialization-vector generation unit 242. The initialization-vector generation unit 242 shown in FIG. 29 has a configuration including a padding-processing unit 431 and an initialization-vector generation unit 432. A 4-byte LBA extracted from a read command 102 is supplied to the padding-processing unit 431 employed in the initialization-vector generation unit 242. Since the eventually generated initialization vector IV has a length of 16 bytes, the padding-processing unit 431 extends the LBA having a length of 4 bytes to data with a size of 16 bytes.

As described above, the padding-processing unit 431 extends the LBA having a length of 4 bytes to data with a size of 16 bytes by adoption of a typical method of filling up the shortage with constants such as 00h as high-order and low-order bytes. As an alternative, the LBA having a length of 4 bytes is disassembled and the disassemble bits are relocated at positions in the data with a size of 16 bytes in accordance with another predetermined method and the remaining positions in the data with a size of 16 bytes are filled up with constants such as 00h. As another alternative, the LBA having a length of 4 bytes is merely repeated four times to generate data with a size of 16 bytes. As a further alternative, the 16-byte data obtained as a result of repeating the LBA having a length of 4 bytes is disassembled and the disassemble bits are relocated at positions in accordance with a further predetermined method. By adopting any of these methods, the LBA having a length of 4 bytes is converted by the padding-processing unit 431 into data with a size of 16 bytes. As a still further alternative, data output by the padding-processing unit 431 is further converted into data with a size of 16 bytes.

Data output by the padding-processing unit 431 is supplied to the initialization-vector generation unit 432, which also receives a random number R. The random number R is generated by the random-number generation unit 241 shown in FIG. 18. As described earlier, the random number R has a length of 16 bytes and is exchanged between the drive 31 and the host 32, that is, supplied by one of them to the other.

The initialization-vector generation unit 432 carries out an exclusive-or processing on 16-byte data generated from the LBA and the random number R having a length of 16 bytes to produce an exclusive-or logical sum to be used as a 16-byte initialization vector IV, which is then supplied to the encryption unit 61 and the decryption unit 91.

FIG. 30 is a diagram showing another typical configuration of the initialization-vector generation unit 242. The initialization-vector generation unit 242 shown in FIG. 30 has a configuration including a hash-processing unit 451, a padding-processing unit 452 and an exclusive-or processor 453. Much like the padding-processing unit 431 shown in FIG. 29, the padding-processing unit 452 inputs an LBA having a length of 4 bytes and extends the LBA to data with a size of 16 bytes. Then, the padding-processing unit 452 outputs the data with a size of 16 bytes to the exclusive-or processor 453.

In the initialization-vector generation unit 242 shown in FIG. 30, the hash-processing unit 451 processes an input random number R and outputs a result of processing to the exclusive-or processor 453. To put it in detail, the hash-processing unit 451 processes the random number R by using a hash function such as SHA-1 to produce data C with a size of 16 bytes as the result of processing, which is then supplied to the exclusive-or processor 453.

Processing carried out by the exclusive-or processor 453 is basically the same as the processing carried out by the initialization-vector generation unit 432 shown in FIG. 29. That is to say, the exclusive-or processor 453 carries out exclusive-or processing on 16-byte data generated from the LBA and the data C having a length of 16 bytes to produce an exclusive-or logical sum to be used as a 16-byte initialization vector IV.

The random number R is transferred from the drive 31 to the host 32 or vice versa. If a method is adopted as a technique of transferring the random number R as it is without encrypting the random number R by using a session key Ks, a third party will be capable of recognizing the random number R in the course of transmission. In addition, since the LBA is included in a read command 102 transferred from the host 32 to the drive 31, a third party will be capable of recognizing the LBA as well in the course of transmission. Since a third party is capable of recognizing the random number R and the LBA, it is quite within the bounds of possibility that the third party abuses them.

However, the initialization-vector generation unit 242 shown in FIG. 30 has a configuration in which the random number R is passed through a hash function to generate data C, which is an unpredictable value. Thus, an initialization vector IV generated from the data C can also be made unpredictable. That is to say, even if a third party abuses the random number R and the LBA, the third party will not be capable of inferring the initialization vector IV from the abused values. As a result, even if the third party makes an attempt to exploit encrypted data transferred from the drive 31 to the host 32 or vice versa, the third party will not be capable of decrypting the data.

Thus, it is possible to prevent data transferred from the drive 31 to the host 32 or vice versa from being utilized illegally and, hence, enhance safety of encryption along a bus of a predetermined interface or the like.

Figure 31:
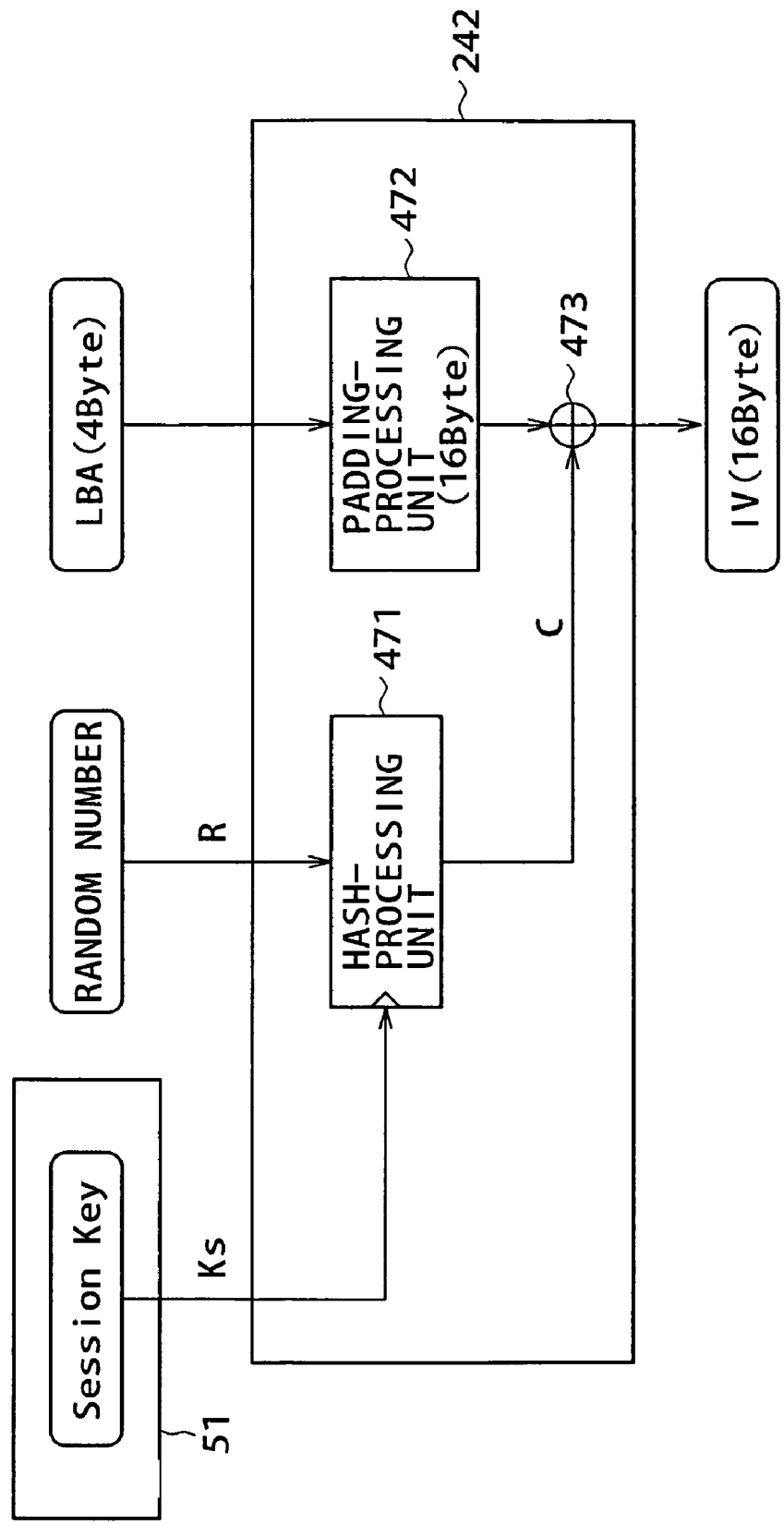
FIG. 31 is a diagram showing a further detailed configuration of the initialization-vector generation unit.

FIG. 31 is a diagram showing a further typical configuration of the initialization-vector generation unit 242. The initialization-vector generation unit 242 shown in FIG. 31 has a configuration including a hash-processing unit 471, a padding-processing unit 472 and an exclusive-or process circuit 473. This configuration is basically the same as the one shown in FIG. 30. However, the configuration shown in FIG. 31 is different from the one shown in FIG. 30 in that, in the configuration shown in FIG. 31, the hash-processing unit 471 receives a session key Ks from the authentication-processing unit 51 shown in FIG. 18.

The hash-processing unit 471 carries out a hash-function process using the session key Ks on an input random number R having a length of 16 bytes to output data C with a size of 16 bytes to the exclusive-or process circuit 473.

In such a configuration, it is possible to exhibit not only the same effect as the one produced by the initialization-vector generation unit 242 shown in FIG. 30, but also the following effect. Even if the same random number R is transmitted from the drive 31 to the host 32 or vice versa several times consecutively, the session key Ks obtained as a result of the mutual authentication process carried out by the drive 31 and the host 32 can be made different from authentication to authentication. As a result, different initialization vectors IV can be generated even from the same random number R. It is therefore possible to enhance safety of encryption along a bus.

As described above, in accordance with the present invention, an initialization vector IV is generated from an LBA specified in a read command 102 or a write command 104. It is thus possible to generate an initialization vector IV to be used in encryption and decryption of data without modifying specifications of an existing interface such as the ATAPI.

In addition, since the initialization vector IV is generated by carrying out a process using typically a hash function, it is out of the bounds of possibility that the same initialization vector IV is generated again. It is therefore possible to prevent a clear text from being inferred with ease from encrypted data by using an initialization vector IV. On the top of that, since a session key Ks is used as the key of the hash function, it is further out of the bounds of possibility that the same initialization vector IV is generated again.

Figure 32:
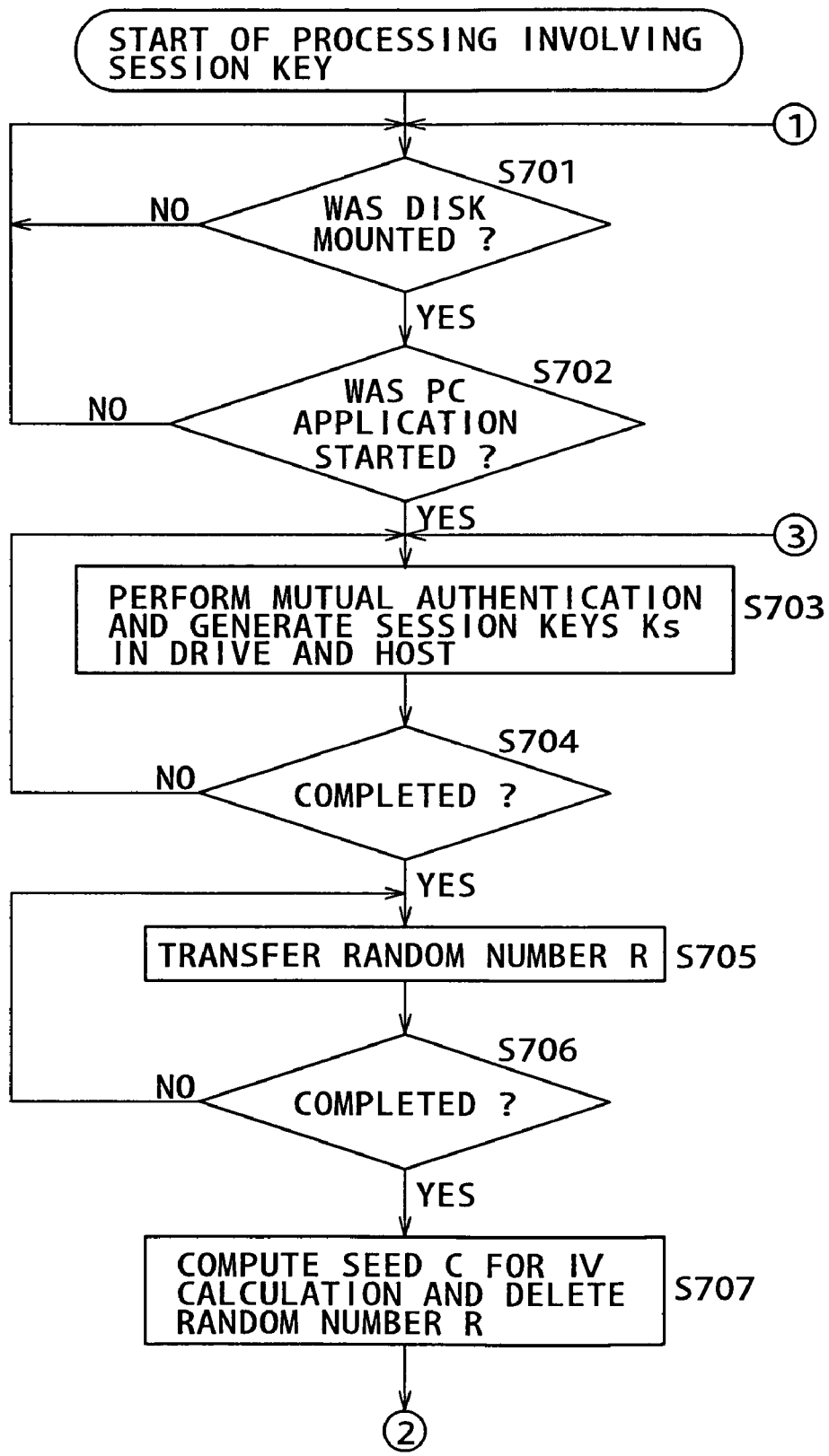
FIG. 32 shows a flowchart referred to in explanation of processing involving a session key.
Figure 33:
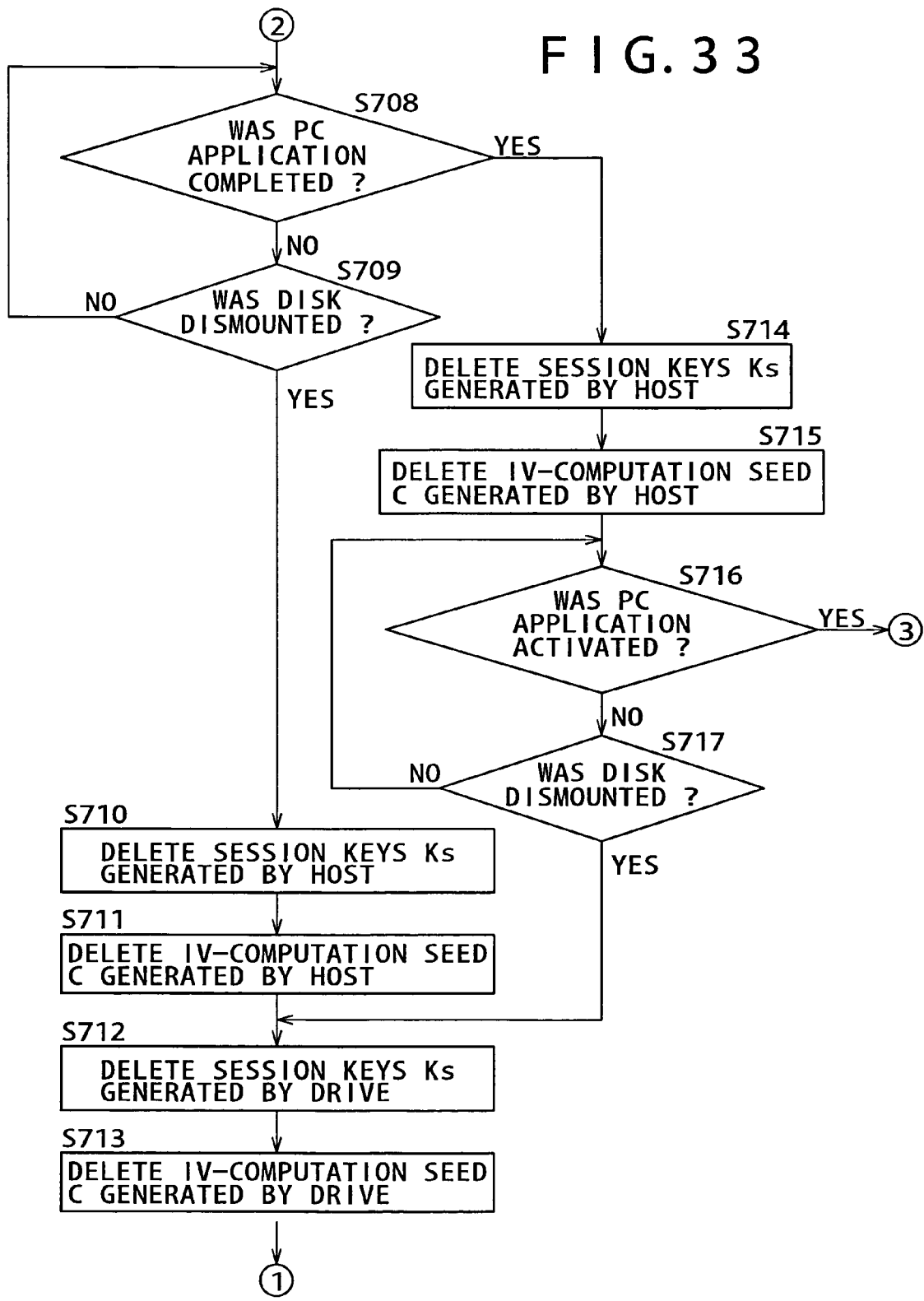
FIG. 33 shows a continuation of the flowchart referred to explanation of processing involving a session key.

By referring to a flowchart shown in FIGS. 32 and 33, the following description explains SEED for computing a session key Ks obtained as a result of the mutual authentication process carried out by the drive 31 and the host 32 and an initialization vector IV. SEED is a predetermined numerical value typically used as an initial value in an algorithm for generating a random number or the like.

The flowchart begins with a step S701 to determine whether or not a disc has been mounted on the drive 31. Strictly speaking, in the following description, the disc means a disk-shaped recording medium mounted on the drive 31. If the determination result produced at the step S701 indicates that a disc has been mounted on the drive 31, the flow goes on to a step S702 to determine whether or not a predetermined application has been activated in the host 32. In the following description, the host 32 is a PC (personal computer).

The predetermined application is defined as an application required for reading out or writing data from or into the disc mounted on the drive 31.

If the determination result produced at the step S702 indicates that a predetermined application has been activated in the host 32, the flow of the processing goes on to a step S703. At the step S703, the drive 31 and the host 32 carry out a mutual authentication process, producing a session key Ks to be shared by the drive 31 and the host 32. Then, the flow of the processing goes on to a step S704 to determine whether or not the process to generate the session key Ks has been completed. If the process to generate the session key Ks has not been completed, the flow of the processing goes back to a step S703 to repeat the processes carried out at this step and the step S704. These processes are carried out repeatedly till the determination result produced at the step S704 indicates that the process to generate the session key Ks has been completed.

As the determination result produced at the step S704 indicates that the process to generate the session key Ks has been completed, the flow of the processing goes on to a step S705 at which a random number R is transferred from the drive 31 to the host 32 or vice versa. Then, the flow of the processing goes on to a step S706 to determine whether or not a process to transfer the random number R from the drive 31 to the host 32 or vice versa has been completed. If the determination result produced at the step S706 indicates that the process to transfer the random number R from the drive 31 to the host 32 or vice versa has been completed, the flow of the processing goes on to a step S707.

At the step S707, SEED C required for computing an initialization vector IV is found. As SEED C is found at the end of the computation, the random number R is deleted. When the process carried out at the step S707 is ended, the flow of the processing goes on to a step S708 of a flowchart portion shown in FIG. 33 to determine whether or not execution of a predetermined application activated in the host 32 has been ended. The application is typically a PC application. If the determination result obtained at the step S708 indicates that the execution of the PC application has not been ended, the flow of the processing goes on to a step S709 to determine whether or not the disc mounted on the drive 31 has been dismounted.

If the determination result obtained at the step S709 indicates that the disc mounted on the drive 31 has not been dismounted from the drive 31, the flow of the processing goes back to the step S708 to repeat the process of this step. If the determination result obtained at the step S709 indicates that the disc mounted on the drive 31 has been dismounted from the drive 31, on the other hand, the flow of the processing goes on to a step S710 at which the session key Ks generated in the host 32 is deleted. Then, at the next step S711, SEED C generated in the host 32 is also deleted as well.

Subsequently, at the next step S712, the session key Ks generated in the drive 31 is deleted. Then, at the next step S713, SEED C generated in the drive 31 is also deleted as well.

When the disc is dismounted from the drive 31, data can be neither read out from nor written onto the disc. In order to prevent data from being read out from or written onto the disc, session keys Ks and SEED C quantities are deleted from the drive 31 and the host 32. After such pieces of data are deleted, the flow of the processing goes back to the step S701 to repeat the process of this step and the subsequent steps.

If the determination result obtained at the step S708 indicates that the execution of the PC application has been ended, on the other hand, the flow of the processing goes on to a step S714 at which the session key Ks generated in the host 32 is deleted. Then, at the next step S715, SEED C generated in the host 32 is also deleted as well.

Subsequently, the flow of the processing goes on to a step S716 to determine whether or not a PC application has been activated in the host 32. In this state, a disc has been mounted on the drive 31. Thus, if a PC application is activated, data can be read out from and written into the disc. As described above, the flow of the processing goes on to the step S716 to determine whether or not a PC application has been activated in the host 32 for the purpose of determining whether or not the information-processing apparatus is in a state of being capable of carrying out processing to read out data from the disc and write data into the disc.

If the determination result obtained at the step S716 indicates that the PC application has been activated in the host 32, the flow of the processing goes back to the step S703 of the flowchart portion shown in FIG. 32 to repeat the processing of the step and the subsequent steps. If the determination result obtained at the step S716 indicates that the PC application has not been activated in the host 32, on the other hand, the flow of the processing goes on to a step S717 to determine whether or not the disc mounted on the drive 31 has been dismounted.

If the determination result obtained at the step S717 indicates that the disc mounted on the drive 31 has not been dismounted from the drive 31, the flow of the processing goes back to the step S716 to repeat the process of the steps S716 and S717. The processes of the steps S716 and S17 are carried out repeatedly till the determination result obtained at the step S717 indicates that the disc mounted on the drive 31 has been dismounted from the drive 31. As the determination result obtained at the step S717 indicates that the disc mounted on the drive 31 has been dismounted from the drive 31, the flow of the processing goes on to the step S712. Since the processes carried out at the S712 and the subsequent processes-have been explained, their descriptions are properly omitted in order to avoid duplications.

As described above, the information-processing apparatus has a configuration in which a session key Ks and SEED C are generated when necessary and, at a point of time they are not required anymore, they are deleted immediately. A problem that the session key Ks and SEED C are tapped may be raised. By providing such a configuration, however, the possibility of such a problem is reduced as much as possible. The session key Ks and SEED C are data involved in generation of an initialization vector IV. Since the possibility that the session key Ks and SEED C are tapped can be reduced, however, it is almost out of the bounds of possibility that the initialization vector IV is tapped and inferred.

Other configurations of the reproduction unit 41 and other configurations of the recording unit 42 are explained below. In the following description, configuration elements identical with already explained portions are denoted by the same reference numerals as the portions and their explanations are properly omitted in order to avoid duplications.

Figure 34:
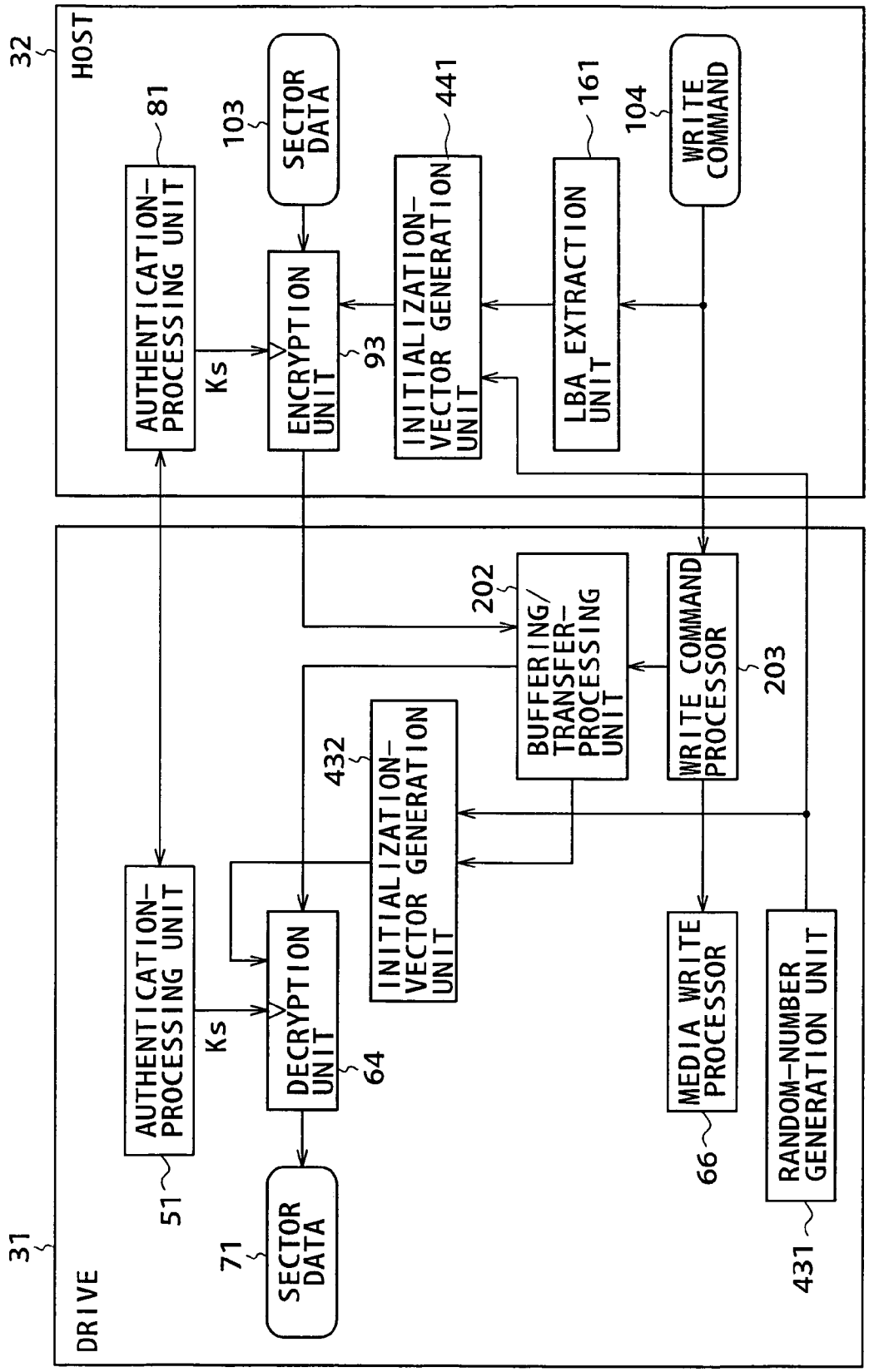
FIG. 34 is a diagram showing a still further typical configuration of the recording unit.

FIG. 34 is a diagram showing another typical configuration of the recording unit 42. In the configuration shown in FIG. 34, a random-number generation unit 431 for generating a random number is provided in the drive 31. A random number generated by the random-number generation unit 431 is supplied to an initialization-vector generation unit 432 employed in the drive 31 and an initialization-vector generation unit 441 employed in the host 32. The initialization-vector generation unit 432 and the initialization-vector generation unit 441 both generate an initialization vector IV from an LBA fetched from a write command 104 and the random number received from the random-number generation unit 431.

Figure 35:
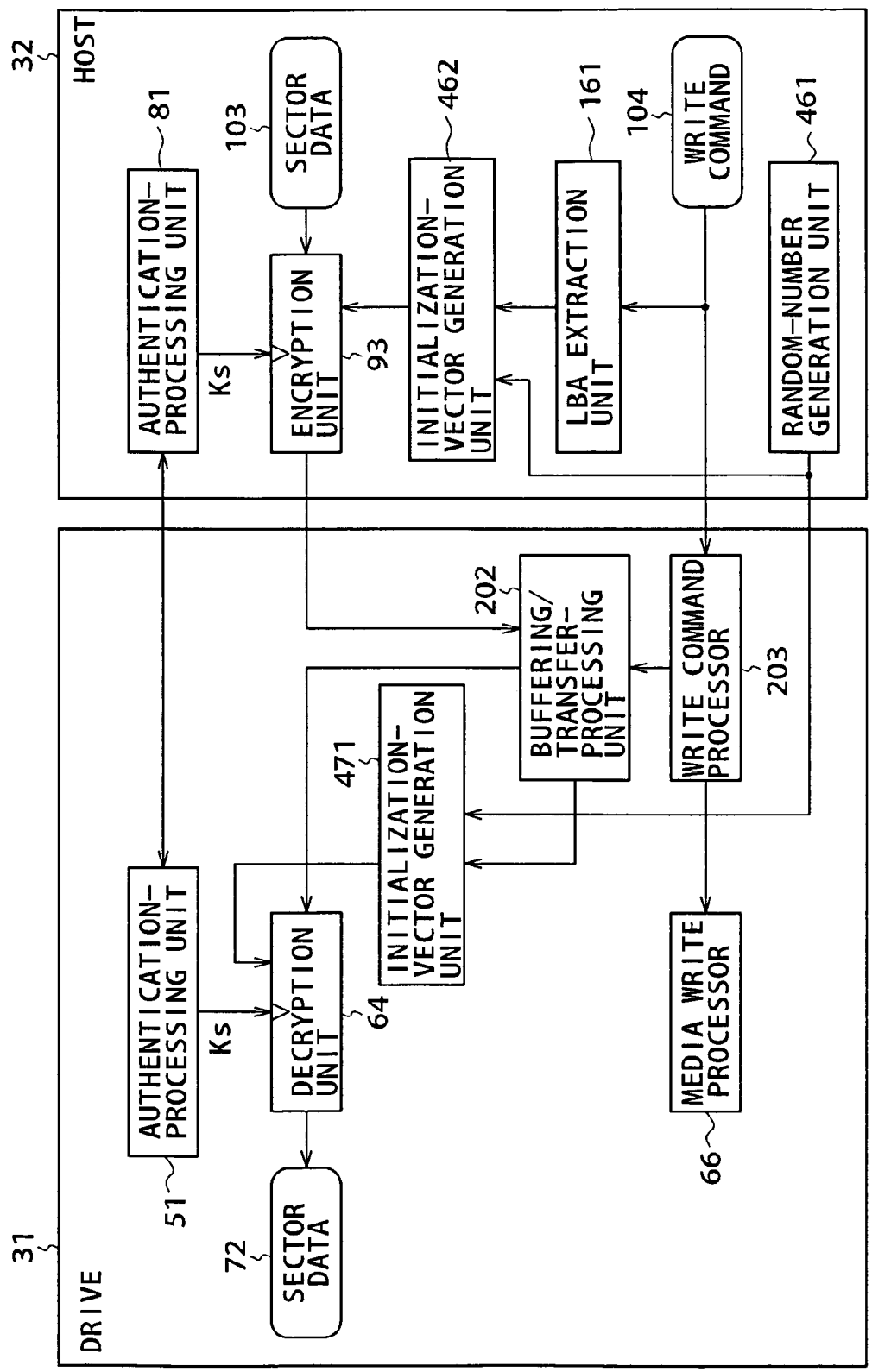
FIG. 35 is a diagram showing a still further typical configuration of the recording unit.

FIG. 35 is a diagram showing a further typical configuration of the recording unit 42. In the configuration shown in FIG. 35, a random-number generation unit 461 for generating a random number is provided in the host 32. A random number generated by the random-number generation unit 461 is supplied to an initialization-vector generation unit 462 employed in the host 32 and an initialization-vector generation unit 471 employed in the drive 31. The initialization-vector generation unit 462 and the initialization-vector generation unit 471 both generate an initialization vector IV from an LBA fetched from a write command 104 and the random number received from the random-number generation unit 461.

Figure 36:
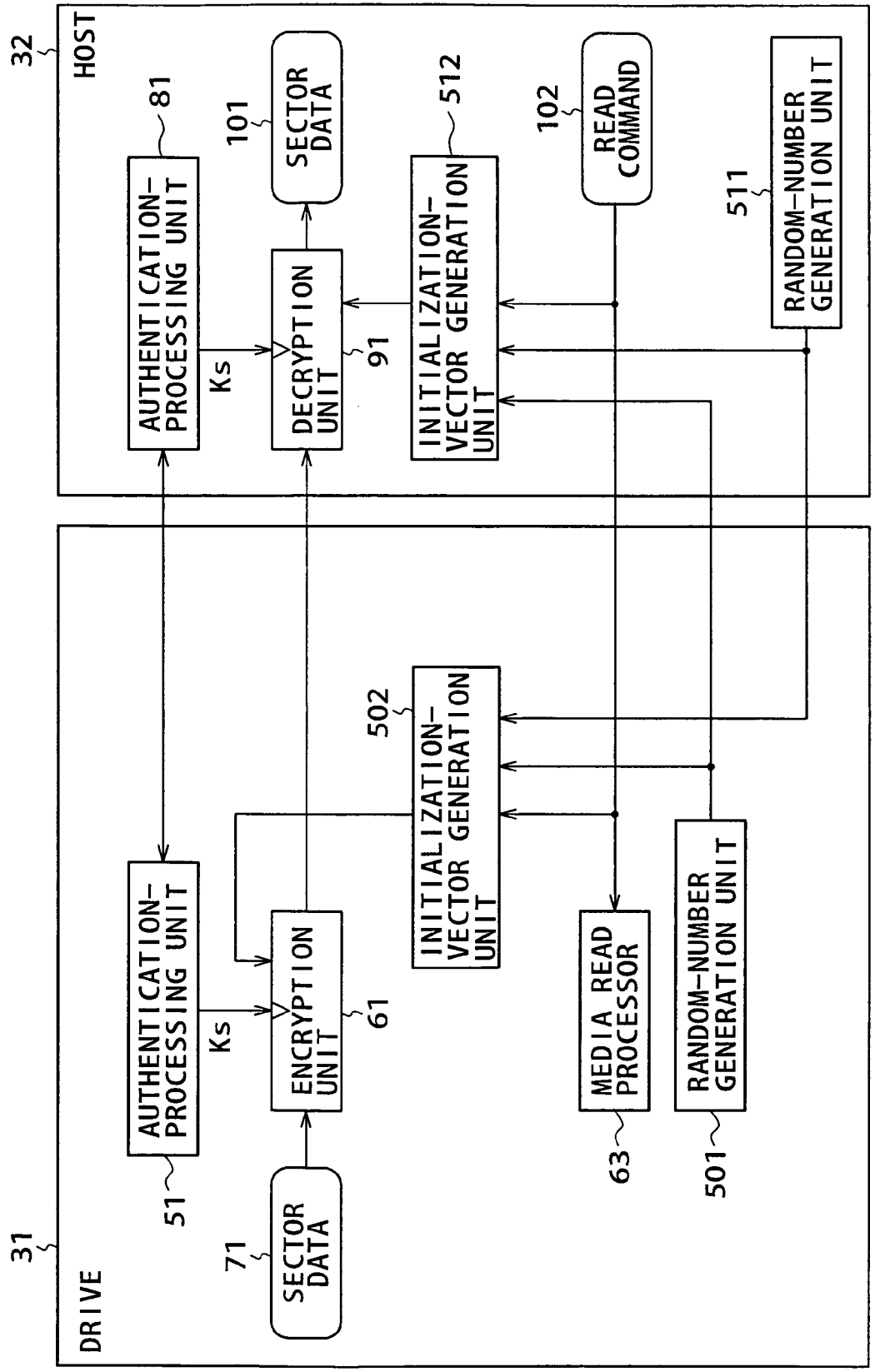
FIG. 36 is a diagram showing a still further configuration of the reproduction unit.

FIG. 36 is a diagram showing another typical configuration of the reproduction unit 41. In the configuration shown in FIG. 36, a random-number generation unit 501 for generating a random number is provided in the drive 31 and another random-number generation unit 511 for generating a random number is provided in the host 32. Random numbers generated by the random-number generation unit 501 and the random-number generation unit 511 are supplied to an initialization-vector generation unit 502 employed in the drive 31 and an initialization-vector generation unit 512 employed in the host 32. The initialization-vector generation unit 502 and the initialization-vector generation unit 512 both generate an initialization vector IV from an LBA fetched from a read command 102 and the random numbers received from the random-number generation unit 501 and the random-number generation unit 511.

Figure 37:
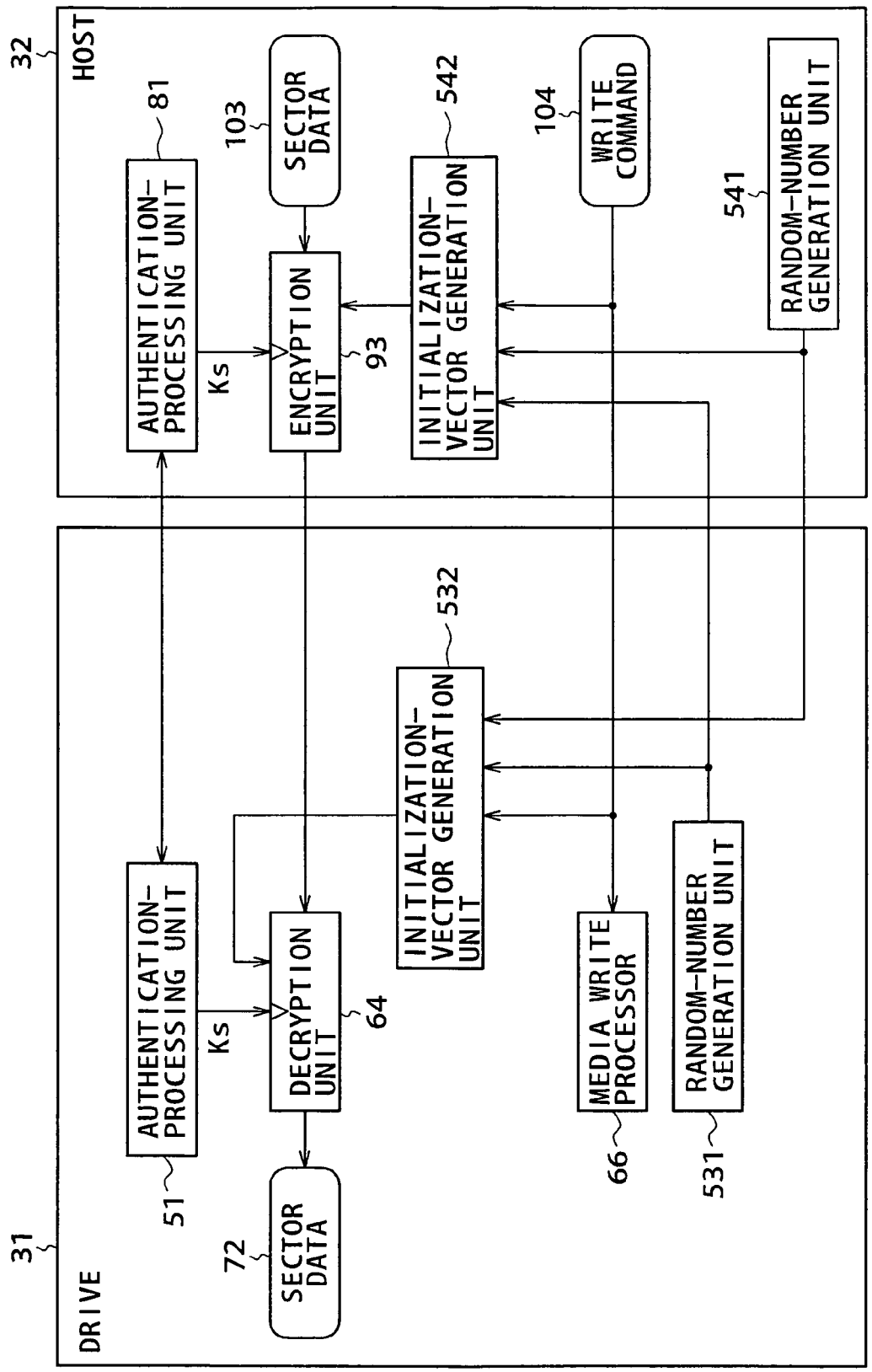
FIG. 37 is a diagram showing a still further typical configuration of the recording unit.

FIG. 37 is a diagram showing a still further typical configuration of the recording unit 42. In the configuration shown in FIG. 37, a random-number generation unit 531 for generating a random number is provided in the drive 31 and another random-number generation unit 541 for generating a random number is provided in the host 32. Random numbers generated by the random-number generation unit 531 and the random-number generation unit 541 are supplied to an initialization-vector generation unit 532 employed in the drive 31 and an initialization-vector generation unit 542 employed in the host 32. The initialization-vector generation unit 532 and the initialization-vector generation unit 542 both generate an initialization vector IV from an LBA fetched from a write command 104 and the random numbers received from the random-number generation unit 531 and the random-number generation unit 541.

Figure 38:
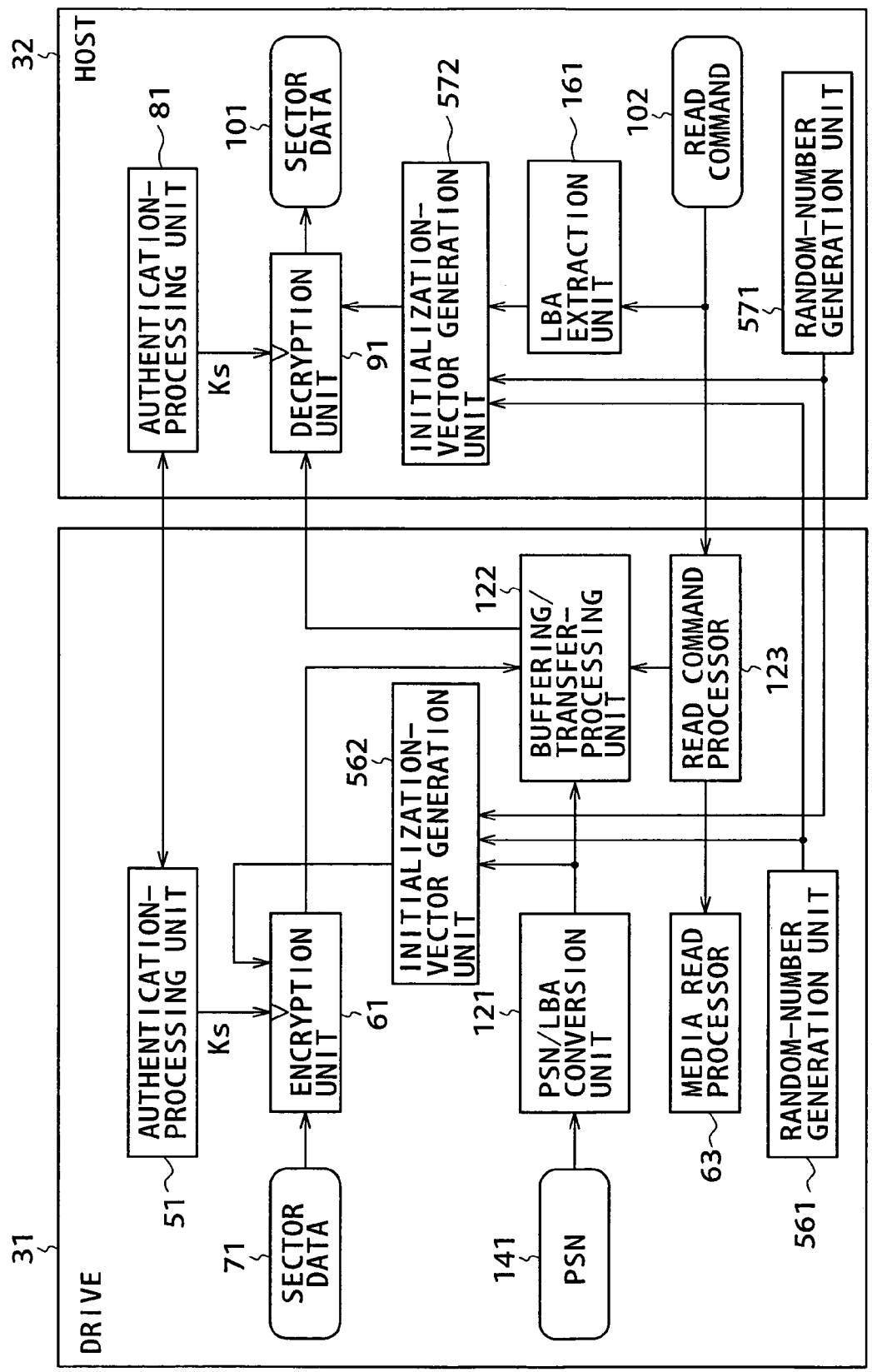
FIG. 38 is a diagram showing a still further configuration of the reproduction unit.

FIG. 38 is a diagram showing a further typical configuration of the reproduction unit 41. In the configuration shown in FIG. 38, a random-number, generation unit 561 for generating a random number is provided in the drive 31 and another random-number generation unit 571 for generating a random number is provided in the host 32. Random numbers generated by the random-number generation unit 561 and the random-number generation unit 571 are supplied to an initialization-vector generation unit 562 employed in the drive 31 and an initialization-vector generation unit 572 employed in the host 32. The initialization-vector generation unit 562 and the initialization-vector generation unit 572 both generate an initialization vector IV from an LBA fetched from a read command 102 and the random numbers received from the random-number generation unit 561 and the random-number generation unit 571.

Figure 39:
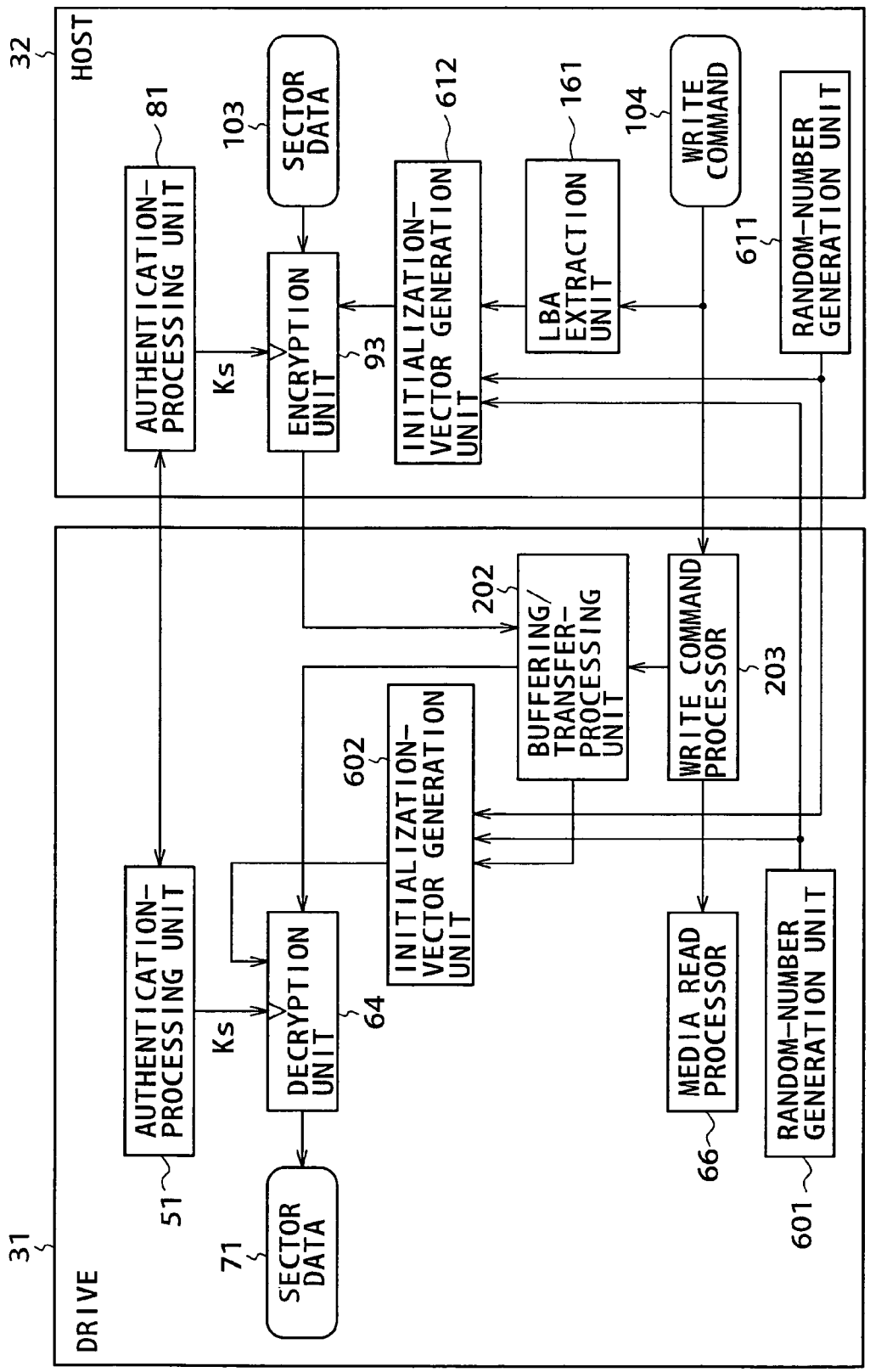
FIG. 39 is a diagram showing a still further typical configuration of the recording unit.

FIG. 39 is a diagram showing a still further typical configuration of the recording unit 42. In the configuration shown in FIG. 39, a random-number generation unit 601 for generating a random number is provided in the drive 31 and another random-number generation unit 611 for generating a random number is provided in the host 32. Random numbers generated by the random-number generation unit 601 and the random-number generation unit 611 are supplied to an initialization-vector generation unit 602 employed in the drive 31 and an initialization-vector generation unit 612 employed in the host 32. The initialization-vector generation unit 602 and the initialization-vector generation unit 612 both generate an initialization vector IV from an LBA fetched from a write command 104 and the random numbers received from the random-number generation unit 601 and the random-number generation unit 611.

Figure 40:
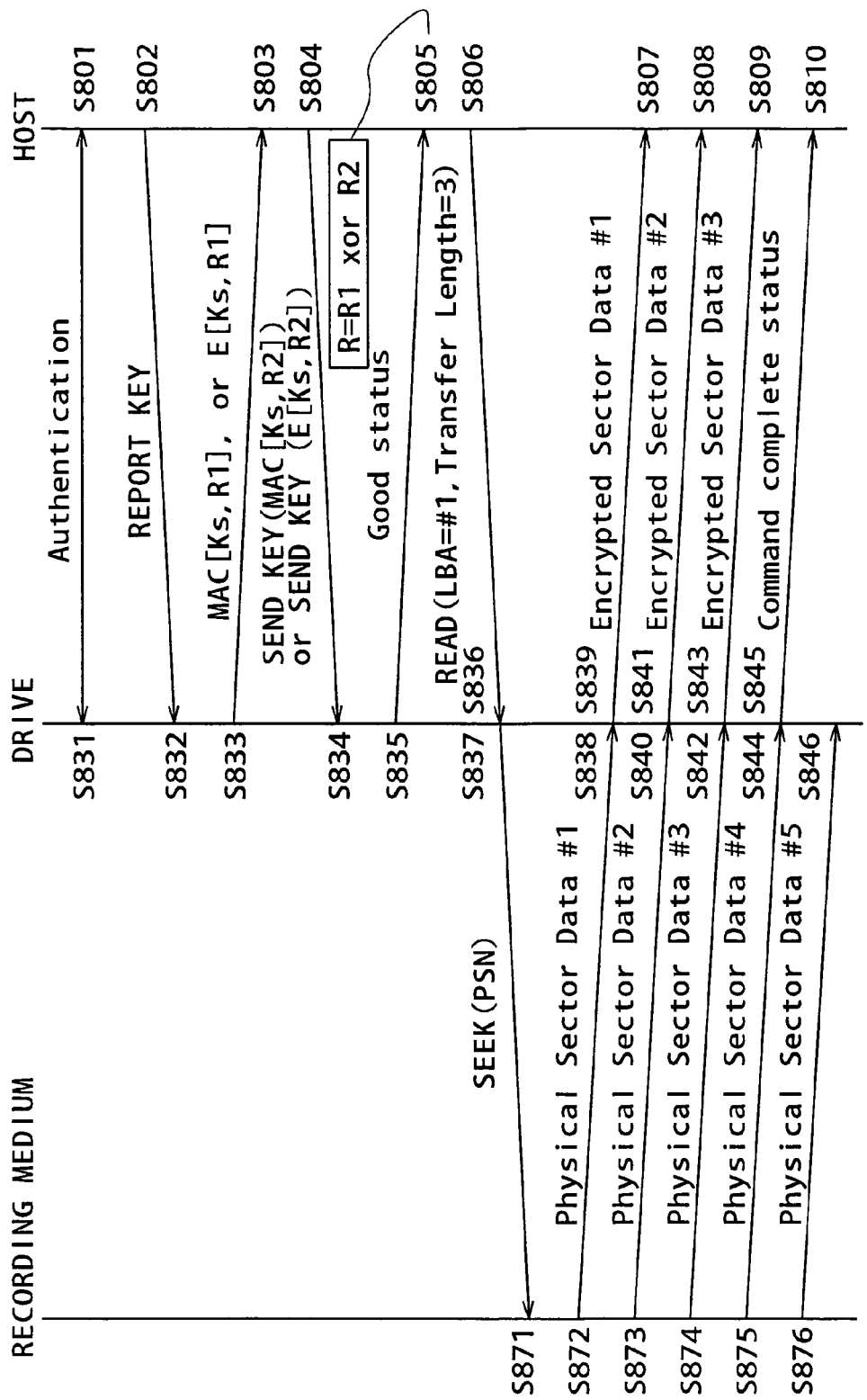
FIG. 40 shows timing charts referred to in explanation of still further operations carried out by the reproduction unit.

Operations carried out by the reproduction unit 41 shown in FIG. 38 are explained by referring to timing charts shown in FIG. 40. Explanations of operations identical with those already explained before are properly omitted in order to avoid duplications. At a step S833, a MAC value MAC [Ks, R1] is computed by using a session key Ks from a random number R1 generated by the random-number generation unit 561 and transmitted to the host 32.

In processing carried out at the step S833, instead of computing the MAC value MAC [Ks, R1], the drive 31 may encrypt the random number R1 generated by the random-number generation unit 561 by using the session key Ks to produce encrypted data E[Ks, R1], and then transmit the encrypted data E[Ks, R1] to the host 32.

At a step S803, the host 32 receives the MAC value MAC [Ks, R1] or the encrypted data E[Ks, R1] from the drive 31. Then, at the next step S804, the host 32 computes a MAC value MAC [Ks, R2] by using the session key Ks for a random number R2 generated by the random-number generation unit 571 and transmits the MAC value MAC [Ks, R2] to the drive 31 along with a "SEND KEY" command.

In processing carried out at the step S804, instead of computing the MAC value MAC [Ks, R2], the host 32 may encrypt the random number R2 generated by the random-number generation unit 571 by using the session key Ks to produce encrypted data E[Ks, R2], and then transmit the encrypted data E[Ks, R2] to the drive 31 along with the "SEND KEY" command.

As described above, in the recording unit 42 shown in FIG. 38, the drive 31 and the host 32 have the random-number generation units 561 and 571 respectively. Thus, an initialization vector IV is generated in processing using 2 random numbers R1 and R2 output by the random-number generation units 561 and 571 respectively. As a result, security can be better enhanced.

The initialization-vector generation units 562 and 572 each generate an initialization vector IV by using an LBA fetched from a read command 102 and the random numbers R1 and R2. There is raised a problem as to whether to use the random number R1 generated by the random-number generation unit 561 or the random number R2 generated by the random-number generation unit 571.

As a solution to the problem, a random number R is computed as an exclusive-or logical sum of the random numbers R1 and R2 and used in generation of an initialization vector IV. That is to say, the initialization-vector generation units 562 and 572 each generate an initialization vector IV after the computation of the random number R representing the exclusive-or logical sum of the random numbers R1 and R2.

It is almost out of the bounds of possibility that the same pair of the random numbers R1 and R2 is generated twice. That is to say, the possibility that the same random number R is generated more than once is also low. Accordingly, it is almost out of the bounds of possibility that the same initialization vector IV is generated twice.

In this way, by applying the present invention described above, it is possible to enhance security in a process of exchanging data between the drive 31 and the host 32.

In the embodiments described above, the reproduction unit 41 and the recording unit 42 have separate configurations and are shown in separate figures. It is to be noted, however, that the reproduction unit 41 and the recording unit 42 may also have a configuration wherein a component, which is employed in the reproduction unit 41 as a component for carrying out the same processing as a counterpart component employed in the recording unit 42, and the counterpart component are provided as a single component shared by the reproduction unit 41 and the recording unit 42. An example of such a component and a counterpart component is the initialization-vector generation unit, which can be provided as a component common to the reproduction unit 41 and the recording unit 42.

In addition, in the embodiments described above, the CBC method is taken in the explanations as a representative encryption/decryption method. It is to be noted, however, that the present invention can be applied not only to the CBC method. For example, the present invention can also be applied to other methods such as CFB (Cipher Feed Back) and OFB (Output Feed Back) methods.

The series of processes described above can be carried out by using hardware or software. If the processes are carried out by using software, programs composing the software are installed in a computer embedded in a special-purpose hardware or installed in a general-purpose computer from a program-recording medium. A general-purpose computer is a computer capable of carrying out a variety of functions by executing a variety of programs installed in the computer. An example of the general-purpose computer is a general-purpose personal computer.

A program-recording medium is a medium for recording programs in advance as programs to be installed in a computer described above. The program-recording medium is distributed to the user separately from the computer as a means for presenting the programs recorded thereon to the user. The program-recording medium is package media, which can be a magnetic disc including a flexible disc, an optical disc including a CD-ROM (Compact Disc-Read Only Memory) and a DVD (Digital Versatile Disc), a magneto-optical disc including an MD (Mini Disc, a trademark) or a semiconductor memory. Instead of installing programs from the program-recording medium, the programs can be presented to the user as programs recorded in advance in a recording medium embedded in the computer. Examples of the embedded recording medium are a ROM and a hard disk incorporated in the storage unit.

It is to be noted that, in this specification, steps composing a program recorded in the program-recording medium or the embedded recording medium can of course be executed sequentially along the time axis in an order the steps are prescribed in the program as sequential processes. However, the steps do not have to be executed as sequential processes along the time axis, but can also be executed as processes carried out concurrently or individually.

In addition, in this specification, a system represents a complete apparatus including a plurality of apparatus.

While the preferred embodiments of the present invention have been described using specific embodiments, such description is for illustrative purposes only, and it is to be understood that changes and variations may be made without departing from the spirit or scope of the appended claims.

What is claimed is:

1. An information-processing apparatus comprising:
   an information acquisition unit configured to acquire predetermined information from a command making a request for an operation to write data onto a predetermined recording medium or a command making a request for an operation to read out data from said predetermined recording medium;
   an initialization-vector generation unit configured to generate an initialization vector from said information acquired by said information acquisition unit; and
   an encryption/decryption execution unit configured to encrypt or decrypt data by using said initialization-vector generated by said initialization-vector generation unit and a predetermined key.

2. The information-processing apparatus according to claim 1, wherein said predetermined information acquired by said information acquisition unit is an LBA (Logical Block Address).

3. The information-processing apparatus according to claim 1, said information-processing apparatus further includes a random-number generation unit configured to generate a random number, wherein said initialization-vector generation unit generates an initialization vector from said information acquired by said information acquisition unit and said random number generated by said random-number generation unit.

4. The information-processing apparatus according to claim 3, wherein said initialization-vector generation unit uses a random number passing through a hash function.

5. A control method for controlling at least a medium-mounting apparatus on which a predetermined recording medium is mounted or another apparatus connected to said medium-mounting apparatus as a control apparatus for controlling exchanges of data with said medium-mounting apparatus, said control method comprising:
   acquiring predetermined information from a command making a request for an operation to write data onto a predetermined recording medium or a command making a request for an operation to read out data from said predetermined recording medium;
   generating an initialization vector from said information acquired in processing carried out at said acquiring; and
   encrypting or decrypting data by using said initialization-vector generated in processing carried out at said generating and a predetermined key.

6. A program of a control apparatus for controlling at least a medium-mounting apparatus on which a predetermined recording medium is mounted or another apparatus connected to said medium-mounting apparatus as a control apparatus for controlling exchanges of data with said medium-mounting apparatus, said program comprising:
   acquiring predetermined information from a command making a request for an operation to write data onto a predetermined recording medium or a command making a request for an operation to read out data from said predetermined recording medium;
   generating an initialization vector from said information acquired in said acquiring; and
   encrypting or decrypting data by using said initialization-vector generated in said generating and a predetermined key.

* * * * *